(12) United States Patent
Suzuki

(10) Patent No.: US 12,459,173 B2
(45) Date of Patent: Nov. 4, 2025

(54) MOLD DEVICE FOR RESIN MOLDED ARTICLE, MOLDING APPARATUS, MOLDING SYSTEM, AND METHOD FOR MANUFACTURING MOLDED ARTICLE

(71) Applicant: Yasuhiro Suzuki, Suzuka (JP)

(72) Inventor: Yasuhiro Suzuki, Suzuka (JP)

( * ) Notice: Subject to any disclaimer, the term of this patent is extended or adjusted under 35 U.S.C. 154(b) by 573 days.

(21) Appl. No.: 17/602,984

(22) PCT Filed: Apr. 6, 2020

(86) PCT No.: PCT/JP2020/015536
§ 371 (c)(1),
(2) Date: Oct. 11, 2021

(87) PCT Pub. No.: WO2020/213457
PCT Pub. Date: Oct. 22, 2020

(65) Prior Publication Data
US 2022/0219358 A1    Jul. 14, 2022

(30) Foreign Application Priority Data

Apr. 19, 2019  (JP) ................................. 2019-080274

(51) Int. Cl.
*B29C 44/58*     (2006.01)
*B29C 33/00*     (2006.01)
(Continued)

(52) U.S. Cl.
CPC ........ *B29C 44/588* (2013.01); *B29C 33/0038* (2013.01); *B29C 33/442* (2013.01);
(Continued)

(58) Field of Classification Search
CPC ... B29C 44/105; B29C 44/586; B29C 44/588; B29C 45/401; B29C 45/34; B29C 2045/4015
See application file for complete search history.

(56) References Cited

U.S. PATENT DOCUMENTS 4,479,914 A * 10/1984 Baumrucker ......... B29C 44/105
                                                    264/DIG. 83
8,128,394 B2 * 3/2012 Desmith ............... B29C 44/428
                                                    425/192 R
(Continued)

FOREIGN PATENT DOCUMENTS

CN     109605645 A  *  4/2019  ......... B29C 44/0415
JP     S51-68675 A    6/1976
(Continued)

OTHER PUBLICATIONS

International Search Report for PCT/JP2020/015536 dated Aug. 18, 2020.
PCT written opinion dated Aug. 18, 2020.

*Primary Examiner* — Atul P. Khare
(74) *Attorney, Agent, or Firm* — Yokoi & Co., U.S.A.; Toshiyuki Yokoi

(57) ABSTRACT

A method for manufacturing a foam-molded article by performing a GCP, the method including a step of retreating a mobile side of a mold clamping mechanism of a sealed mold at the same time as when a step of discharging a gas is started, during the step of discharging the gas, immediately after the step of discharging the gas or when a specified delay time after the step of discharging the gas is finished for performing at least one of a mold-back and a core-back to increase a foaming ratio of a foamable resin in a state that a cooling and a solidification of an inside of the foamable resin are not finished.

5 Claims, 39 Drawing Sheets

(51) Int. Cl.
  *B29C 33/44* (2006.01)
  *B29C 44/04* (2006.01)
  *B29C 44/10* (2006.01)
  *C08J 3/22* (2006.01)
  *C08J 9/10* (2006.01)

(52) U.S. Cl.
  CPC ........ B29C 44/0407 (2013.01); B29C 44/105 (2013.01); B29C 44/58 (2013.01); B29C 44/586 (2013.01); C08J 3/22 (2013.01); C08J 9/10 (2013.01); C08J 9/101 (2013.01); C08J 2323/12 (2013.01)

(56) References Cited

U.S. PATENT DOCUMENTS

| | | | | |
|---|---|---|---|---|
| 9,346,204 | B2* | 5/2016 | Tokunou | ................ B29C 45/34 |
| 10,513,052 | B2* | 12/2019 | Suzuki | ................... B29C 39/24 |
| 11,511,468 | B2* | 11/2022 | Suzuki | ............... B29C 45/1732 |
| 2009/0140447 | A1 | 6/2009 | Kawamura et al. | |
| 2011/0304066 | A1* | 12/2011 | Obara | ................... B29C 44/586 425/546 |
| 2017/0043503 | A1 | 2/2017 | Suzuki | |
| 2017/0312965 | A1* | 11/2017 | Suzuki | ............... B30B 15/0017 |
| 2018/0194051 | A1 | 7/2018 | Suzuki | |

FOREIGN PATENT DOCUMENTS

| | | |
|---|---|---|
| JP | S54-53171 A | 4/1979 |
| JP | S57-156228 A | 9/1982 |
| JP | S59-227425 A | 12/1984 |
| JP | 61239916 A * | 10/1986 |
| JP | H08-103919 A | 4/1996 |
| JP | H11-216748 A | 8/1999 |
| JP | 2006-159898 A | 6/2006 |
| JP | 2009-248505 A | 10/2009 |
| JP | 2012-200888 A | 10/2012 |
| WO | 2012/137588 | 10/2012 |
| WO | 2015/174255 | 11/2015 |
| WO | 2017/119228 | 7/2017 |

* cited by examiner

| resin | MB of foaming agent to be used | adding amount of foaming agent (wt.%) | MB of foaming nucleating agent to be used | adding amount of foaming nucleating agent (wt.%) |
|---|---|---|---|---|
| ABS | Wa-B-sodium bicarbonate-10 | 4 | Wa-B-CANa-10 | 1 |
| ABS | Wa-B-ADCA-10 | 4 | | 0 |
| HIPS | Wa-B-sodium bicarbonate-10 | 4 | | 1 |
| HIPS | Wa-B-ADCA-10 | 4 | | 0 |
| m-PPE | Wa-B-sodium bicarbonate-10 | 4 | | 1 |
| m-PPE | Wa-B-ADCA-10 | 4 | | 0 |
| PP | Wa-B-sodium bicarbonate-10 | 4 | | 1 |
| PP | Wa-B-ADCA-10 | 4 | | 0 |
| PC | Wa-B-sodium bicarbonate-10 | 4 | | 1 |
| PC | Wa-B-ADCA-10 | 4 | | 0 |
| PC/ABS | Wa-B-sodium bicarbonate-10 | 4 | | 1 |
| PC/ABS | Wa-B-ADCA-10 | 4 | | 0 |

Fig. 43

| resin | MB of foaming agent to be used | temperature of molten resin (°C) | condition of surface of molded article | condition of inside molded article | number (reference numeral) of molded article |
|---|---|---|---|---|---|
| ABS | Wn-B-sodium bicarbonate-10 | 220 | swirl marks were seen in all molded articles | discontinuous and independent fine foam cells were seen, foam layer was formed inside | ABS-1/4 |
| ABS | Wn-B-ADCA-10 | 240 | | | ABS-2/4 |
| ABS | Wn-B-sodium bicarbonate-10 | 220 | | | ABS-3/4 |
| ABS | Wn-B-ADCA-10 | 240 | | | ABS-4/4 |
| HIPS | Wn-B-sodium bicarbonate-10 | 220 | | | HIPS-1/4 |
| HIPS | Wn-B-ADCA-10 | 240 | | | HIPS-2/4 |
| HIPS | Wn-B-sodium bicarbonate-10 | 220 | | | HIPS-3/4 |
| HIPS | Wn-B-ADCA-10 | 240 | | | HIPS-4/4 |
| m-PPE | Wn-B-sodium bicarbonate-10 | 240 | | | m-PPE-1/4 |
| m-PPE | Wn-B-ADCA-10 | 240 | | | m-PPE-2/4 |
| m-PPE | Wn-B-sodium bicarbonate-10 | 240 | | | m-PPE-3/4 |
| m-PPE | Wn-B-ADCA-10 | 240 | | | m-PPE-4/4 |
| PP | Wn-B-sodium bicarbonate-10 | 220 | | | m-PP-1/4 |
| PP | Wn-B-ADCA-10 | 220 | | | m-PP-2/4 |
| PP | Wn-B-sodium bicarbonate-10 | 220 | | | m-PP-3/4 |
| PP | Wn-B-ADCA-10 | 220 | | | m-PP-4/4 |
| PC | Wn-B-sodium bicarbonate-10 | 260 | | | m-PC-1/4 |
| PC | Wn-B-ADCA-10 | 260 | | | m-PC-2/4 |
| PC | Wn-B-sodium bicarbonate-10 | 260 | | | m-PC-3/4 |
| PC | Wn-B-ADCA-10 | 260 | | | m-PC-4/4 |
| PC/ABS | Wn-B-sodium bicarbonate-10 | 230 | | | m-PC/ABS-1/4 |
| PC/ABS | Wn-B-ADCA-10 | 230 | | | m-PC/ABS-2/4 |
| PC/ABS | Wn-B-sodium bicarbonate-10 | 230 | | | m-PC/ABS-3/4 |
| PC/ABS | Wn-B-ADCA-10 | 230 | | | m-PC/ABS-4/4 |

Fig. 44

| resin | MB of foaming agent to be used | temperature of molten resin (°C) | condition of surface of molded article | condition of inside of molded article | number (reference numeral) of molded article | result of primary adherability test |
|---|---|---|---|---|---|---|
| ABS | Wa-B-sodium bicarbonate-10 | 220 | swirl marks were not seen in all molded articles, excellent outer appearance with skin layer having smooth surface was seen | discontinuous and independent fine foam cells were seen, foam layer was formed inside, skin layer on surface and foam layer inside were seen | ABS-1/4-GCP | 100/100 |
| ABS | Wa-B-ADCA-10 | 240 | | | ABS-2/4-GCP | 100/100 |
| ABS | Wa-B-sodium bicarbonate-10 | 220 | | | ABS-3/4-GCP | 100/100 |
| ABS | Wa-B-ADCA-10 | 240 | | | ABS-4/4-GCP | 100/100 |
| HIPS | Wa-B-sodium bicarbonate-10 | 220 | | | HIPS-1/4-GCP | 100/100 |
| HIPS | Wa-B-ADCA-10 | 240 | | | HIPS-2/4-GCP | 100/100 |
| HIPS | Wa-B-sodium bicarbonate-10 | 220 | | | HIPS-3/4-GCP | 100/100 |
| HIPS | Wa-B-ADCA-10 | 240 | | | HIPS-4/4-GCP | 100/100 |
| m-PPE | Wa-B-sodium bicarbonate-10 | 240 | | | m-PPE-1/4-GCP | 100/100 |
| m-PPE | Wa-B-ADCA-10 | 240 | | | m-PPE-2/4-GCP | 100/100 |
| m-PPE | Wa-B-sodium bicarbonate-10 | 240 | | | m-PPE-3/4-GCP | 100/100 |
| m-PPE | Wa-B-ADCA-10 | 240 | | | m-PPE-4/4-GCP | 100/100 |
| PP | Wa-B-sodium bicarbonate-10 | 220 | | | m-PP-1/4-GCP | 100/100 |
| PP | Wa-B-ADCA-10 | 220 | | | m-PP-2/4-GCP | 100/100 |
| PP | Wa-B-sodium bicarbonate-10 | 220 | | | m-PP-3/4-GCP | 100/100 |
| PP | Wa-B-ADCA-10 | 220 | | | m-PP-4/4-GCP | 100/100 |
| PC | Wa-B-sodium bicarbonate-10 | 260 | | | m-PC-1/4-GCP | 100/100 |
| PC | Wa-B-ADCA-10 | 260 | | | m-PC-2/4-GCP | 100/100 |
| PC | Wa-B-sodium bicarbonate-10 | 260 | | | m-PC-3/4-GCP | 100/100 |
| PC | Wa-B-ADCA-10 | 260 | | | m-PC-4/4-GCP | 100/100 |
| PC/ABS | Wa-B-sodium bicarbonate-10 | 230 | | | m-PC/ABS-1/4-GCP | 100/100 |
| PC/ABS | Wa-B-ADCA-10 | 230 | | | m-PC/ABS-2/4-GCP | 100/100 |
| PC/ABS | Wa-B-sodium bicarbonate-10 | 230 | | | m-PC/ABS-3/4-GCP | 100/100 |
| PC/ABS | Wa-B-ADCA-10 | 230 | | | m-PC/ABS-4/4-GCP | 100/100 |

Fig. 45

| number (reference numeral) of molded article | coating material to be used | result of primary adherability |
|---|---|---|
| ABS-1/4 | Repete S#1100 | ×: peeling was seen |
| ABS-2/4 | | |
| ABS-3/4 | | |
| ABS-4/4 | | |
| HIPS-1/4 | | |
| HIPS-2/4 | | |
| HIPS-3/4 | | |
| HIPS-4/4 | | |
| m-PPE-1/4 | | |
| m-PPE-2/4 | | |
| m-PPE-3/4 | | |
| m-PPE-4/4 | | |
| PP-1/4 | primer: Multi-primer EXC-3000 coating material: EC-GPX79-ECO HAUREX | ×: peeling was seen |
| PP-2/4 | | |
| PP-3/4 | | |
| PP-4/4 | | |
| PC-1/4 | Repete S#1100 | ×: peeling was seen |
| PC-2/4 | | |
| PC-3/4 | | |
| PC-4/4 | | |
| PC/ABS-1/4 | | |
| PC/ABS-2/4 | | |
| PC/ABS-3/4 | | |
| PC/ABS-4/4 | | | article) test method of primary adherability was JIS K-5600-5-6

Fig. 46

| number (reference numeral) of molded article | coating material to be used | result of primary adherability |
|---|---|---|
| ABS-1/4<br>ABS-3/4<br>HIPS-1/4<br>HIPS-3/4<br>m-PPE-1/4<br>m-PPE-3/4 | Repele S#1100 | ×: peeling was seen |
| PP-1/4<br>PP-3/4 | primer:<br>Multi-primer EXC-3000<br>coating material:<br>EC-GPX79-ECO HAIUREX | ×: peeling was seen |
| PC-1/4<br>m-PC-3/4<br>PC/ABS-1/4<br>PC/ABS-3/4 | Repele S#1100 | ×: peeling was seen |

Fig. 47

| resin | MB of foaming agent to be used | temperature of molten resin (°C) | condition of surface of molded article | condition of inside molded article | number (reference numeral) of molded article | test result (A) | test result (B) |
|---|---|---|---|---|---|---|---|
| ABS | Wa-B-sodium bicarbonate-10 | 220 | swirl marks were seen in all molded articles | discontinuous and independent fine foam cells were seen, foam layer was formed inside, skin layer on surface and foam layer inside were seen | ABS-1/4 | blister occurs | 100/100 |
| | Wa-B-ADCA-10 | 240 | | | ABS-2/4 | 100/100 | - |
| | Wa-B-sodium bicarbonate-10 | 220 | | | ABS-3/4 | blister occurs | 100/100 |
| | Wa-B-ADCA-10 | 240 | | | ABS-4/4 | 100/100 | - |
| HIPS | Wa-B-sodium bicarbonate-10 | 220 | | | HIPS-1/4 | blister occurs | 100/100 |
| | Wa-B-ADCA-10 | 240 | | | HIPS-2/4 | 100/100 | - |
| | Wa-B-sodium bicarbonate-10 | 220 | | | HIPS-3/4 | blister occurs | 100/100 |
| | Wa-B-ADCA-10 | 240 | | | HIPS-4/4 | 100/100 | - |
| m-PPE | Wa-B-sodium bicarbonate-10 | 240 | | | m-PPE-1/4 | blister occurs | 100/100 |
| | Wa-B-ADCA-10 | 240 | | | m-PPE-2/4 | 100/100 | - |
| | Wa-B-sodium bicarbonate-10 | 240 | | | m-PPE-3/4 | blister occurs | 100/100 |
| | Wa-B-ADCA-10 | 240 | | | m-PPE-4/4 | 100/100 | - |
| PP | Wa-B-sodium bicarbonate-10 | 220 | | | m-PP-1/4 | blister occurs | 100/100 |
| | Wa-B-ADCA-10 | 220 | | | m-PP-2/4 | 100/100 | - |
| | Wa-B-sodium bicarbonate-10 | 220 | | | m-PP-3/4 | blister occurs | 100/100 |
| | Wa-B-ADCA-10 | 220 | | | m-PP-4/4 | 100/100 | - |
| PC | Wa-B-sodium bicarbonate-10 | 260 | | | m-PC-1/4 | blister occurs | 100/100 |
| | Wa-B-ADCA-10 | 260 | | | m-PC-2/4 | 100/100 | - |
| | Wa-B-sodium bicarbonate-10 | 260 | | | m-PC-3/4 | blister occurs | 100/100 |
| | Wa-B-ADCA-10 | 260 | | | m-PC-4/4 | 100/100 | - |
| PC/ABS | Wa-B-sodium bicarbonate-10 | 230 | | | m-PC/ABS-1/4 | blister occurs | 100/100 |
| | Wa-B-ADCA-10 | 230 | | | m-PC/ABS-2/4 | 100/100 | - |
| | Wa-B-sodium bicarbonate-10 | 230 | | | m-PC/ABS-3/4 | blister occurs | 100/100 |
| | Wa-B-ADCA-10 | 230 | | | m-PC/ABS-4/4 | 100/100 | - | article) Blister occurs in water resistance test and salt water immersion test when sodium bicarbonate is used for foaming agent.
article) Test result (A) in the figure shows SST, humidity resistance test and water resistance test (result is same).
article) Test result (B) in the figure shows SST, humidity resistance test and water resistance test after acid cleaning (result is same).

Fig. 48 list of seal of ejector pin (dimension of housing)

| diameter of EP (d): h9 | K seal number | dimension of housing ||||| remarks |
|---|---|---|---|---|---|---|
| | | D (diameter): +0.05 | L (depth) +0.2 | S (space) | c (C-shape of inlet) | r (R-shape of bottom) | |
| φ2.0 | KEIS-D 020-001 | φ5.5 | 4 | fit tolerance H7/f8 | 0.3 | 0.4 MAX | tip of EP: rounded, guiding structure, *for preventing defect of seat when inserting pin |
| φ3.0 | KEIS-D 030-001 | φ6.5 | | | | | |
| φ4.0 | KEIS-D 040-001 | φ7.5 | | | | | |
| φ5.0 | KEIS-D 050-001 | φ8.5 | | | | | |
| φ6.0 | KEIS-D 060-001 | φ9.5 | | | | | |
| φ7.0 | KEIS-D 070-001 | φ10.5 | | | | | |
| φ8.0 | KEIS-D 080-001 | φ11.5 | | | | | |
| φ10.0 | KEIS-D 100-001 | φ13.7 | | | | | |
| φ12.0 | KEIS-D 120-001 | φ16.5 | | | | | |
| φ13.0 | KEIS-D 130-001 | φ17.5 | | | | | |
| φ16.0 | KEIS-D 160-001 | φ20.5 | | | | | |
| φ18.0 | KEIS-D 180-001 | φ22.5 | | | | | |
| φ20.0 | KEIS-D 200-001 | φ24.5 | | | | | |
| φ25.0 | KEIS-D 250-001 | φ31.5 | 5 | | | | |
| φ30.0 | KEIS-D 300-001 | φ35.5 | | | | | |

MOLD DEVICE FOR RESIN MOLDED ARTICLE, MOLDING APPARATUS, MOLDING SYSTEM, AND METHOD FOR MANUFACTURING MOLDED ARTICLE

TECHNICAL FIELD

The present invention relates to a foaming (blowing) agent used for obtaining a foam molded article, a method for manufacturing the foam-molded article, a method for coating the foam-molded article, and a method/device for manufacturing the foam-molded article which is used as a base material of them.

BACKGROUND ART

Patent Document 1 discloses a foam molding method where a molding material formed of a resin (plastic) and a foaming agent is injected into a mold in which an insert is arranged with a short-shot while forming a non-filling region and the molding material is filled into the non-filling region by expansion force of the foaming agent. The resin is made of a base material resin and a low-molecular weight resin which is a resin of the same kind as the base material resin and has a lower molecular weight than the base material resin.

Patent Document 2 describes a gas counter pressure method (abbreviation: GCP) as a method of suppressing swirl marks (abbreviation: SM) on the surface in the foam molding and describes a mold structure of the GCP. Patent Document 2 discloses to use an O-ring having a U-shape.

Patent Document 3 discloses a pretreatment conducted on a bumper used as a vehicle component. However, Patent Document 3 does not disclose a molded article which uses the GCP for smoothing the surface of the foam-molded article by the sodium bicarbonate or the foaming agent containing the sodium bicarbonate in the foam molding.

PRIOR ART DOCUMENTS

Patent Documents

[Patent document 1] Japanese Unexamined Patent Application Publication No. 08-103919
[Patent document 2] Japanese Unexamined Patent Application Publication No. 11-216748
[Document 3]
Yuichi YOSHIDA, "LOW POLLUTION SURFACE TREATMENT OF PLASTIC BUMPER" Journal of Japan Coating Technology Association, Vol. 27, No. 11, (1992), pages 505 (21)-511 (27)

DISCLOSURE OF THE INVENTION

Problems to be Solved by the Invention

The purpose of the present invention is to obtain the foam-molded article having an excellent surface and to apply a coating on the foam-molded article so that the coating film is sufficiently adhered to the foam-molded article.

Means for Solving Problem (Configuration of Embodiment 1)
In the first invention related to embodiment 1, a sealed mold is compressed with a pressure of 0.6 MPa or more, a foamable resin is filled into the sealed mold while keeping the compressed state, and the discharge of the compressed gas is started when the foamable resin is filled into a molding space by 90 volume % (volume percent, vol. %) or more.

(Operation of Embodiment 1)
In the first invention related to embodiment 1, when $L_1$, $L_2$ and $L_3$ are connected with different GCP devices as shown in FIG. 38, the compressed gas is initially discharged from $L_1$ or $L_3$ (generally, discharged from $L_1$ at first since the amount of the compressed gas is large) and then discharged from $L_2$. Thus, discoloration and scorch caused by adiabatic compression can be prevented.

When only one GCP device is connected with $L_1$, $L_2$ and $L_3$, the compressed gas is simultaneously discharged when the volume reaches 90 volume %.

(Effect of Embodiment 1)
In the first invention related to embodiment 1, the compressed gas is discharged when the foamable resin is filled into the molding space by 90 volume % or more. Thus, the foam-molded article can be manufactured without causing short mold, discoloration and scorch caused by the compressed gas.

(Explanation of Embodiment 1)
The amount of the gas inside the molding space is larger in the GCP than the normal molding by the amount of the pressure of the GCP. The compressed gas is effective for suppressing the foaming at the surface in the foam molding. However, the compressed gas may be obstacles when filling the foamable resin into the molding space and may cause short mold, discoloration and scorch. The compressed gas is transferred to the space other than the molding space by the force of filling the resin. Even when the compressed gas is discharged earlier before the foamable resin is fully filled into the molding space, the surface is foamed and the swirl marks are not formed depending on the shape of the product.

(Effect of Embodiment 2)
In the second invention related to embodiment 2, a sealed mold is compressed and a discharge of the compressed gas is started when a foamable resin is injected into a molding space.

(Operation of Embodiment 2)
In the second invention related to embodiment 2, since the discharge of the compressed gas is started after the molding space is fully filled (same volume as the molding space or more) with the foamable resin, the swirl marks can be eliminated and the foam-molded article having a smooth surface and excellent appearance can be obtained.

(Effect of Embodiment 2)
In the second invention related to embodiment 2, as for the timing of the discharge, since the discharge is started after the molding space is fully filled with the foamable resin, the swirl marks of the surface can be suppressed.

As for the timing of the discharge, the gas is discharged in the middle of (during) injecting the foamable resin into the molding space or after the molding space is fully filled with the foamable resin. Since the timing of the discharge varies depending on the shape of the molded article, the foam-molded article can be manufactured without causing swirl marks, short mold, discoloration and scorch.

(Explanation of Embodiment 2)
When $L_1$, $L_2$ and $L_3$ are connected with different GCP devices as shown in FIG. 38, the compressed gas is initially discharged from $L_1$ or $L_3$ (generally, discharged from $L_1$ at first since the amount of the compressed gas is large) and then discharged from $L_2$. The timing of the discharge is shifted. Since the compressed gas inside the molding space is pressed into other places ($L_1$, $L_3$, GCP device and hose of GCP) by the force of filling the resin, the pressure applied to the tip portion of the filled foamable resin is not increased so much. Consequently, the foam-molded article can be obtained without causing swirl marks and short mold. The operation of pressing the compressed gas inside the molding space to other place by the force of filling the resin is referred to as "transfer" in the present invention.

(Configuration of Embodiment 3)

In the third invention related to embodiment 3, as a means of increasing a foaming ratio of the foam-molded article, the mold is retreated by performing a mold-back or/and a core-back at the same time when the discharge of the gas of the GCP is started.

(Operation of Embodiment 3)

In the third invention related to embodiment 3, after the foam molding is performed for forming the smooth surface by using the GCP, the mold is retreated by performing the mold-back or/and the core-back before the inside is cooled and solidified. Thus, the molded article without having swirl marks and having smooth surface and high foaming ratio can be manufactured.

In addition, when the mold is retreated by performing the mold-back or/and the core-back at the same time (simultaneously) when the gas of the GCP is discharged, the raindrop can be also eliminated.

(Effect of Embodiment 3)

In the third invention related to embodiment 3, since the foam-molded article having high foaming ratio can be obtained, economic effects such as the reduction of the material cost can be obtained.

(Explanation of Embodiment 3)

In the third invention related to embodiment 3, the mold is retreated by performing the mold-back or/and the core-back at the same time when a discharge of the gas of the GCP is started. Thus, gas vent is formed by opening the PL in addition to the discharge (exhaust) valve of the GCP. Consequently, the compressed gas is discharged suddenly and the foam-molded article having an excellent outer appearance without having raindrop caused by the compressed gas can be obtained.

(Configuration of Embodiment 4)

The mold-back or/and core-back is performed at the fixed side of the mold.

(Operation of Embodiment 4)

The mold-back or/and core-back can be performed at the fixed side of the mold. Same as when performed at the mobile side, the foam-molded article having high foaming ratio can be obtained.

(Effect of Embodiment 4)

The mechanism of the mold can be simplified when the mold-back or/and core-back is performed at the fixed side due to the structure of the mold (e.g., a three-piece mold having a stripper plate).

(Explanation of Embodiment 4)

A mechanism such as a spring is added to the mold and a mechanism for retreating a die plate of a molding machine is provided so that the fixed side of the mold is retreated when opening the mold. In the present invention, "molding machine" mainly includes an injection molding machine and a machine capable of performing the process similar to the injection molding machine.

(Configuration of Embodiment 5)

In the fifth invention related to embodiment 5, a mechanism of retreating the die plate of the molding machine is provided on the mold and the molding machine so that both the mobile side and the fixed side of the mold are retreated for performing the mold-back or/and the core-back when opening the mold.

(Operation of Embodiment 5)

In the fifth invention related to embodiment 5, since the mold-back or/and the core-back is performed at the mobile side and the fixed side, the foaming ratio can be further increased.

(Effect of Embodiment 5)

In the fifth invention related to embodiment 5, since the mold-back or/and the core-back is performed at the mobile side and the fixed side, the molded article having higher foaming ratio can be obtained compared to the case where the mold-back or/and the core-back is performed only at one side.

(Explanation of Embodiment 5)

The mold-back or/and the core-back is performed at both the mobile side and the fixed side. Although the retreat can be performed at the same time, it is also possible to provide a time difference.

(Configuration of Embodiment 6)

The gas of the GCP is discharged and the sealed mold is evacuated at the same time when the mold-back or/and the core-back is performed. The compressed gas involved in a clearance between the resin in a molding space $L_2$ and the mold is evacuated.

(Operation of Embodiment 6)

In the sixth invention related to embodiment 6, the compressed gas entered between the resin and the mold is rapidly discharged in order to obtain the foam-molded article having an excellent outer appearance without having raindrop. The speed of discharging the gas can be further increased by further evacuating the compressed gas.

(Effect of Embodiment 6)

In the sixth invention related to embodiment 6, when the evacuation is performed at the same time when the mold-back or/and the core-back is performed, the transferability to the mold can be improved and the raindrop can be eliminated since the evacuation is performed before the surface layer of the molded article is cooled and solidified.

(Explanation of Embodiment 6)

In the sixth invention related to embodiment 6, the molded article without having raindrop can be obtained since the mold-back or/and the core-back is performed and the compressed gas entered in the clearance between the resin and the mold is evacuated after the gas of the GCP is discharged.

(Configuration of Embodiment 7)

The evacuation is performed with a delay time after the mold-back or/and the core-back.

(Operation of Embodiment 7)

Since the delay time of the evacuation is provided, the evacuation is performed after the gas of the mold is discharged enough.

(Effect of Embodiment 7)

The foam-molded article having an excellent outer appearance and high foaming ratio without having raindrop can be obtained since the evacuation is performed.

(Explanation of Embodiment 7)

In the seventh invention related to embodiment 7, the gas of the GCP is discharged, the mold-back or/and the core-back is performed, a gas vent is opened and the evacuation is performed. Since the mold is expanded and the gas vent is expanded, the effect of the evacuation is increased. In addition, since the evacuation is performed after the gas is discharged enough, the effect of the evacuation (pressure reduction) is large.

The evacuation device to be used can be small since the amount of the gas to be evacuated is small.

The foam-molded article having an excellent outer appearance without having raindrop can be obtained by the above described method even in a glossy surface without performing the embossing process.

(Configuration of Embodiment 8)

The evacuation is started at the same time when the discharge of the compressed gas in the sealed mold is started.

(Operation of Embodiment 8)

The raindrop caused by the compressed gas can be eliminated since the evacuation is performed.

(Effect of Embodiment 8)

The foam-molded article having an excellent outer appearance without having raindrop can be obtained since the evacuation is performed.

(Explanation of Embodiment 8)

In the eighth invention related to embodiment 8, the evacuation is performed at the same time when the gas of the GCP is discharged without performing the mold-back or/and the core-back. It is more preferable to perform embossing process on the surface of the mold in order to eliminating the raindrop and obtaining the molded article having an excellent outer appearance.

(Configuration of Embodiment 9)

The evacuation in the sealed mold and the GCP device is started with a delay time.

(Operation of embodiment 9)

The raindrop caused by the compressed gas can be eliminated since the evacuation is performed.

(Effect of Embodiment 9)

The foam-molded article having an excellent outer appearance without having raindrop can be obtained (Explanation of Embodiment 9)

The evacuation is performed with a delay time after the gas of the GCP is discharged. When the evacuation is performed as described in embodiment 6 to embodiment 9, the volume of the evacuation becomes smaller by using the mold structure of sealing the ejector pin as shown in FIG. 11 as the sealing structure of the mold. Thus, the operation and effect of the evacuation can be larger. When the evacuation is performed without performing the mold-back or the like and an excellent outer appearance without having raindrop is required, it is preferable to perform embossing process on the surface of the mold requiring an excellent outer appearance.

(Configuration of Embodiment 10)

In the tenth invention related to embodiment 10, programs for controlling and instructing the GCP device, the device of injecting gas, liquid or both gas and liquid into a heating cylinder, the hollow molding device for performing a hollow molding, the gas pressure molding device for performing a gas pressure molding and the like used for the foam molding are incorporated (installed) in the PLC of the molding machine.

(Operation of Embodiment 10)

The programs of connecting to the outside and performing the GCP device, the device of injecting liquid or the like, the device of the hollow molding and the gas pressure molding are written in the PLC of the molding machine. Thus, the operation of connecting and operating the devices is easy.

(Effect of Embodiment 10)

In the tenth invention related to embodiment 10, since the programs of the GCP device, the device of injecting liquid or the like, the device of the hollow molding and the gas pressure molding are written in the PLC of the molding machine, an externally connected controller is not required. Thus, an extra facility investment is not required.

(Explanation of Embodiment 10)

The programs for instructing the operations of the GCP device, the device of injecting liquid or the like, the device of the hollow molding and the gas pressure molding are written in the programs of the PLC of the molding machine.

(Configuration of Embodiment 11)

A start signal (e.g., completion signal of clamping the mold, LS signal attached to the mold) is sent when the mold is closed, and a gas compression valve (reference numeral 46) of the GCP device is opened and the mold is compressed by the gas. The time of the gas compression is preliminarily input in the programs incorporated in the PLC. The programs of sending the instruction to start injecting the foamable resin when the time is up are written in the PLC of the molding machine.

(Operation of Embodiment 11)

The operation (gas compression) of the GCP device is configured to be started by the programs incorporated in the PLC of the molding machine.

(Effect of Embodiment 11)

Another controller is not required for the operation of the GCP device, and the programs are incorporated in the PLC of the molding machine. Since the mold clamping is checked and the gas compression in the mold is controlled by the timer, another controller is not required and an operator does not have to move to a different place.

(Explanation of Embodiment 11)

The operation of the gas compression of the GCP device is incorporated in the PLC of the molding machine. The gas compression of the mold and the injection are started by the timer.

(Configuration of Embodiment 12)

The discharge of the compressed gas in the mold (opening of the valve of the reference numeral 51) is performed by the programs incorporated in the PLC of the molding machine.

(Operation of Embodiment 12)

The instruction of the operation (opening the valve and discharging the gas) for the GCP device is incorporated in the programs of the PLC of the molding machine.

(Effect of Embodiment 12)

In the twelfth invention related to embodiment 12, since the programs of the operation of the GCP device are incorporated in the PLC of the molding machine, the operator can check and operate the content of the programs in the same screen only.

(Explanation of Embodiment 12)

The operation of discharging the gas in the mold (operation of opening the valve of the reference numeral 51) is performed by the programs incorporated in the PLC of the molding machine.

Another controller for sending the instruction of the operation to the GCP device is not newly required. Thus, an extra facility investment is not required.

(Configuration of Embodiment 13)

The programs for making the molding machine perform the mold-back or/and the core-back after the compressed gas is discharged are incorporated in the PLC of the molding machine.

(Operation of Embodiment 13)

Since the programs for making the molding machine perform the operation of the GCP device and the mold-back or/and the core-back are incorporated in the PLC of the molding machine, these operations are performed by the instruction from the molding machine.

(Effect of Embodiment 13)

In the thirteenth invention related to embodiment 13, the program of the mold-back or/and the core-back is incorporated in the PLC of the molding machine. A controller is not required separately.

(Explanation of Embodiment 13)

The programs for making the molding machine perform the operation of the GCP device and the mold-back or/and the core-back are incorporated in the PLC of the molding machine and the foam molding is performed by the programs.

(Configuration of Embodiment 14)

The programs for making the molding machine perform the evacuation after the compressed gas is discharged and then perform the mold-back or/and the core-back are incorporated in the PLC of the molding machine (Operation of Embodiment 14)

After the operation of the GCP device and the mold-back or/and the core-back, the evacuation is performed by the instruction from the PLC of the molding machine.

(Effect of Embodiment 14)

In the fourteenth invention related to embodiment 14, the programs for making the molding machine perform the evacuation after the mold-back or/and the core-back is performed are incorporated in the PLC of the molding machine. Another special controller is not required.

(Explanation of Embodiment 14)

The programs for the operation of the GCP device, the mold-back or/and the core-back and the evacuation are incorporated in the PLC of the molding machine and the foam molding is performed by the programs.

(Configuration of Embodiment 15)

In the fifteenth invention related to embodiment 15, an L/D ratio (a value obtained by dividing the length by the diameter) of a screw housed in the heating cylinder of the molding machine used for the foam molding is 15 or more.

(Operation of Embodiment 15)

In the fifteenth invention related to embodiment 15, the screw having the L/D ratio of 15 or more is used for plasticizing the resin so that the foaming gas is dissolved by pressure (compressed dissolution) and finely dispersed in the resin.

(Effect of Embodiment 15)

In the fifteenth invention related to embodiment 15, since the screw has high kneading property with the L/D ratio of 15 or more, the foaming gas can be optimally dissolved by pressure and finely dispersed in the plasticized resin.

(Explanation of Embodiment 15)

In the foam molding, high kneading property is required for dissolving the foaming gas by pressure (compressed dissolution) and finely dispersing the foaming gas in the molten resin entered in the heating cylinder in the stage of the plasticization and measurement. When the screw has high kneading property with the L/D ratio of 15 or more and a double flight screw is used or/and a Dulmage (dulmage screw) is provided to obtain high kneading property, the foaming gas is sufficiently dissolved by pressure and finely dispersed. Thus, the obtained foam-molded article has fine foam cells.

(Configuration of Embodiment 16)

In the sixteenth invention related to embodiment 16, since high back pressure is applied during the plasticization process, the foaming gas is dissolved by pressure and finely dispersed. In the foam molding, the back pressure applied to the plasticated molten resin in the heating cylinder during the plasticization process is preferably 5 MPa or more.

(Operation of Embodiment 16)

Since the plasticization (melt-kneading, measurement) is performed by applying high back pressure of 5 MPa or more, the foaming gas is evenly dissolved by pressure and the evenly and finely dispersed foamable resin can be obtained.

(Effect of Embodiment 16)

Since the resin is measured, heated, melted and plasticized while high back pressure of 5 MPa is applied, the foaming gas is evenly dissolved by pressure and finely dispersed in the resin melted in the heating cylinder and the foamable resin having the foaming properties suitable for the foam molding can be obtained.

(Explanation of Embodiment 16)

The resin is plasticized while high back pressure of approximately 5 MPa is applied. At that time, drooling occurs from the nozzle. Thus, a shut-off nozzle or the like is attached to the nozzle.

It is enough if the measurement is finished before the next injection (filling). When the measurement is finished in advance, concentration of the foaming gas starts in the heating cylinder. Thus, the measurement may be delayed in some cases.

The back pressure may be continuously applied even after the measurement is finished in some cases (back pressure blocking).

(Configuration of Embodiment 17)

A suck back is performed by providing a delay time immediately after the foamable resin is filled into the molding space for reducing the pressure of the foamable resin filled into the molding space.

(Operation of Embodiment 17)

Since the suck back is performed, the pressure of the resin filled into the molding space suddenly decreases and the foaming can be easier.

(Effect of Embodiment 17)

The foaming ratio can be increased by the suck back. The foam-molded article having high foaming ratio can be obtained.

(Explanation of Embodiment 17)

The pressure of the foamable resin filled into the molding space is reduced by the suck back. Thus, the foaming can be easier. The pressure of I-GCP can be also reduced and the internal foaming portion can be larger.

(Configuration of Embodiment 18)

A breezing is performed by providing a delay time immediately after the foamable resin is filled into the molding space for reducing the pressure of the foamable resin filled into the molding space.

(Operation of Embodiment 18)

Since the breezing is performed, the pressure of molten resin suddenly decreases and the foaming can be easier.

(Effect of Embodiment 18)

The foaming ratio can be increased by the breezing.

(Explanation of Embodiment 18)

The pressure of the foamable resin filled into the molding space is reduced by the breezing and the foaming can be easier. It is also possible that both the breezing and the suck back are performed. The pressure of I-GCP can be also reduced and the internal foaming portion can be larger.

(Configuration of Embodiment 19)

Polyhydric alcohol is used for adjusting the temperature of the mold since the polyhydric alcohol has high boiling point, has no toxicity and easily washed by water. When heating the polyhydric alcohol, metal balls, metal powder or the like inside is heated by induction (electromagnetic induction) and the liquid is further heated by the temperature of them.

(Operation of Embodiment 19)

The heating means using the induction heating is shown. The liquid having a large heat capacity is used.

(Effect of Embodiment 19)

When the heated steam is used, the highest temperature to be obtained is approximately 130° C. even if it is compressed and the heat capacity is small. On the other hand, when the polyhydric alcohol is used, the heat capacity is large since it is liquid. The boiling point of the glycerin, which is the polyhydric alcohol, is high and the glycerin is excellent in usability.

(Explanation of Embodiment 19)

In the foam molding using the GCP, if the temperature of the surface of the mold is raised, the raindrop increases. On the other hand, when the temperature of the surface of the mold is raised, a skin layer (non-foam layer located at the surface) becomes thin, mold transferability becomes high, and an outer appearance becomes better. However, the raindrop occurs a lot. Accordingly, when the compressed gas is discharged (exhausted), the mold-back, the core-back or the like is performed and the evacuation is performed. Thus, the raindrop can be eliminated even when the temperature of the surface of the mold is high. By using the above described method, even when the compound material containing glass fiber is used, the foam-molded article of the compound material having an excellent outer appearance can be manufactured while reducing or preventing the floating of the glass fiber by raising the temperature of the surface of the mold to the glass transition point (Tg) or more during the molding process.

(Configuration of Embodiment 20)

In the twentieth invention related to embodiment 20, a masterbatch of a foaming agent is composed of a resin to be foam molded, a powder of the foaming agent, and a varnish having compatibility (miscibility) with the resin to be foam molded, and the foaming agent is carried on a surface of a pellet of the resin to be foam molded using the varnish.

(Operation of Embodiment 20)

In the conventional method for manufacturing the masterbatch of the foaming agent, the masterbatch of the foaming agent is manufactured by heating and melting the resin to be molded, entering the powder of the foaming agent into it and melt-kneading it. However, it is difficult to manufacture the masterbatch in some kinds of the resin when the melting temperature of the resin is higher than the decomposition temperature (pyrolysis temperature) of the foaming agent.

In the twentieth invention related to embodiment 20, the foaming agent is carried on the surface of the pellet using the varnish having compatibility (miscibility) with the resin to be foamed. In this method, the temperature for carrying the foaming agent is low (it is enough if the solvent included in the varnish is vaporized and the powder of the foaming agent is dried on the surface of the pellet). Thus, the masterbatch of the foaming agent can be manufactured regardless of the melting temperature of the resin to be molded.

(Effect of Embodiment 20)

In the twentieth invention related to embodiment 20, since the resin is not melted by heating, the resin is not thermally deteriorated. Heat energy required for the manufacturing is reduced. Economical effect can be expected. For example, large scale equipment (e.g., device and place) is not required.

(Explanation of Embodiment 20)

In the conventional method for manufacturing the masterbatch of the foaming agent, a carrier resin of the masterbatch is heated and melted by an extruder, a kneader or the like and the foaming agent is entered in it to form the pellet. However, it is difficult to use the above described manufacturing method of melt-kneading when the melting temperature of the resin is higher than the decomposition temperature of the foaming agent. In the third invention related to embodiment 3, the pellet (the property can be a bulk without being limited to the pellet) of the resin and the powder of the foaming agent are mixed with each other and the varnish having compatibility (miscibility) with the resin to be foam molded is entered in the mixture little by little while heating the mixture to vaporize the solvent included in the varnish. Thus, the powder of the foaming agent is carried on the surface of the pellet (adhered by the resin included in the varnish). Since the resin is not melted and heated, the resin is not thermally deteriorated and the masterbatch can be manufactured while the foaming agent does not exceed the decomposition temperature and the foaming agent is not decomposed at all when it is foamed. The masterbatch can be manufactured at low cost by a device having small and simple-structure such as a rocking mixer as shown in an example without requiring large scale equipment. It is preferable that the masterbatch of the foaming agent, the masterbatch of the foaming auxiliary, the masterbatch of the foaming nucleating agent and the like are separately prepared and mixing them at an optimum blending ratio. However, the masterbatch of the foaming agent can be also easily manufactured by simultaneously mixing the foaming agent, the foaming auxiliary, the foaming nucleating agent and the like. In addition, different from the conventional melt-kneading means, the masterbatch of the foaming agent having high concentration can be manufactured. Of course, a large amount of the powder of the foaming agent is carried when the carrying process is repeated.

(Configuration of Embodiment 21)

In the twenty-first invention related to embodiment 21, when the resin to be foam molded is an AS, an ABS or a resin composed mainly thereof, the varnish used for manufacturing the masterbatch of the foaming agent is formed by dissolving the AS or the ABS by using homogeneous organic solvent such as MEK and adding a toluene if required. The masterbatch of the foaming agent is manufactured by carrying the powder of the foaming agent on the pellet such as the AS and the ABS using the above described varnish.

(Operation of Embodiment 21)

In the twenty-first invention related to embodiment 21, since the varnish used for manufacturing the masterbatch of the foaming agent is composed of the AS included in the resin to be foam molded or the ABS included in the resin to be foam molded, different material is not included in the foam-molded article. Thus, the problem of the deterioration in physical properties can be eliminated.

(Operation of Embodiment 21)

In the twenty-first invention related to embodiment 21, when manufacturing the masterbatch of the foaming agent, the resin to be foam molded is the AS, the ABS or a resin composed mainly thereof and the varnish of the AS and the ABS having compatibility (miscibility) with them is used. Thus, there is no problem of the deterioration in physical properties caused by containing the different material. Since the varnish of the AS and the ABS can be easily manufactured at low cost, the masterbatch of the foaming agent manufactured by using this material is also low cost. Thus, the manufacturing cost of the foam-molded article is not raised.

(Explanation of Embodiment 21)

In the twenty-first invention related to embodiment 21, the varnish is manufactured by dissolving the AS or the ABS in the solvent. The powder of the foaming agent is carried on the surface of the pellet of the AS and the ABS using the above described varnish.

Since the AS and the ABS are easily dissolved in the solvent, the surface foaming agent of the pellet of the AS and the ABS can be also carried by entering an organic solvent (e.g., only MEK) and mixing the pellet of the AS and the ABS with the powder of the foaming agent without using the varnish.

(Configuration of Embodiment 22)

In the twenty-second invention related to embodiment 22, the varnish formed by dissolving the AS and the ABS is formed as an emulsion or a suspension.

(Operation of Embodiment 22)

In the twenty-second invention related to embodiment 22, since the emulsion or the suspension is used, odor of the solvent can be suppressed and working environment is not deteriorated.

(Effect of Embodiment 22)

In the twenty-second invention related to embodiment 22, since the emulsion or the suspension is used, working environment is not deteriorated. Thus, environmentally friendly manufacturing method complying with VOC Regulation in Europe can be provided, for example.

(Explanation of Embodiment 22)

The above described twenty-first invention uses the varnish dissolved by the solvent. When using the solvent, consideration is needed when operating the solvent since the solvent has a risk of ignition and strong odor.

In the twenty-second invention related to embodiment 22, the varnish is manufactured using a little amount of solvent and formed as an emulsion or a suspension using water and the like. Thus, the varnish is used as the material of carrying the powder of the foaming agent on the surface of the pellet of the resin to be foam molded. In addition, the varnish formed as the emulsion or the suspension can be simultaneously used with the varnish dissolved by the solvent in the twenty-second invention.

The masterbatch of the foaming agent described in the embodiment 4 or the embodiment 5 can be used for AAS, ASA, AES and ACS in addition to the AS and the ABS. Of course, the varnish can be formed by using the above described AAS and other materials.

(Configuration of Embodiment 23)

In the twenty-third invention related to embodiment 23, since the resin to be foam molded used in the fourth invention is changed from the AS and the ABS to the PS, the HIPS and the modified PPO (modified PPE), the varnish to be used is also changed to the PS and the HIPS which have compatibility (miscibility) with them.

(Operation of Embodiment 23)

In the twenty-third invention related to embodiment 23, similar to the case of using the AS and the ABS, the PS and the HIPS having compatibility (miscibility) with the resin to be foam molded is dissolved in the organic solvent such as MEK to form the varnish. Thus, the masterbatch of the foaming agent can be manufactured easily at low cost.

(Effect of Embodiment 23)

In the twenty-third invention related to embodiment 23, the resin to be foam molded is the PS, the HIPS and the modified PPO (modified PPE), and the carrier resin (actually the pellet) of the masterbatch of the foaming agent is the PS and HIPS. Thus, the resin to be form molded (i.e., PS and HIPS) and the resin forming the masterbatch (i.e., PS and HIPS) is homogeneous with PS and HIPS or has enough compatibility (miscibility) with the modified PPO (modified PPE). When the modified PPO (modified PPE) is used for the resin to be foam molded and the deterioration in physical properties is concerned, it is possible to use the modified PPO (modified PPE) for manufacturing the masterbatch of the foaming agent.

(Explanation of Embodiment 23)

In the twenty-third invention related to embodiment 23, when the resin to be foam molded is PS, HIPS or a polymer blend/polymer alloy formed by mixing PS or/and HIPS with the modified PPO (modified PPE), the masterbatch of the foaming agent is manufactured by carrying the above described resin using the varnish of the PS or the HIPS which is homogeneous with the above described resin or has compatibility (miscibility) with the above described resin.

(Configuration of Embodiment 24)

In the twenty-fourth invention related to embodiment 24, the masterbatch of the foaming agent used for the foam molding of the PS, the HIPS or the modified PPO (modified PPE) is formed by dissolving the PS or the HIPS which has compatibility (miscibility) with the pellet to be foam molded and the resin to be foam molded in the solvent to form an emulsion or a suspension. Thus, the foaming agent is carried on the pellet of the PS, the HIPS or the modified PPO (modified PPE) to be foam molded.

(Operation of Embodiment 24)

In the twenty-fourth invention related to embodiment 24, when manufacturing the masterbatch of the foaming agent to be used, the varnish of the resin having compatibility (miscibility) with the resin to be foam molded is formed as an emulsion or a suspension. Thus, the working environment is not deteriorated as an effect, for example.

(Effect of Embodiment 24)

In the twenty-fourth invention related to embodiment 24, since the masterbatch of the foaming agent is manufactured by using the emulsion or the suspension, the solvent to be used can be reduced compared to the case of using the varnish. Thus, the working environment is not deteriorated as an effect. The emulsion or the suspension has less risk of ignition and firing compared to the solvent-based material. Thus, work can be safely performed.

(Explanation of Embodiment 24)

In the twenty-fourth invention related to embodiment 24, the resin to be foam molded is the PS, the HIPS or the modified PPO (modified PPE) and the PS or the HIPS is preliminarily dissolved in the solvent and an emulsion or a suspension is formed by using an emulsifier if required.

Since the powder of the foaming agent is carried on the surface of the pellet of the PS, the HIPS or the modified PPO (modified PPE) by using the above described solution, the solvent to be used can be reduced.

(Configuration of Embodiment 25)

In the twenty-fifth invention related to embodiment 25, a varnish of an acrylic resin or a styrene-modified acrylic resin is used for carrying the powder of the foaming agent where the acrylic resin and the styrene-modified acrylic resin have compatibility (miscibility) with a styrenic resin which is used for manufacturing a coating material.

(Operation of Embodiment 25)

In the twenty-fifth invention related to embodiment 25, the acrylic resin or the styrene-modified acrylic resin contained in the varnish has compatibility (miscibility) with the styrenic resin such as the AS, ABS, PS, HIPS and the modified PPO (modified PPE).

(Effect of Embodiment 25)

In the twenty-fifth invention related to embodiment 25, the acrylic resin or the styrene-modified acrylic resin which is a main component of the varnish to be used has compatibility (miscibility) with each of the AS, the ABS, the PS, the HIPS and the modified PPO (modified PPE). It is enough to prepare only one kind of varnish used for manufacturing the masterbatch of the foaming agent. Thus, a commercially available coating material can be diverted economically.
(Explanation of Embodiment 25)

In the twenty-fifth invention related to embodiment 25, a commercially available material for manufacturing a coating material of plastic can be used for the varnish for manufacturing the masterbatch of the foaming agent, for example. The above described material can be easily carried by using a rocking mixer as shown as an example.

As for the varnish to be used, a simple varnish containing only the acrylic resin and/or the styrene-modified acrylic resin is preferable. When CAB (cellulose acetate propionate) or nitrocellulose is contained in the varnish, the varnish containing the nitrocellulose cannot be used although the varnish containing the CAB can be used. The nitrocellulose is not preferable because discoloration occurs during the foam molding process due to the nitrocellulose. The discoloration does not occur in case of the CAB.
(Configuration of Embodiment 26)

In the twenty-sixth invention related to embodiment 26, the varnish of the acrylic resin or the styrene-modified acrylic resin used for manufacturing the masterbatch of the foaming agent is an emulsion or a suspension and the masterbatch of the foaming agent is manufactured by the varnish.
(Operation of Embodiment 26)

In the twenty-sixth invention related to embodiment 26, since varnish of an emulsion or a suspension is used, the working environment can be improved.
(Effect of Embodiment 26)

In the twenty-sixth invention related to embodiment 26, since the varnish of the acrylic resin or the styrene-modified acrylic resin to be used is an emulsion or a suspension, odor can be suppressed when manufacturing the masterbatch of the foaming agent. Consequently, the working environment is not deteriorated as an effect.

The emulsion or the suspension has less risk of ignition and firing compared to the solvent-based material. Thus, the operation can be safely performed.
(Explanation of Embodiment 9)
(Explanation of Embodiment 26)

In the twenty-sixth invention related to embodiment 26, the varnish of the acrylic resin or the styrene-modified acrylic resin to be used for manufacturing the masterbatch of the foaming agent is an emulsion or a suspension. Since the acrylic resin and the styrene-modified acrylic resin have compatibility (miscibility) with the styrenic resin such as PS, HIPS, the modified PPO (modified PPE), AS and ABS, it is not necessary to prepare a large amount of varnish during the operation.

An emulsifier is used for forming the emulsion or the suspension. However, it is not required to pursue the performance of a coating material or a coating film. The purpose can be achieved enough if the varnish is merely adhered to the surface of the pellet or the like before the foam molding, and the varnish can be easily handled and easily mixed. Thus, the varnish without an emulsifier can be sufficiently used.
(Configuration of Embodiment 27)

The manufacturing method of the masterbatch of the foaming agent for the PP is shown. The PP has high chemical resistance and there are a few solvents which can dissolve the PP as a simple substance. For making the PP soluble in the solvent, the PP should be acid-modified.

In the twenty-seventh invention related to embodiment 27, the varnish of the acid-modified PP is used for manufacturing the masterbatch of the foaming agent of PP. Similar to the case of manufacturing the masterbatch of the foaming agent of the above described styrenic resin such as HIPS and ABS, the powder of the foaming agent is carried on the surface of the pellet of the PP to be foam molded using the varnish of the acid-modified PP.
(Operation of Embodiment 27)

In the twenty-seventh invention related to embodiment 27, the acid-modified PP has compatibility (miscibility) with the PP to be foam molded. When the varnish of the acid-modified PP is used for manufacturing the masterbatch of the foaming agent and the foam molding is performed by using it, the acid-modified PP has compatibility (miscibility) with the PP and is finely dispersed in the PP to have a sea-island structure. Thus, the acid-modified PP does not affect the physical properties of the PP resin almost at all.
(Effect of Embodiment 27)

In the twenty-seventh invention related to embodiment 27, the acid-modified PP having compatibility (miscibility) with the PP to be foam molded is used, both of them are molten in the heating and melting stage of the molding and the acid-modified PP is finely dispersed in the PP to have sea-island structure. Thus, the acid-modified PP does not affect the physical properties of the PP almost at all and the foam molding of the PP is possible.
(Explanation of Embodiment 27)

The twenty-seventh invention related to embodiment 27 relates to the manufacturing of the masterbatch of the foaming agent for the PP. In a commercially available masterbatch of the foaming agent for the PP, a carrier resin is PE. Therefore, even when the foam-molded article having an excellent outer appearance without having swirl marks was manufactured by using the GCP, silver streak occurred near the gate or the like due to the PE (shown in FIG. 1).

However, the melting temperature of the PP is higher than the melting temperature of the PE by approximately 20° C. or more. Thus, even when the PP is molten and the powder of the foaming agent such as hydrogen carbonate, ADCA and HDCA is tried to be kneaded, the foaming agent is pyrolyzed in the process of melt kneading. Consequently, when the pellet is formed, the foaming agent inside the pellet has already lost the function of the foaming agent. Similar to the above described case of the HIPS and the ABS, the powder of the foaming agent can be easily carried on the pellet of the PP to be foam molded by using the varnish of the acid-modified PP (e.g., maleic acid-modified) having compatibility (miscibility) with the PP. The above described varnish is frequently used for an adhesive agent of the PP and a primer when coating is applied to the molded article. Accordingly, the masterbatch of the foaming agent for the PP can be easily manufactured.

Furthermore, since the resin is not heated and molten, the PP is not thermally deteriorated by a heat history.
(Configuration of Embodiment 28)

In embodiment 27, the varnish of the acid-modified PP (the solvent-based material, the material formed by dissolving the acid-modified PP using the solvent) is used for manufacturing the masterbatch of the foaming agent for the PP. In the twenty-eighth invention related to embodiment 28, the varnish (the material formed by dissolving the acid-modified PP using the solvent) is used as an emulsion or a suspension.

(Operation of Embodiment 28)

In the twenty-eighth invention related to embodiment 28, the varnish is used as an emulsion or a suspension for reducing use amount of the solvent.

Since an acid-modified emulsion or an acid-modified suspension has the function of the adhesive agent for the PP, it has enough function for carrying the powder of the foaming agent on the surface of the pellet of the PP.

(Effect of Embodiment 28)

In the twenty-eighth invention related to embodiment 28, the emulsion or the suspension using small amount of solvent is used, the working environment is not deteriorated and there is less risk of ignition and firing. Thus, the masterbatch of the foaming agent for the PP can be manufactured safely.

(Explanation of Embodiment 28)

In the twenty-eighth invention related to embodiment 28, the foaming agent is carried on the surface of the PP using the emulsion or the suspension of the acid-modified PP when manufacturing the masterbatch of the foaming agent for the PP.

Since the acid-modified PP has compatibility (miscibility) with the PP to be foam molded, the masterbatch of the foaming agent for the PP can be manufactured. Similar to the above described embodiment 27, the acid-modified PP does not affect the physical properties of the PP resin almost at all even when the acid-modified PP is included in the PP. It was confirmed in the experiment of the present invention (the foam molding using the foaming agent carried on the pellet of the PP by using the acid-modified PP) that the acid-modified PP had high thermal stability and did not cause discoloration and scorch of the resin even when the acid-modified PP was mixed with the PP and the foam molding was performed.

(Configuration of Embodiment 29)

The twenty-ninth invention related to embodiment 29 is the masterbatch of the foaming agent used for the foam molding, wherein the foaming agent is composed only of the powder of the foaming agent and the varnish having compatibility (miscibility) with the resin to be foam molded.

(Operation of Embodiment 29)

In the twenty-ninth invention related to embodiment 29, instead of carrying the powder of the foaming agent on the surface of the pellet, a small amount of the powder of the foaming agent is entered into a rocking mixer or the like at first, and then the mixture (property: liquid) of the varnish and the powder of the foaming agent is gradually added while heating them. Consequently, the powder of the foaming agent entered at first becomes a core and the mixture of the foaming agent and the resin component inside the varnish grows to form pellets.

(Effect of Embodiment 29)

In the twenty-ninth invention related to embodiment 29, the masterbatch of foaming agent can be manufactured by pelletization. Thus, the concentration (amount of the foaming agent included in the masterbatch) of the foaming agent is high. When the acrylic resin or the styrene-modified acrylic resin is used for the varnish, the masterbatch of the foaming agent can be used any kinds of styrenic resin such as HIPS and ABS.

(Explanation of Embodiment 29)

The powder of the foaming agent is difficult to handle. When the powder of the foaming agent is pelletized by using a small amount of varnish, handling is facilitated. In addition, different from the conventional method, the melt-kneading is not performed. Thus, the masterbatch containing the foaming agent at high concentration can be easily manufactured.

(Configuration of Embodiment 30)

In the thirtieth invention related to embodiment 30, the powder of the foaming agent and the resin to be foam molded or the powder of resin component are pelletized by using the varnish.

(Operation of Embodiment 30)

In the thirtieth invention related to embodiment 30, the pelletization is performed by using the powder of the foaming agent, the varnish and the powder of the resin to be foam molded or/and the powder of the resin having compatibility (miscibility) with the resin to be foam molded. For example, the masterbatch of the foaming agent for the ABS can be easily manufactured by mixing a blend polymer of the AS and a graft copolymer formed by graft-copolymerizing A (Acrylonitrile) and S (Styrene) to Butadiene with the powder of the foaming agent by using the powder of the AS and pelletizing the mixture by using the varnish. When the target is limited to the AS and the PS, they have solubility to the solvent. Thus, the pelletization can be performed without using the varnish by entering the powder of the AS or the PS and the powder of the foaming agent into the rocking mixer, mixing them and spraying MEK, for example.

In addition, the masterbatch of the foaming agent can be also manufactured by, for example, entering the pellet of the AS or the PS, entering the powder of the foaming agent and spraying MEK since the surface of the AS and the PS is melted by the MEK.

(Effect of Embodiment 30)

In the thirtieth invention related to embodiment 30, compared to the conventional melt-kneading method, the masterbatch of the foaming agent containing the foaming agent having high concentration can be manufactured.

(Explanation of Embodiment 30)

The thirtieth invention related to embodiment 30 is the masterbatch of the foaming agent manufactured by stirring the powder of the foaming agent and the powder of the resin and spraying the solvent or the varnish while the mixture is agitated by the rocking mixer or the like to form the pellets.

(Configuration of Embodiment 31)

In the thirty-first invention related to embodiment 31, the powder of the foaming agent, the powder of the foaming auxiliary, the powder of the foaming nucleating agent, the powder of the pigment and the dye and the like are separately carried on the pellet of the resin to be foam molded and the pellets carrying the above described materials are mixed with the pellet of the resin to be foam molded.

(Operation of Embodiment 31)

In the thirty-first invention related to embodiment 31, the pellets or the like carrying the above described materials (and the pelletized materials) are mixed and used at the optimum adding amount. Thus, the adding amount of each of the materials can be optimized.

(Effect of Embodiment 31)

In the thirty-first invention related to embodiment 31, since the pellets or the like carrying the material of the powder having different properties are mixed at the optimum compounding ratio. Thus, economical effect, stability and improvement in quality can be expected. For example, excess amount of the material is not added, and the compounding ratio can be easily changed.

(Explanation of Embodiment 31)

In the thirty-first invention related to embodiment 31, each of the masterbatch is manufactured by using the varnish, the solvent and the like explained in the present invention and optimum amount of the masterbatch is added for performing the foam molding.

The pellet of the resin to be foam molded is not used and the acrylic resin and the styrene-modified acrylic resin have compatibility (miscibility) with the HIPS, the ABS and the like. Thus, the number of the resins to be used can be reduced by using the masterbatch of the foaming agent granulated by using the acrylic resin or the styrene-modified acrylic resin.

The masterbatch for the PP containing the foaming agent having high concentration can be manufactured by the same method using the varnish of the acid-modified PP.

(Configuration of Embodiment 32)

The thirty-second invention related to embodiment 32 is the foam-molded article on which a coating is applied for increasing the decorative properties, wherein the foaming agent to be used does not deteriorate the adherability and the adhesiveness of the coating film. The ADCA and the HDCA which is an organic foaming agent not causing the problems, and water, alcohol and ether without generating the foam residue which affects the adherability and the adhesiveness of the coating film are used, for example.

(Operation of Embodiment 32)

In the thirty-second invention related to embodiment 32, the foaming agent to be used is selected from the substance that does not generate the foam residue or the substance that generates the foam residue but the foam residue does not affect the adherability and the adhesiveness of the coating film. Thus, the problems of the adherability and the adhesiveness of the coating film do not occur.

(Effect of Embodiment 32)

In the thirty-second invention related to embodiment 32, the foaming agent to be used does not affect the adherability and the adhesiveness of the coating film. Therefore, the coating can be easily started only by removing dust adhered to the surface by air blow or the like and removing oil and fat or the like by wiping with alcohol or the like without performing troublesome pre-treatment (cleaning) to remove the foam residue. Thus, the effect of simplifying the process of the coating can be obtained.

(Explanation of Embodiment 32)

The foaming agent used for the foam molding is pyrolyzed in the heating cylinder, and the foaming gas is generated, dissolved into the molten resin in the heating cylinder by pressure and finely dispersed in the molten resin. Thus, foaming properties are given to the molten resin. However, the pyrolysis residue of the foaming agent enters into the resin to which the foaming properties are given. The foam residue is recognized on the surface of the foam-molded article into which the residue of the foaming agent is entered. When the coating is performed without removing the foam residue and a salt water spray test, a salt water immersion test, a humidity resistance test, a water resistance test or the like is performed, blister and peeling occur on the coating film due to the foam residue. Thus, the foam-molded article cannot withstand use.

When the azo-based material such as the ADCA and the HDCA was used for the foaming agent, it was confirmed from the experiment that the residue did not affect the adherability and the adhesiveness of the coating film. Thus, the foaming agent of the azo-based material such as the ADCA or the HDCA is suitable for manufacturing the foam-molded article including the coating process.

The boiling point of the water is 100° C. and the boiling point of the ethanol is approximately 80° C. When the volume (amount) of the water or the ethanol is measured and entered into the molten resin in the heating cylinder during the measurement (plasticization) process, the water or the ethanol is evaporated by the heat of the heating cylinder and the temperature of the molten resin, melted in the molten resin and dispersed in the molten resin. Thus, the foaming properties are given. However, the alcohol and above described materials are entirely evaporated. Thus, no residue remains. When the above described liquids are used as the foaming agent, the problems of the adherability and the adhesiveness of the coating film caused by the residue of the foaming agent can be solved.

(Configuration of Embodiment 33)

In the thirty-third invention related to embodiment 33, when hydrogen carbonate (e.g., sodium bicarbonate) is used for the foaming agent, undecomposed hydrogen carbonate becomes the foam residue as the foam residue of the carbonate (the sodium carbonate in case of the sodium bicarbonate). If the coating is applied in this state, blister and peeling of the coating film occur due to the foam residue existing on the front surface. Therefore, the foam residue and the like should be removed by using an acidic substance beforehand.

(Operation of Embodiment 32)

In the thirty-second invention related to embodiment 32, since the carbonate and the hydrogen carbonate are alkaline substances, they are neutralized and easily dissolved when they are contacted with the acidic substance.

When the above described hydrogen carbonate is used for the foaming agent for forming the foam-molded article, sufficient adherability and the adhesiveness of the coating film can be obtained by performing the acid cleaning or the like.

(Effect of Embodiment 32)

In the thirty-second invention related to embodiment 32, the hydrogen carbonate used as the foaming agent is cheap, the foaming gas to be generated is carbonic acid gas and water vapor, the foam cells to be formed is fine, and stable foam-molded article can be obtained. The effect of obtaining enough adherability and adhesiveness of the coating film can be expected by performing the acid cleaning of the molded article.

(Explanation of Embodiment 32)

The hydrogen carbonate is frequently used as the foaming agent. However, when the coating is performed on the foam-molded article on which the undecomposed hydrogen carbonate appears on the surface as the foam residue, the adherability and the adhesiveness of the coating film is deteriorated. When the evaluation test (e.g., JIS K5600-7-1) of the coating film is performed, blister and peeling occurs. Thus, the foam-molded article cannot withstand use. The carbonate and the hydrogen carbonate can be easily removed (dissolved) by immersing the foam-molded article in the weak acid solution or wiping the foam-molded article with the cloth or the like impregnated with weak acid. Enough adherability and the adhesiveness of the coating film can be obtained by washing the foam-molded article with water as required after the acid cleaning, drying it and then performing the coating.

It is enough if the pH of the acid used for the acid cleaning is approximately 6. When the temperature of the solution for cleaning the acid is high (40° C. or more), oils and fats can be removed at the same time. It is more effective to add an ultrasonic oscillator (plate) in the cleaning liquid. It is also possible to add a valve ring.

BRIEF DESCRIPTION OF THE DRAWINGS

FIG. 11 is a schematic diagram showing a mold structure for foam molding where ejector pins are sealed by a loaded O-ring or the like.

In FIG. 13, $L_1$ is a space of an ejector box, $L_2$ is a space of a molding space and $L_3$ is a space formed on the bottom of a nested element of the fixed side.

In FIG. 14, $L_1$ is a space formed on the bottom of a nested element of the mobile side, $L_2$ is a space of a molding space and $L_3$ is a space formed on the bottom of the nested element of the fixed side. The function of $L_1$ shown in FIG. 14 corresponds to that of $L_2$ of the ejector box shown in FIG. 13.

FIG. 36 also shows the shape (dimensions of the housing) of the lower hole and the like related to the diameter of the ejector pin. FIG. 36 relates to FIG. 48.

FIG. 42 is a drawing (table) showing combinations of a resin, a masterbatch of a foaming agent and a masterbatch of a foaming nucleating agent.

FIG. 43 is a drawing (table) showing observations of an outer appearance and inside when the GCP is not used.

FIG. 44 is a drawing (table) showing observations of an outer appearance and inside when the GCP is used.

FIG. 45 is a drawing (table) showing the evaluation result of the adherability of the coating film.

FIG. 46 is a drawing (table) showing the evaluation result of the adherability of the coating film.

FIG. 47 is a drawing (table) showing the evaluation result of the adherability of the coating film.

FIG. 48 is a drawing (table) showing detailed dimensions and the like when single acting (single loaded) O-ring is attached in a state that the load is applied on one side, for example.

MODES FOR CARRYING OUT THE INVENTION

Definition of Terms

Figure 1:
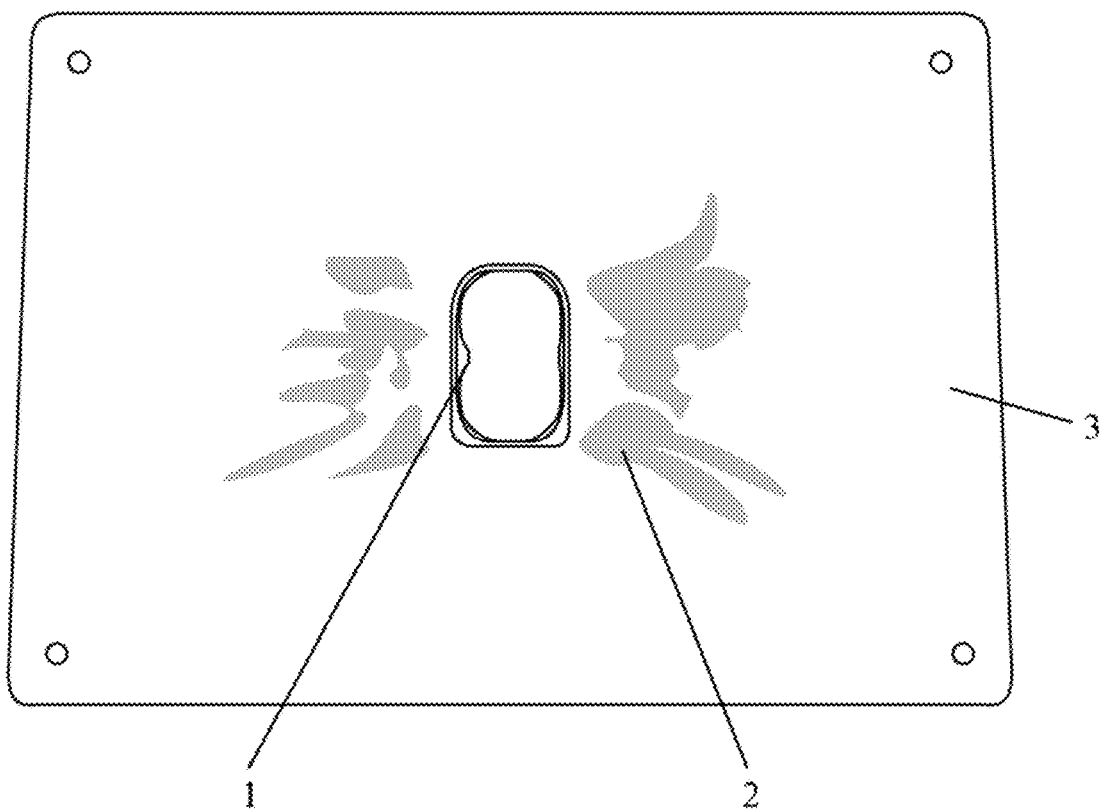
FIG. 1 is a drawing (photograph) (used material: PP) where silver streak occurred near the gate due to the base resin of the masterbatch of the foaming agent and the swirl marks could not be controlled (suppressed) at the flow terminal due to lack of pressure of GCP.

First, the terms employed in the present invention will be defined.

(Less Than, or Less and or More)

When "less than" is used, the value written after this phrase is not included. When "or less" is used, the value written before this phrase is included. When "or more" is used, the value written before this phrase is included. For example, "less than pH7" does not include 7. Thus, the solution is not neutral (pH=7) but acidic. The term "pH 7 or less" includes 7. Thus, the solution is neutral or acidic.

(Applicable Products and the Like)

The material, shape, usage and the like of the product applicable to the present invention are not particularly limited as long as the product is a resin molded article manufactured by an injection molding, a cast molding, a block molding and the like. For OA (office automation equipment), consumer electronics, game machine and the like, styrenic resin or polymer alloy/polymer blend containing the styrenic resin is mainly used. For vehicles, olefinic resin or polymer alloy/polymer blend containing the olefinic resin is mainly used. For houses, furniture, sundries and the like, styrenic resin, olefinic resin, vinylic resin represented by vinyl chloride or polymer alloy/polymer blend containing thermoplastic resin such as ester-based resin and amide-based resin is mainly used. The present invention also targets at the molded article using recycled materials especially formed from the thermoplastic resin collected from the market as a starting material and a new molding material is formed by reformulation and modification. The foam molding can expect higher dimensional stability (repeat accuracy of dimensions of the molded article) compared to the solid molding since the pressure keeping is not used. Thus, the foam molding is suitable for using the recycled materials of the thermoplastic resin. An IC tray formed by adding the acetylene black to the modified PPO (modified PPE) can be light weighted by the foam molding. Thus, the energy required for the transportation can be reduced in the process of burning (screening) inspection.

The types of resin that can be used in the present invention are listed in "Database on properties, Handbook of commercial trade of plastic molding materials" (ver. 1999, ver. 2012) published by the Chemical Daily Co., Ltd.

The present invention can be applied to any type of thermoplastic resin as long as it is used for the molding. As for the examples of the thermoplastic resins, the following resins can be used: polystyrene-based resins produced by polymerizing styrene-based monomers such as polystyrene (PS) and high impact (impact-resistant) polystyrene (HIPS); styrene-based resins which are a copolymer of nitrile-based monomer/styrene-based monomer such as acrylonitrile-styrene copolymer (AS); resins comprising nitrile-based monomer/styrene-based monomer/butadiene-based rubber such as acrylonitrile butadiene styrene copolymer (ABS); styrene-based resins such as AES using olefin-based rubber instead of butadiene-based rubber and ASA (AAS) using acryl-based rubber; polyolefin-based resins represented by polyethylene (PE) and polypropylene (PP); engineering plastics such as polyphenylene oxide (PPO), polyphenylene ether (PPE), polyphenylene oxide with denaturalized styrene (m-PPO), polyphenylene ether with denaturalized styrene (m-PPE), polycarbonate (PC), polyamide (PA), polysulfone (PSF), polyetherimide (PEI) and polymethyl methacrylate (PMMA); polyester resins such as polyethylene terephthalate (PET) and polybutylene terephthalate (PBT); and vinyl-based resins such as polyvinyl chloride (PVC).

Two or more types of thermoplastic resins or/and thermoplastic elastomers can also be mixed to concoct a polymer blend or a polymer alloy. The polymer blend or the polymer alloy is concocted, for example, through the kneading by the screw in an extrusion molding machine, for example.

For the resins to which the present invention is applied, as long as the concerned product does not adversely affect the function, the compounding chemicals described in the "Handbook of compounding chemicals for rubbers and plastics" published by Rubber Digest Co., Ltd. in March 1989 (newest edition), December 2003 (2nd revised edition) can be used. Other resins and additives such as pigments, dyes, reinforcing agent (e.g., glass fiber and carbon fiber), bulking agent (e.g., carbon black, silica, titanium oxide and talc), heat-resisting agent, anti-aging agent, oxidation-degradation inhibitor, antiozonant, antiweathering (light resistant) agent (ultraviolet absorber, light stabilizer), plasticizer, auxiliary foaming agent, foam-nucleating agent, lubricant, friction reducer, internal mold release agent, mold release agent, antifog additive, crystal nucleating agent, flame retardant, auxiliary flame retardant, flow modifier, antistatic agent, compatibilizer, compatibilizing agent can be added when blending the resins.

In the present invention, "resin" includes thermoplastic resin (TPR), thermosetting resin (TSR), TSE (thermoset elastomer), TPE (thermoplastic elastomer) and rubber. The thermoplastic resin or/and the TPE which have thermoplastic property are referred to as "thermoplastic resin." The thermosetting resin, the rubber and the TSE which have thermosetting property are referred to as "thermosetting resin."

Figure 2:
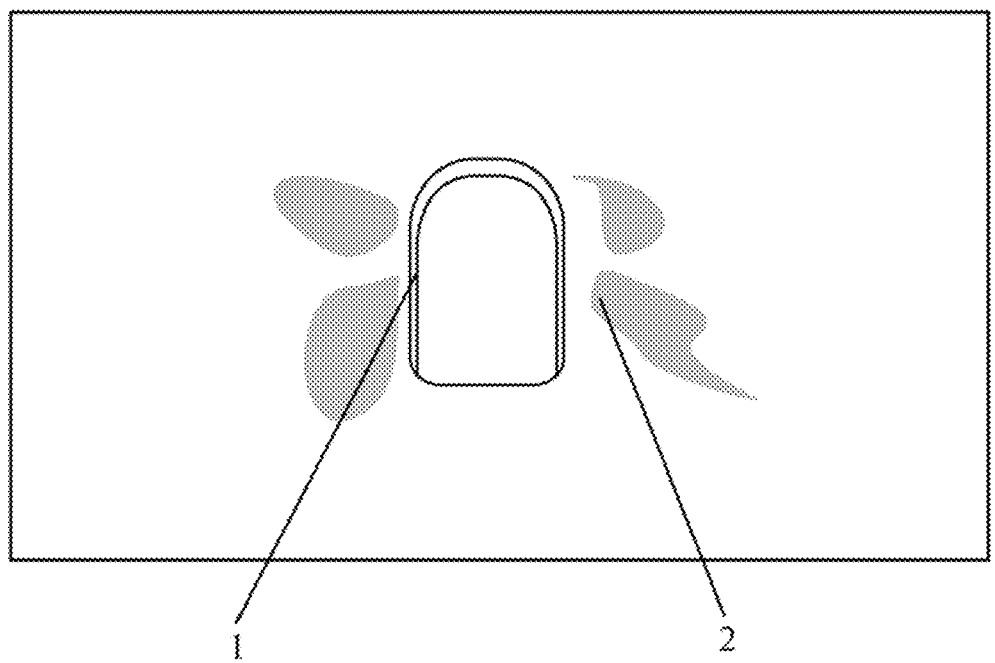
FIG. 2 is a drawing (used material: PP used for automotive interior) (used material: TSOP) where the swirl marks could be controlled (suppressed) in GCP but silver streak occurred near the gate due to the base resin of the masterbatch of the foaming agent.
Figure 4:
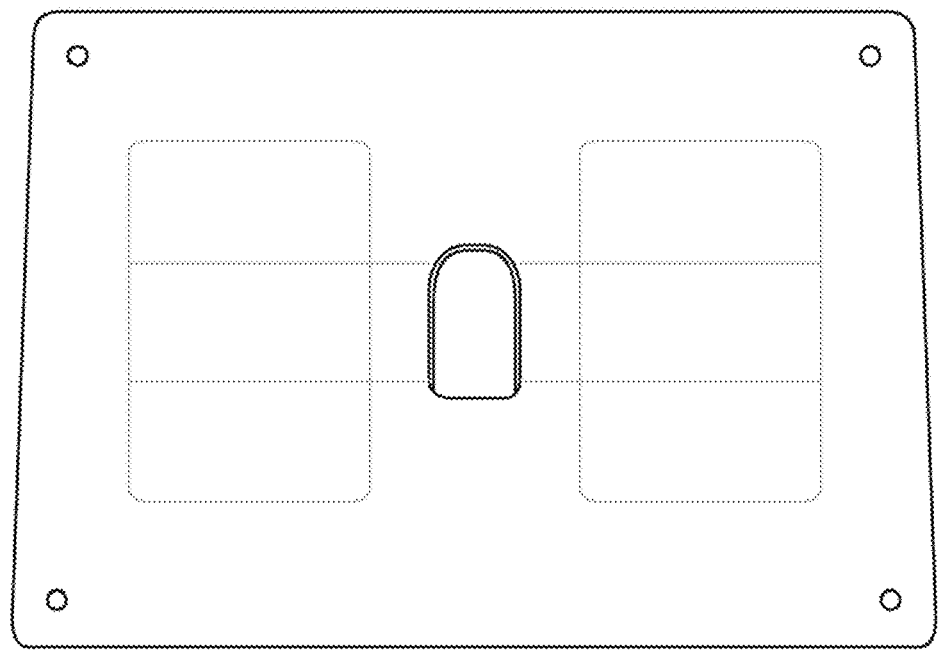
FIG. 4 is a drawing (photograph) (used material: transparent ABS) showing a state that the foam cells are pressed by performing GCP and the swirl marks are not seen on the surface (i.e., the surface is smooth).
Figure 5:
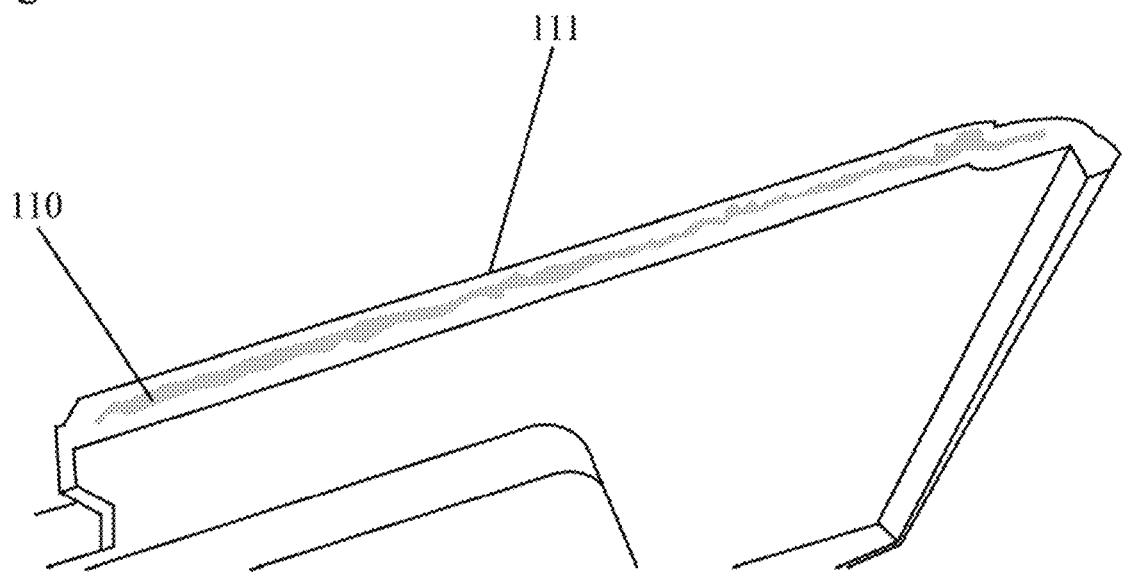
FIG. 5 is a cross-sectional view (photograph) of a foam-molded article showing a state that a foam layer (reference numeral: 110) is formed inside and a skin layer (reference numeral 111) having an excellent outer appearance is formed on an outer surface. The foam cells are enclosed inside by using GCP (the outer surface is a skin layer having an excellent outer appearance without having the swirl marks while the inside is the foam layer).
Figure 6:
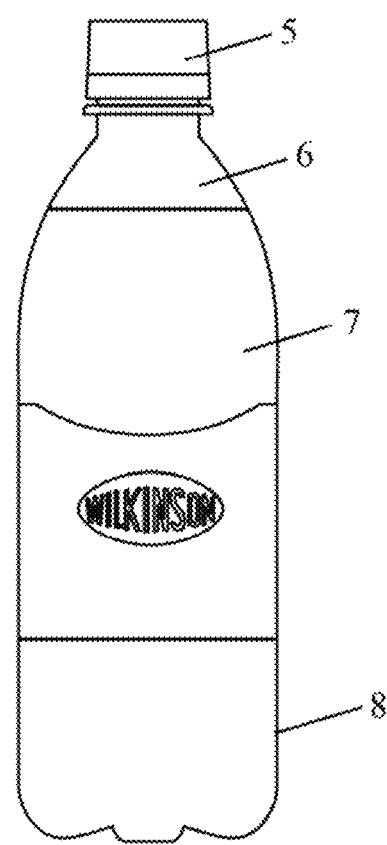
FIG. 6 is a drawing (photograph) of carbonated water.

The GCP which is a main technology of the present invention will be explained. The operations and effects of the GCP using PP are shown in FIG. 2 and FIG. 6 and the GCP using transparent ABS is shown in FIG. 4 so that the foam cells inside can be seen. The foaming cells are enclosed inside and a skin layer (non-foam layer) having an excellent outer appearance is formed on an outer surface (front surface) where the foaming is suppressed by the operation of the GCP. FIG. 5 is a cross-sectional view of a foam-molded article using PP where the GCP is performed. In FIG. 1 to FIG. 5, the reference numeral 1 shows a side gate. The side gate is formed at two parts (each of left and right sides of the opening). As described above, the reference numeral 2 shows a fact that silver streak (floating of the surface of PE) occurs in the GCP molding using the PP due to the masterbatch (abbreviation: MB) of the foaming agent.

The reference numeral 3 shows a fact that the swirl marks cannot be suppressed when the pressure (pressure applied in the mold) of the GCP is low or when the timing of discharging the gas is too early. The reference numeral 4 shows a fact that the swirl marks are formed on the entire surface when the foam molding is performed without using the GCP. When forming the examples shown in FIGS. 1 to 5, ADCA was used as the foaming agent. The foaming nucleating agent and the foaming auxiliary were not used. When the sodium bicarbonate was used, the result was same as the case of using the ADCA. When potassium bicarbonate was used, the result was same as the case of using the sodium bicarbonate. When the ADCA and the sodium bicarbonate are used simultaneously, the foam cells become finer compared to the case of using only the ADCA. When the pressure of the GCP is increased, the pressure has the function of pressing and enclosing the foam residue inside the molded article. As a result, it is presumed that the coating is enabled even for the foam-molded article using the sodium hydrogen carbonate since the unfoamed foaming agent and the foam residue are pressed inside by using high pressure of the GCP.

(Miscibility and Compatibility)

In the present invention, "miscibility" means the property that the resins are mixed with each other in a molecular level (e.g., sugar dissolves in water). On the other hand, "compatibility" is defined as the property that one resin enters into the other resin showing a sea-island structure. The concept including both miscibility and compatibility is expressed as compatibility (miscibility).

(Molding Equipment, Unit or Device)

Figure 10:
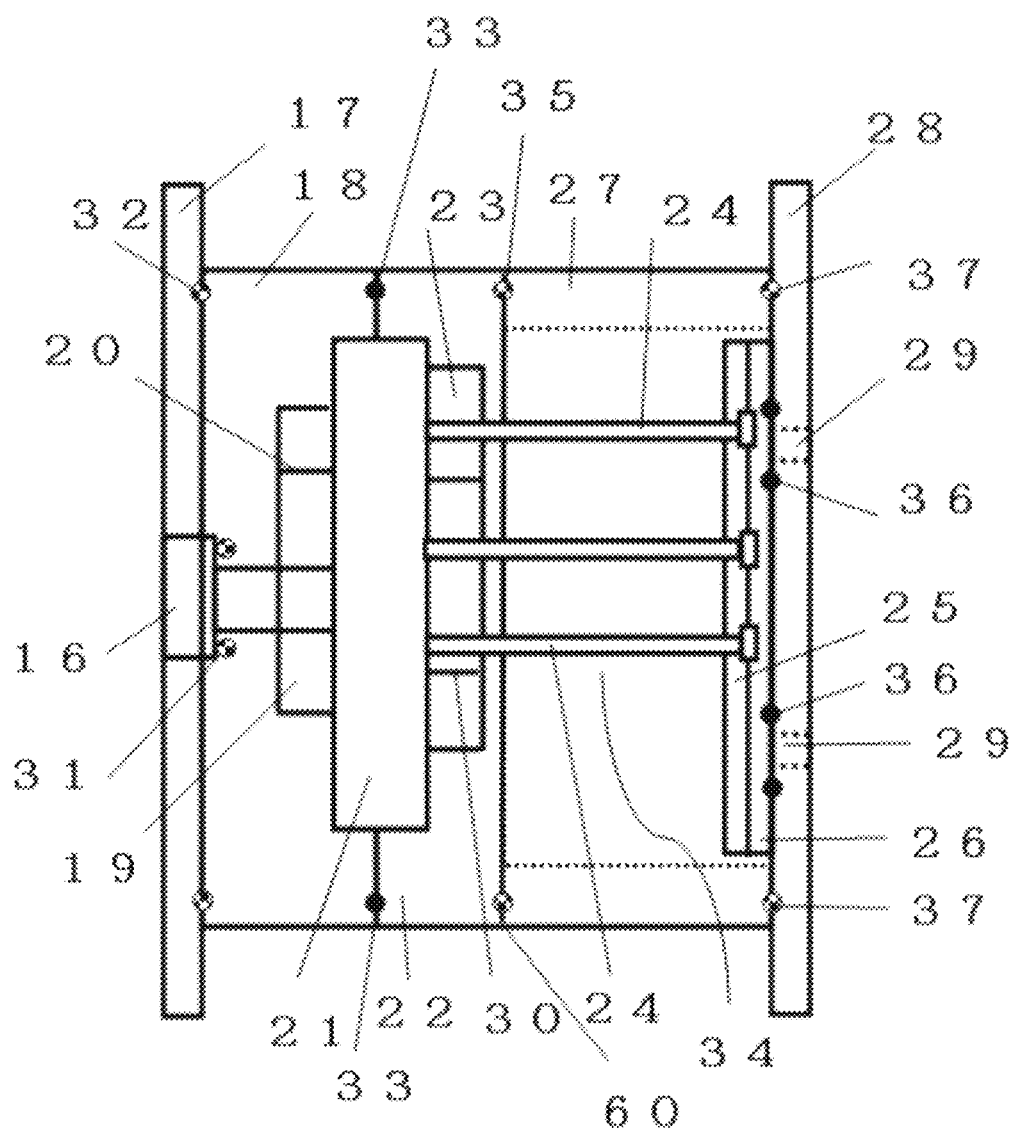
FIG. 10 is a schematic diagram showing a mold structure for foam molding where an ejector mechanism is surrounded by a box to seal the ejector mechanism.
Figure 11:
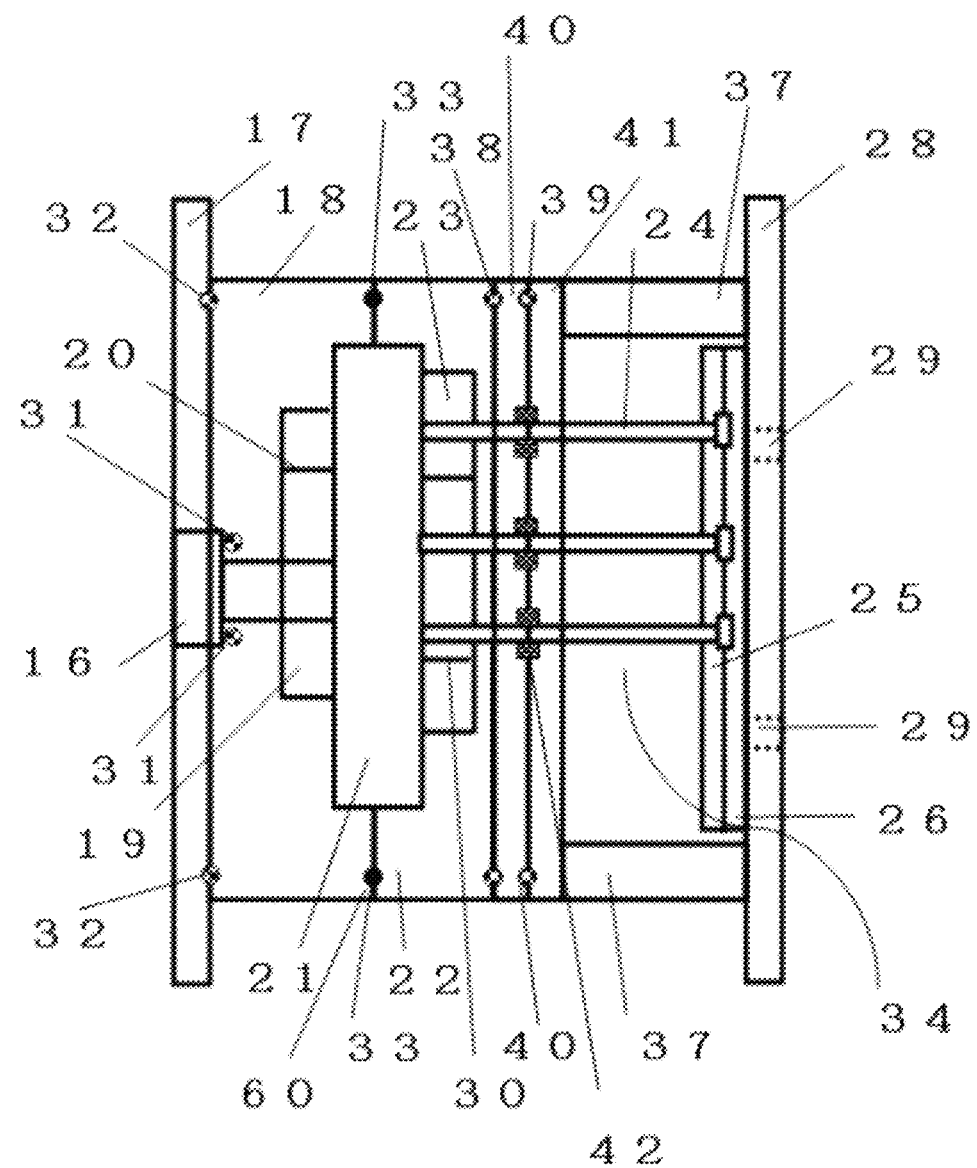
Figure 23:
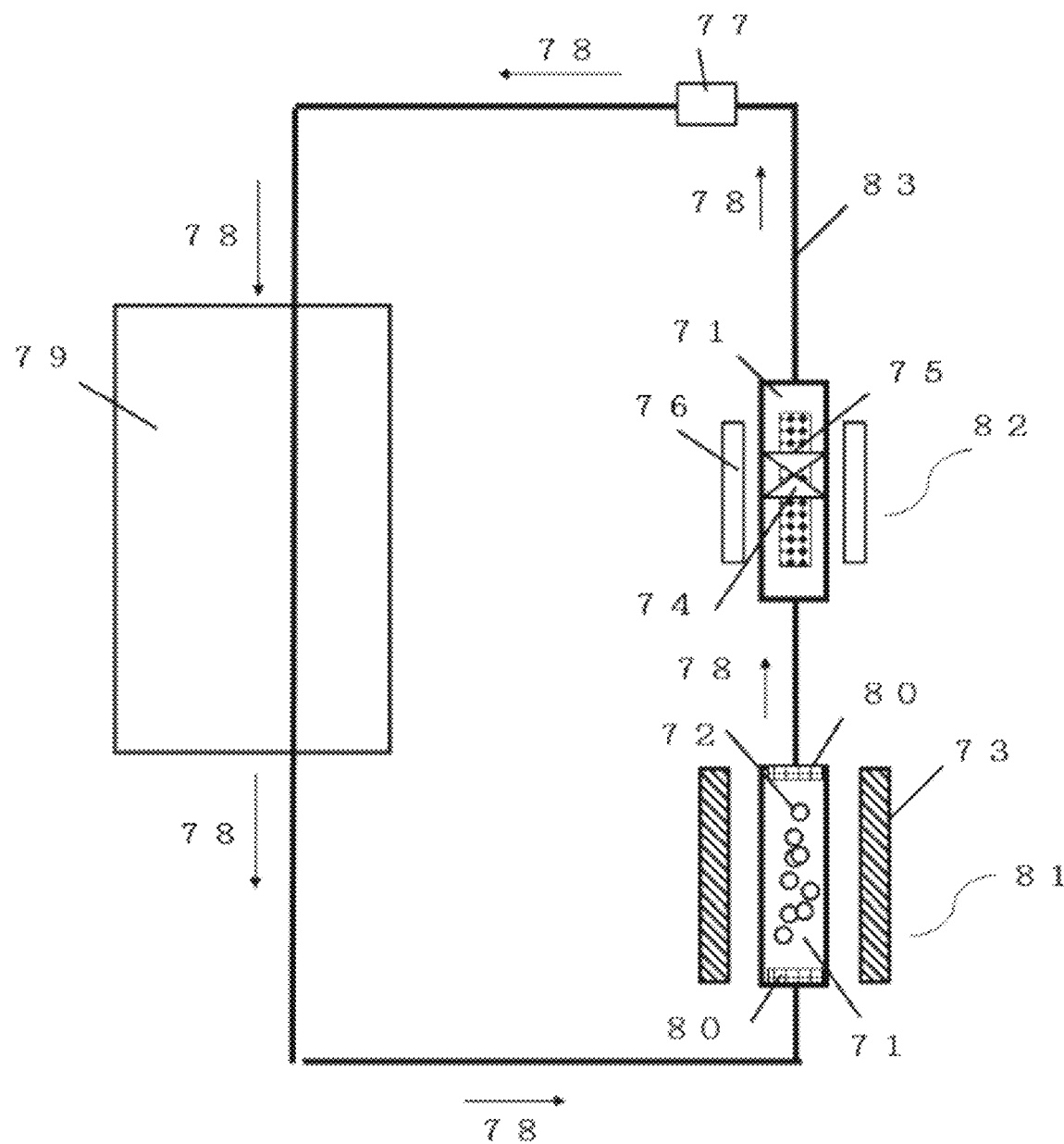
FIG. 23 is a schematic diagram showing a device for heating magnetic fluid by electromagnetic induction.
Figure 49:
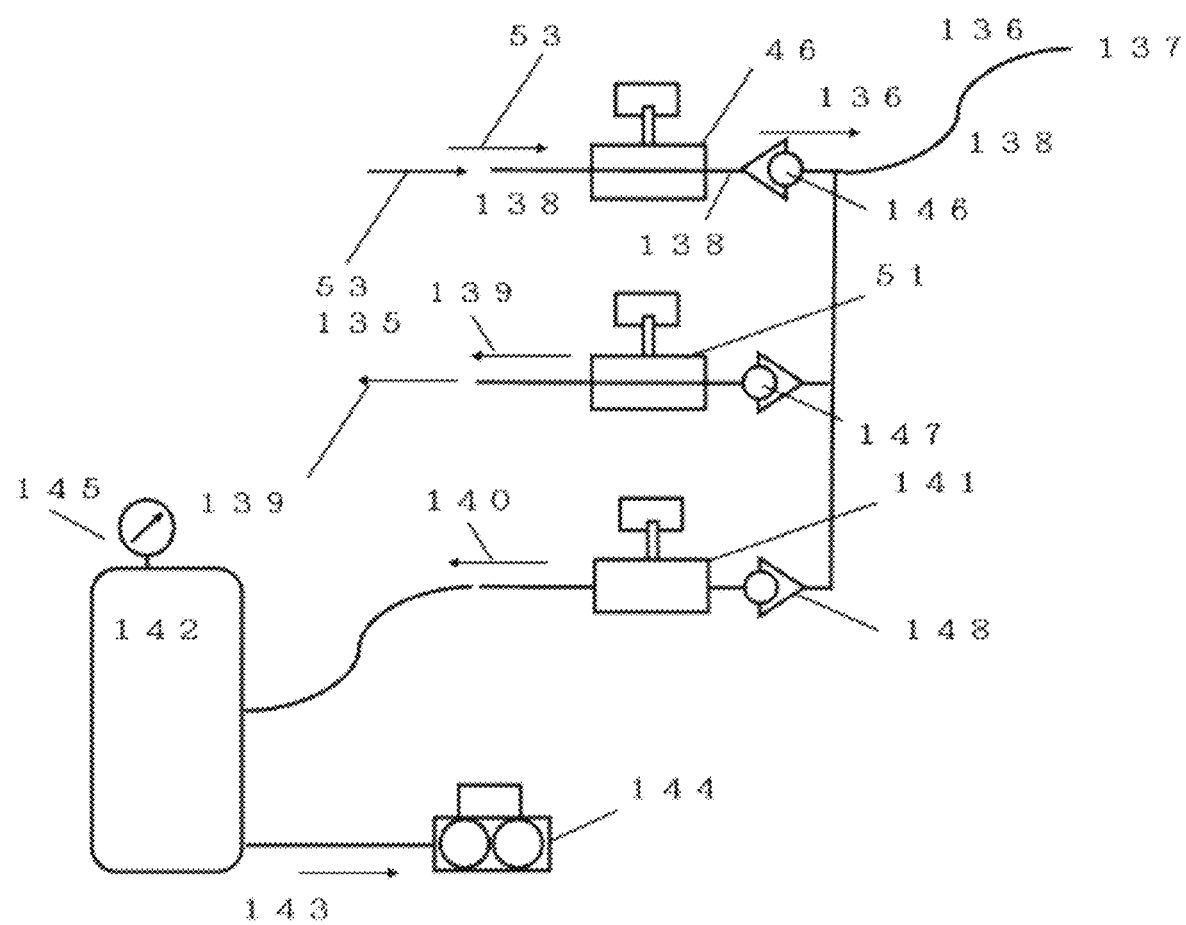
FIG. 49 is a drawing showing a means for further performing an evacuation after the compressed gas is discharged from the mold.
Figure 50:
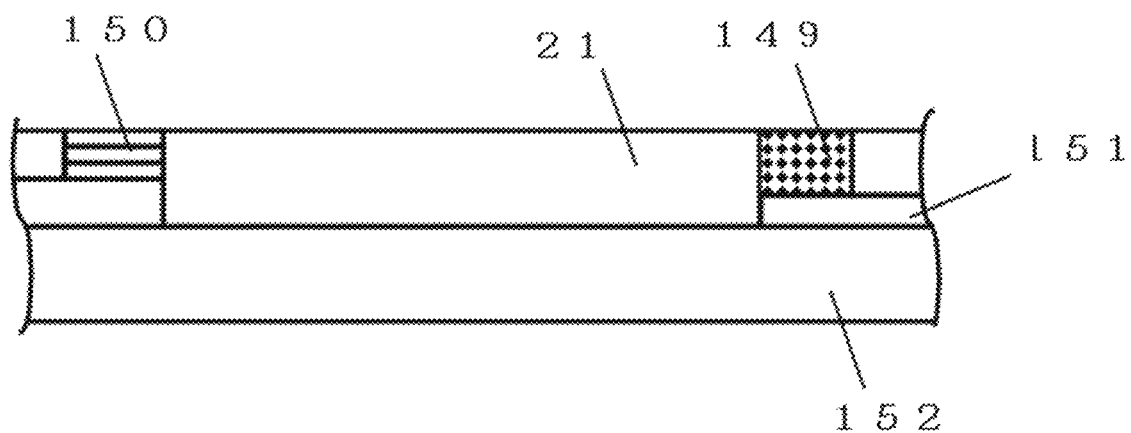
FIG. 50 is a schematic cross-sectional view showing the structure of the mold where the means of flowing the compressed gas into/out from the PL is shown.

"Molding device" used in the present invention means, for example, the above described GCP device, a hollow (blow) molding device, a pressure molding device (a device for separating nitrogen gas in the air, a device for compressing the nitrogen gas and a device for obtaining hollow molding articles and pressure molding articles by injecting and blowing the compressed nitrogen gas), an injection molding machine in which programs for controlling the injection molding machine is written, integrated or installed in a sequencer of the injection molding machine so that the operations such as GCP, mold-back, core-back, recession, recess, breezing, suck-back of the screw after injection (for the purpose of reducing the pressure of the resin filled into the mold), a hollow molding and a pressure molding can be performed, a sealed mold shown in FIG. 10, FIG. 11 and the like for performing the molding, a GCP device shown in FIG. 9, FIG. 15, FIG. 16, FIG. 49 and the like (the programs for controlling a gas pressure valve, a discharge valve and an evacuation valve of the reference numeral 141 shown in FIG. 9, FIG. 10, FIG. 11 and FIG. 49 are installed in the injection molding machine of the present invention), a mold shown in FIG. 50, a mold heating device shown in FIG. 23, a shut-off nozzle operated by hydraulic, pneumatic or mechanical mechanism, a spring and the like, a device for making the pellet of the resin carry the foaming agent and a device for mixing the powder of the foaming agent with the powder of the resin for pelletizing them. The "powder" means small pieces of the solid and "powder body" means the state that a large amount of powder is collected.

(Molding Material)

The "molding material" used in the present invention means a thermoplastic resin, other additives used for manufacturing the thermoplastic resin, a reinforcing agent represented by glass fiber and the like, a foaming agent, a foaming auxiliary and a foaming nucleating agent. The present invention can be also performed by the thermosetting resin.

(Products)

The masterbatch of the foaming agent carrying the foaming agent, the foam-molded article using the foaming agent pelletized from the powder of the foaming agent and the powder of the resin and the foam-molded article having a smooth surface obtained by using the GCP device shown in the present invention can be performed for all injection molded articles, block molded articles and cast molded articles which are composed mainly of thermoplastic resins. The above described foam-molded articles are frequently used for automobile parts, consumer electronics, OA (office automation) equipment, housing equipment, other sundries and game machines.

The "molding space" means the space filled with the resin having foaming properties or/and non-foamable resin in the injection molding, the block molding or the cast molding. In addition, the "inside the cavity" means an inner part, a space, a volume (vol.) and a capacity (vol.) of the molding space. The "mold cavity" is synonymous with "molding space." They are also referred merely as "cavity."

The "injection" means an action or a step (process) of filling or injecting the resin having foaming properties or/and non-foamable resin into the molding space.

The "filling" means an action of introducing the resin having foaming properties or/and non-foamable resin into the molding space in the molding process. When the resin is filled in the molding space with the volume (capacity) smaller than the volume of the molding space, it is called "short-shot" or "short-molding." When the resin is filled in the molding space with the volume equivalent to the volume of the molding space, it is called "full-shot" or "full-pack." When the resin is filled in the molding space with the volume larger than the volume of the molding space, it is called "over-shot" or "over-pack." When the pressure is applied to the resin (pressure keeping is used) from the heating cylinder of the molding machine after the full-shot to reduce sink marks and improve the transferability, the use of the pressure keeping will be mentioned. Whether or not the pressure is applied in the block molding will be mentioned (e.g., uncompressed after the filling or compressed after the filling).

The "resin in the heating cylinder" means the thermoplastic resin which is in a solid state such as pellet, bulk and powder before the thermoplastic resin is heated and molten, the thermoplastic resin which is in a state of during the plasticization or the thermoplastic resin which is in a molten state after the plasticization is finished in the heating cylinder of the molding machine (e.g., injection molding machine, extrusion molding machine and cast molding machine).

(Gas Counter Pressure: GCP)

The "GCP" means the processes of preliminarily applying the pressure to the inside of the sealed mold (e.g., molding space) shown in FIG. 10 and FIG. 11 by the gas having the pressure higher than atmospheric pressure to compress the sealed mold, injecting/filling the foamable resin having foaming properties by using a gaseous, fluid or solid foaming agent (which can be used alone and used in combination) under compressed (pressurized) condition, and then discharging the gas entered into the mold during the filling of the resin or after the filling of the resin is finished. The timing of discharging the gas varies depending on the type of the resin, the type of the foaming agent, the adding amount of the foaming agent, the type of the foaming gas, the pressure of the GCP and the like. From the experience of the inventor, even if the gas is discharged when the foamable resin is filled into the molding space by 90% or more, the molded article having an excellent outer appearance without having swirl marks on the surface can be obtained. This is because a certain time is required before the gas is entirely discharged and a certain time is required (time delays) before the foaming gas inside the resin appears on the surface and forms the swirl marks. Consequently, the GCP is the means and the process of obtaining the molded article (foamed structure) with a skin layer (non-foam layer) having smooth and excellent surface without having the swirl marks (foaming stripe pattern) outside and the foam layer inside. The GCP also means the action and process of compressing (pressurizing) the inside of the sealed mold by using the gas having the pressure higher than atmospheric pressure. The GCP is also referred to as "gas compression (gas pressurization)." In some cases, the gas compression means the action of compressing (pressuring) the mold by the pressure higher than atmospheric pressure or means the gas itself entered in the mold.

As for the means of entering the compressed gas (pressurized gas) in the mold of the GCP, FIG. 10 and FIG. 11 show the gas compression from the parting line to the molding space. However, other means can be used. For example, it is possible to adopt a double structure for the ejector pin for performing the gas compression from a clearance between an inner core and an outer cylinder. When Gastos (trade name) is used for the ejector pin and a sintered metal is used for the tip portion so that the compressed gas passes through it, inside the molding space can be compressed (pressurized). In this case, the compressed gas is entered in the clearance of the ejector plate in a state that the ejector plate can withstand the pressure of the compressed gas. In this case, the ejector pin is preferably sealed by the loaded O-rings shown in FIG. 11 or FIGS. 24 to 30 in the mold structure.

It is possible to form a nested element with a diameter of approximately 50 mm having the above described double structure at a part not forming the design surface and enter the compression gas from the clearance. As described above, the compressed gas is entered in only the parting line but also other parts in the molding space. The compressed gas in the molding space is transferred from the parting line to the other places (e.g., the reference numeral 55 in FIG. 6) by the force of filling the molten resin (i.e., by filling the molten resin).

For example, in Japanese Unexamined Patent Application Publication No. 2010-184401 (P2010-184401A), although the compressed gas can be entered in the mold, it is impossible to transfer the compressed gas which obstructs the filling of the resin to the other places by the force of filling the resin into the mold. The above described means may cause the short-molding, discoloration and scorch.

The "carry" means the action of adhering other substances such as the powder of the foaming agent used in the present invention, the powder of the foaming auxiliary, the powder of the foaming nucleating agent, the powder of the pigment or/and other additives on the surface of the resin pellet or the like using the varnish for coating or the dope cement formed by dissolving the resin to be foam molded by the solvent as a binder, for example. When the resin to be molded is AS, ABS (including AAS, ASA, AES, ACS), the varnish or the dope cement formed by dissolving the AS, the ABS, the acrylic resin or the styrene-modified acrylic resin in the solvent is used as the binder. When the resin to be molded is PS, HIPS or the modified PPO (modified PPE), the varnish or the dope cement formed by dissolving the PS, HIPS, the acrylic resin or the styrene-modified acrylic resin to the solvent is used as the binder. When the resin to be molded is PP, the acid-modified PP, the halogenated PP or the maleic acid-modified PP (e.g., modification using maleic anhydride) is dissolved in the solvent or emulsified with water and used as the binder.

(Binder)

The "binder" means the substance having an operation and effect of an adhesive agent when the foaming agent, the foaming nucleating agent (property: powder), the decomposition promoter and the like are blended and carried on the surface of the pellet to be foam molded or the substance having an operation and effect of an adhesive agent when the above described powder of the foaming agent and the like are mixed with the powder of the resin to be foam molded then solidified and pelletized. As examples of the binder used for the ABS, the HIPS and the modified PPO (modified PPE), the dope cement formed by dissolving the resin such as the AS, the ABS, the PS, the HIPS and the MEK in the solvent to have compatibility (miscibility) with the resin, commercially available varnish of the styrene-modified acrylic resin used for coating, and an emulsion (emulsion-based material) or a suspension (suspension-based material) of the styrene-modified acrylic resin are exemplified. As examples of the binder used for the PP, the varnish formed by dissolving the maleic acid-modified PP in the solvent and an emulsion (emulsion-based material) or a suspension (suspension-based material) of the maleic acid-modified PP are exemplified.

(Suspension Using Powder of Foaming Agent)

The substance formed by mixing the above described varnish with the substance which is insoluble in the varnish is also mentioned to as the suspension. For example, the substance formed by mixing the solvent-based varnish with the powder of the organic foaming agent such as ADCA and HDCA or the inorganic foaming agent such as the sodium bicarbonate is also mentioned to as the suspension. It is also possible to use the substance formed by dispersing the ADCA or HDCA in the water based emulsion. It is also possible to use the varnish formed by dissolving the water-soluble sodium bicarbonate in the emulsion.

When the above described varnish is sprayed while the pellet is heated, the varnish can be carried on the surface of the pellet since the varnish in which the foaming agent is included (dispersed or dissolved) is used. The palletization is also possible without using the pellet by preliminarily entering a small amount of the powder of the foaming agent and spraying it while heating it.

The masterbatch for the forming can be also manufactured by entering the pellet into the rocking mixer and spraying the suspension on it. It is also possible to enter both the pellet and the suspension and stirring them while heating them.

The "acid-modified" is required because PP is insoluble in almost all solvents and the varnish of the resin having compatibility (miscibility) with the PP to be molded is used for carrying the foaming agent and the like on the surface of the pellet of PP to be molded in the present invention. When the resin to be molded is PP, the PP having compatibility (miscibility) with the PP is modified so as to be soluble and finely dispersed in the solvent and water. In general, it is possible to modify the PP by using maleic acid, acrylic acid, chlorine (Cl), bromine (Br) or the like. When the halogen such as the chlorine and the bromine is used, the halogen is decomposed and liberated in the heating cylinder when the foam molding is performed. Thus, there are a risk of corroding the heating cylinder, the screw, the mold or the like and a problem of changing the color of the PP. Since the maleic acid and the like are weak acid, when the PP is acid-modified by using these acids, there is a little problem or no problem of corroding the heating cylinder, the screw, the mold or the like even if the acid is liberated.

Whether or not the acid-modified PP can be used for the binder agent for the carrying the foaming agent and the like in the present invention is judged by carrying 1 wt. % (weight percent) to 5 wt. % (1 mass % to 5 mass % if expressed by the mass instead of the weight) of the acid-modified PP on the pellet of the PP, purging the PP carrying the acid-modified PP by the injection molding machine, and checking discoloration and scorch of the purged block.

The dispersed state of the PP and the maleic acid-modified PP of the purged block and the existence of peeling of bonding interface are observed by using a transmission electron microscope (TEM). In addition, the PP to be molded and the maleic acid-modified PP are actually mixed (considering the amount to be entered when used as the foaming agent) and whether or not the physical property and the chemical characteristics of the PP are within the usable range is checked.

Since the melting temperature becomes lower when the PP is acid-modified, when the pellet of PP, the powder of the foaming agent and the powder of the acid-modified PP are mixed and heated, the acid-modified PP which has low melting temperature is melted, and the melted acid-modified PP serves as the binder. Thus, the powder of the foaming agent can be carried on the periphery of the surface of the pellet of the PP.

When only the pellet of the PP is entered in advance and heated and then the powder of the foaming agent is entered in a state that the surface of the pellet of the PP is melted, some of the powder of the foaming agent can be carried.

The "raindrop" is the defect in the appearance that occurs especially when the GCP is performed. In GCP, when the molten resin is filled in the mold, the compressed gas is entered into the molding space for the purpose of reducing the foaming of the surface of the foamable resin. However, if the compressed gas is involved in the resin during the filing of the resin, the compressed gas is entered between the molten resin and the mold and the recess appears on the surface of the molded article.

(Evacuation)

The "evacuation" is a means of sucking the compressed gas in the mold using a vacuum pump, and a means of preliminarily sucking the compressed gas into a tank (sub tank) having a larger volume than the volume of the compressed gas entered in the sealed mold using the vacuum pump. In the GCP, the compressed gas is effective for the means for suppressing the foaming of the surface but the compressed gas obstructs the filling of the resin to cause the raindrop. An embossing processing is performed and the width of the gas vent of the parting line is enlarged so that the compressed gas in the mold is smoothly discharged. After the gas of the GCP is discharged, the mold-back or the like is performed by 0.1 mm or 0.2 mm as the means for enlarging the gas vent. The effect is further increased if the evacuation is performed after the mold-back is performed by using the gas circuit of the compressed gas.

In order to avoid the raindrop, the surface temperature of the mold was lowered, the viscosity of the resin was lowered (i.e., the temperature of the resin was lowered), or the speed of filing resin was slowed to reduce the involution of the gas. However, the molding processability was decreased in any of the above described means. On the other hand, the problem of the raindrop could be solved by using the above described means (one of the means for performing the mold-back after the gas of the GCP is discharged and the means for performing the evacuation simultaneously when the mold-back is performed or when a certain time has elapsed after the mold-back is performed).

FIG. 49 shows the means for further performing the evacuation after the compressed gas in the mold is discharged for increasing the foaming ratio and eliminating the raindrop. The sealed mold shown in FIG. 10 and FIG. 11 is closed, the injection valve of the reference numeral 46 is opened, and the gas compressed (pressurized) by the reference numeral 43 passes through the circuit (e.g., reference numeral 49 and reference numeral 52) of the reference numeral 138 and compresses (pressurizes) the mold by the pressure higher than atmospheric pressure. Inside the molding space is preliminarily compressed (pressurized) (e.g., referred to as "compression (pressurization)" or "gas compression (pressurization)") and the foamable resin is filled while keeping the pressure. The foaming of the surface is suppressed and the swirl marks are not formed by the preliminarily pressure applied in the molding space. The timing of discharging the gas of the GCP varies depending on the type of the resin, the type of the foaming agent, the adding amount of the foaming agent and the type of the foaming gas. From the experience of the inventor, the pressure of the compressed gas should be specified so that the foaming of the foamable resin filled in the molding space is prevented (suppressed). The pressure of the compressed gas should be higher than atmospheric pressure, preferably 0.6 MPa or more, and actually 0.8 MPa to 1.51 MPa when the air is used for the compression in the present example. Although the pressure can be higher than the above described values, the possibility of the raindrop caused by the compressed gas involved when the resin is filled increases by increasing the pressure of the compressed gas.

The foamable resin to which foaming properties are applied by using a gaseous, fluid or solid foaming agent (which can be used alone and used in combination, e.g., gas and solid, liquid and solid) is filled in the compressed (pressurized) molding space and the valve 46 is closed 46 and the valve 51 is opened to discharge the compressed gas into an atmosphere during the foamable resin is filled, immediately after the foamable resin is filled, or when a certain time has elapsed (passed) after the foamable resin is filled. In general, the above described processes are the processes of the GCP shown by the present invention. Furthermore, it is also possible that the valve 51 is closed, the valve 141 is opened, and the compressed gas is sucked by the tank shown by the reference numeral 142 which is preliminarily decompressed (depressurized) by using the vacuum pump shown by the reference numeral 144. In this case, the mold is retreated (mold-back is performed) approximately 0.1 mm to 0.3 mm to open the PL (parting line). Consequently, the gas vent is broadened and the compressed gas entered in the clearance between the mold and the resin can be forcibly discharged. Since the compressed gas causing the raindrop is discharged, the raindrop does not occur. In this case, it is necessary to use the O-ring having large diameter for the O-ring of the reference numeral 33 provided on the parting line (reference numeral 60) for keeping the sealing function. Namely, the sealing function should be kept for preventing the air from entering from the opened parting line even when the mold-back is performed on the parting line and the evacuation is performed in a state that the clearance is formed on the parting line. The reference numeral 136 shows the flow of the compressed gas compressing (pressurizing) the mold, and the reference numeral 137 shows the gas compressing (pressurizing) the mold. The reference numeral 139 shows the flow when the compressed gas is discharged from the mold, and the reference numeral 140 shows the flow of the compressed gas to be evacuated. The reference numeral 145 shows a pressure gauge for checking the state of reducing the pressure in the tank 142, the reference numeral 143 shows the flow of the gas in 142 sucked by the vacuum pump, and the reference numeral 135 shows the gas compressed by a compressor and entered in FIG. 15 and FIG. 16. The reference numeral 146 shows a check valve provided on the circuit for compressing the mold, the reference numeral 147 shows a check valve provided on the circuit of discharging the compressed gas, and the reference numeral 148 shows a check valve provided on the circuit of the evacuation. The check valves shown by the reference numeral 146, the reference numeral 147 and the reference numeral 148 are not necessarily provided if the opening and closing of the valve 51 and the valve 133 are synchronized.

(Simultaneous Use of GCP and Hollow Molding)

When a hollow is once formed inside the foamable resin filled in the molding space by using high-pressure gas and then the high-pressure gas is discharged, foaming is started inside the foamable resin. In this case, a double structure is adopted for the ejector pin to enter the high-pressure gas. The high-pressure gas is discharged by opening the discharge valve provided on the high-pressure gas device. The speed of the discharge increases when the gas pin is retreated by retreating the ejector plate. Thus, the high-pressure gas entered inside is completely discharged and the problems of blister and burst can be solved at once.

The GCP of the present invention can be performed in combination with the gas pressure molding (the means for increasing the transferability at an opposite side of the compressed side by entering high-pressure gas in the clearance between the mold and the resin).

The property of "foaming agent" can be any of gas, liquid and solid, and roughly classified into physical foaming agent and chemical foaming agent. In addition, an inorganic type and an organic type are included in each of them. The chemical foaming agent of the inorganic type and the pyrolysis type includes hydrogen carbonate, carbonate, nitrite, hydrogen compound, carboxylic acid and carboxylate, for example. In sesqui-sodium carbonate (sesqui=3/2) (chemical name: sodium sesquicarbonate, chemical formula: $Na_2CO_3$—$NaHCO_3$-$2H2O$), $NaHCO_3$ is pyrolyzed to generate the carbonic acid gas and the water vapor and 2 moles of crystal water (here, referred to as "hydrate" without using the concept of "crystal water"). Of course, the above described 2 moles of crystal water is also evaporated in the heating cylinder and the water vapor serves as the foaming gas. The hollow air bubbles (micro balloons) serving as the foaming agent are included in the foaming agent of the present invention. These are carried on the periphery of the pellets of the resin to be molded by the method of using (means of carrying) the binder disclosed in the present invention to manufacture the masterbatch of the foaming agent.

The organic type of the pyrolysis type includes azo compound, hydrazine derivative, semicarbazide compound, azide compound, nitroso compound and triazole compound, for example. The reaction type includes isocyanate compound. For example, MuCell and AMOTEC where the nitrogen gas and the carbonic acid gas (carbon dioxide) are entered in the resin of the heating cylinder by alone or mixed as combined gas can be listed. Alternatively, liquid foaming agent such as water, ethanol, sodium hydrogen carbonate solution, potassium bicarbonate solution and sodium citrate solution can be listed. As commercially available foaming agents, sodium bicarbonate, potassium bicarbonate, ADCA (azodicarbonamide), HDCA (hydrazodicarbonamide), azodicarboxylate (Ba salt of ADCA, Ba salt of ADCA), DPT (Dinitrosopentamethylenetetramine), OBSH (P-P' oxybis (benzenesulfonylhydrazide)) and AIBN (azobis (isobutyronitrile)) can be listed. The details of the foaming agent and the foam molding are written in "Various polymers and foam molding technology" issued by TECHNICAL INFORMATION INSTITUTE CO., LTD in August 1993. In the present invention, for clarifying and distinguishing the properties of the foaming agent, the foaming agent which is in a gaseous state at 23° C. and 1 atmosphere of pressure (1 atm) is referred to as "gaseous foaming agent" such as the nitrogen gas used for MuCell. The foaming agent which is in a liquid (fluid) state at 23° C. and 1 atmosphere of pressure (1 atm) is referred to as "liquid foaming agent" such as ethanol and sodium bicarbonate water. The foaming agent which is in a solid state at 23° C. and 1 atmosphere of pressure (1 atm) is referred to as "solid foaming agent" such as sodium bicarbonate, ADCA and the masterbatch of the foaming agent containing them. As a commercially available masterbatch of the foaming agent, Polythlene, ADVANCELL and FINE-BLOW (all of them are trade names and the pellet having a solid property) can be listed, for example.

When the liquid foaming agent is used for the thermoplastic resin, an optimum volume of the liquid foaming agent is measured with respect to the weight of the molded article and injected into the thermoplastic resin in the heating cylinder. Thus, the liquid foaming agent is evaporated, pyrolyzed or/and chemically reacted by the heating cylinder, the temperature in the heating cylinder, the temperature of the molten thermoplastic resin in the heating cylinder or/and the temperature of the mold. Alternatively, the liquid foaming agent is evaporated, pyrolyzed or/and chemically reacted without requiring the heat. Thus, the gas effective for the foaming is generated.

The generated gas is finely dispersed or/and dissolved by pressure in the thermoplastic resin in the heating cylinder. Consequently, the thermoplastic resin in the heating cylinder is converted into the thermoplastic resin having foaming properties. The molding space is filled with the above described foamed thermoplastic resin and the molded article having foamed structure can be manufactured. In other words, the "foam molding" means the operations and steps of obtaining the foamed structure by dispersing or/and dissolving the foaming gas in the resin in the heating cylinder and filling the mold with the resin having foaming properties.

The "foaming" means the operation that the liquid foaming agent or the commercially available foaming agent generates the gas which is effective for the foam molding such as water vapor, alcohol vapor (gas), vapor of the organic solvent, carbon monoxide, carbonic acid gas, nitrogen gas, hydrogen and the like by the physical change such as vaporization, pyrolysis, chemical reaction, for example.

The "blowing (foaming)" means the operation that the foaming gas is finely dispersed or/and dissolved by pressure in the thermoplastic resin to reduce the pressure so that the foam cells are generated inside or/and on the surface of the thermoplastic resin. In case of the thermosetting resin, the "blowing (foaming)" means the operation that the foaming agent is evaporated, pyrolyzed, chemically reacted by heating the foaming agent to generate the foaming gas and the foam cells are formed inside or/and on the surface of the thermosetting resin. As described above, the molded article having the foam layer inside or/and on the surface of the molded article by the blowing (foaming) is referred to as the foam-molded article.

In other words, the "foaming" means the operation that the outside pressure such as the GCP, the back pressure and the injection pressure applied to the foaming gas is reduced or eliminated (from the state that the foaming gas is compressed to a smaller volume in the resin, finely dispersed or/and dissolved by pressure) and the volume of the foaming gas in the resin is increased or/and the dissolved foaming gas is changed into gas. The "foaming" also includes the process extruding the thermoplastic resin having foaming properties from the heating cylinder to foam the thermoplastic resin or the process of generating the foaming gas by evaporation, pyrolysis or chemical reaction of the liquid/solid foaming agent.

The "foamable resin" means the molten thermoplastic resin in which the foaming gas effective for the foam molding is finely dispersed or/and dissolved by pressure. In other words, the "foamable resin" means the thermoplastic resin containing the gaseous foaming agent, the liquid foaming agent or/and a commercially available foaming agent. In the present invention, the state of the resin such as the fact of having foaming properties and the fact of including the gaseous/liquid foaming agent or/and a commercially available foaming agent is described as accurately as possible. For example, the descriptions such as "the thermoplastic resin having foaming properties in the molten state" and "the thermoplastic resin containing the foaming agent or the thermosetting resin containing the foaming agent" are used.

The "foam-molded article" means the resin molded article having discontinuous foam cells inside the resin molded article and obtained by a molding process of the thermoplastic resin having foaming properties. The size of each of the foam cells is 1.000 µm (micron, micrometer) or less. In the present invention, even when both the hollow parts and the foam cells exist simultaneously, it is also referred to as the foam-molded article.

The "simultaneous use" means that one thing (method) is used simultaneously with another thing (method) or combined with another thing (method) instead of being used alone. For example, even when one of the molding processes is still effective, the synergistic effect can be expected and the effect of the one process or/and both processes can be increased when one process is simultaneously used with another process (e.g., GCP and hollow molding, GCP and gas pressure molding). A plurality of kinds of foaming agents can be simultaneously used instead of being used alone. A commercially available foaming agent can be simultaneously used. Gaseous, liquid and solid foaming agents can be simultaneously used.

The "foaming auxiliary" means the substances used for the purpose of reducing the decomposition temperature of the foaming agent or accelerating decomposition of the foaming agent, for example. As the foaming auxiliary of the organic foaming agent, zinc stearate, barium stearate, metallic soap, urea (having function and effect of reducing the decomposition temperature of ADCA), zinc flower (zinc oxide) can be listed, for example. Inorganic acid and organic acid (e.g., citric acid) used for decomposing the carbonate and the hydrogen carbonate can be also referred to as the foaming auxiliary.

The "foaming nucleating agent" means the substances mixed with the resin to be molded and the foaming agent for the purpose of forming fine foam cells (fine foam cells are defined as the foam cells having a diameter of 2000 µm or less in the present invention). For example, the carbonate such as zinc flower, silica, talc, titanium oxide, calcium carbonate and barium carbonate, and sulphate such as calcium sulfate and barium sulfate can be listed as the foaming nucleating agent. Additives of the resin such as a pigment also function as the foaming nucleating agent. The alkali metal salts of the organic acid especially such as sodium dihydrogen citrate and potassium dihydrogen citrate function efficiently as the foaming nucleating agent.

The "mixing ratio of foaming agent" is the ratio of the weight or the volume of the foaming agent included in the resin to be molded with respect to the weight or the volume of the resin to be molded while the weight or the volume of the foaming agent is defined as 1. For example, when 2 wt. % or 2 vol. (volume) % of the liquid foaming agent is used for the resin, the mixing ratio is expressed as 2:100 (or 1:50 or 1/50) or 2 wt. %, 2 vol. %, for example.

(Masterbatch of Foaming Agent)

As for a commercially available foaming agent, when inorganic substance such as the sodium bicarbonate or the potassium bicarbonate is used for the foaming agent, the organic substances such as ADCA and DPT have a property of powder. Thus, when the foaming agent of the powder is used, oils such as paraffin oil, olive oil and rapeseed oil and the powdery foaming agent are added to the pellet of the resin to be foamed and mixed with each other (by using a tumbler or the like) so that the foaming agent is spread and attached to the pellet before using them.

The above described method of spreading and attaching the foaming agent can be used when the resin to be used is a little. However, when a large amount of resin is used, the operation of the spreading and attaching the foaming agent is troublesome work. The masterbatch of the foaming agent is manufactured by using the resin having the miscibility and the compatibility with the resin to which the foaming agent is blended.

In case of the masterbatch, since the masterbatch is formed as the shape of the pellet same as the shape of the resin to be foam molded (which is generally the pellet), the amount (optimum adding amount of the masterbatch of the foaming agent) can be easily and optimally stabilized by using a tumbler, an automatic coloring device, or the like. As a result, the foam-molded article having a stable foaming ratio can be obtained.

The resin (which is the resin of a main component of the masterbatch and referred to as a carrier resin or a base resin) used for the masterbatch of the foaming agent or the foaming nucleating agent of the present invention should have the miscibility and the compatibility with the resin to be blended.

The "miscibility" means the property that the resins are mixed with each other in a molecular level in the heating and melting stage in case of the thermoplastic resin. For example, AS (acrylonitrile-styrene copolymer) has miscibility with ABS (acrylonitrile-butadiene-styrene terpolymer), PS (polystyrene) and HIPS (high impact polystyrene) have miscibility with PPO (polyphenylene oxide) and PPE (polyphenylene ether). Since the PPO and the PPE have approximately same molecular structure (e.g., oxidative polymer of methylated or ethylated phenol monomer), they are referred to as PPO (PPE) in the present invention.

The PPO (PPE) modified or metamorphosed (mixed) by using HIPS or/and PS to form a blend polymer or a polymer alloy is referred to as a modified PPO (modified PPE) or m-PPO (m-PPE).

The "compatibility" means the case where the resins do not have miscibility with each other but one resin is dispersed in the other resin showing a sea-island structure or other structures. For example, a B-rubber which is a polymer (high molecular) formed by graft-copolymerizing acrylonitrile and styrene to butadiene rubber has compatibility with the ABS. When the resins have miscibility or compatibility with each other, the physical properties are not deteriorated at all or deteriorated a little. The miscibility and the compatibility are referred to as compatibility (miscibility) in the present invention. The compatibility (miscibility) means the case having the miscibility and/or the compatibility.

(Polypropylene, PP)

The PP available for the present invention will be explained. The PP is a polymer of propylene. The polypropylene having different stereoregularity (tacticity) such as isotactic, syndiotactic and atactic can be synthesized. The PP is classified into three types in the type of the copolymerization with copolymer (mainly ethylene): homopolymer; random copolymer; and block copolymer. The homopolymer is a polymer of only polypropylene. The polypropylene is polymerized by using hydrogen as a chain transfer agent. Either n-butyl group or i- (iso-) propyl group is formed according to the difference. The polymer obtained by metallocene catalyst has the structure as if the ethylene is copolymerized by 2,1 insertion or 1,3 insertion. The melting point of the isotactic PP measured by a differential scanning calorimeter (DSC) is approximately 165° C. On the other hand, the equilibrium melting point is said to be 187.5° C. The melting point increases as the tacticity increases. The random copolymer normally contains 4.5 wt % or less ethylene in the copolymer.

A ternary copolymer (terpolymer) obtained by further copolymerizing butene-1 with the ethylene and a binary copolymer of polypropylene and butene-1 (not containing ethylene) also exist and these are available. The random does not necessarily mean statistically random. The distribution (randomness) of the polypropylene in the main chain of the ethylene differs depending on a kind of the catalyst. The ethylene content is not necessarily equal in all molecular weight fractionations. The content of the ethylene is different between low molecular weight chain and high molecular weight chain. Namely, the distribution of the ethylene content (distribution of copolymer composition) exists. The distribution of the copolymer composition is narrower and more uniformly in the polymer obtained by using metallocene catalyst compared to the case using a solid catalyst. The random copolymer has lower crystallinity, excellent transparency, excellent toughness and higher softness compared to the homopolymer. The melting point is lower as the content of the comonomer (copolymerized monomer is mainly ethylene) increases. The block copolymer is also called an impact copolymer or a heterophasic copolymer. This means the composition containing ethylene-propylene copolymer obtained by polymerizing the homopolymer and then copolymerizing the ethylene in the subsequent reaction tank. The block copolymer has a compatibilized structure (sea-island structure) which looks as if "islands" of the ethylene-propylene copolymer are floating in "sea" of the homopolymer. The sea-island structure can be controlled by the ethylene ratio and the molecular weight of the ethylene-propylene copolymer and the molecular weight of the homopolymer. The phrase of "block" in the polypropylene does not mean a normal block copolymer unless otherwise indicated. Namely, the phrase of "block" does not mean that the homopolypropylene chain and the ethylene-propylene copolymer chain are chemically bonded. The block copolymer having the content of the ethylene-propylene copolymer of 40 wt. % to 50 wt. % or more is sometimes called a reactor made TPO (ThermoPlastic Olefin), a reactor TPO or merely a TPO. The block copolymer is superior to the homopolymer in impact-resistant. The block copolymer is inferior to the homopolymer in transparency.

As described above, the polypropylene, the ethylene-propylene copolymer, the propylene-1-butene-ethylene copolymer, the propylene 1-hexene copolymer, the propylene-1-hexene-ethylene copolymer, the propylene-4 (or 5)-methyl-1, the 4-hexadiene copolymer and the like are exemplified as the PP.

The isotactic PP and the syndiotactic PP are the crystalline resin. The isotactic PP can have a crystal structure such as α-crystal, β-crystal and γ-crystal based on 3/1-helical chain. The crystal structure (i.e., prevailing crystal structure) of the syndiotactic PP is an orthorhombic crystal based on 8/1-helical chain.

The above described PP is used as the molding material of the present invention. In addition to independently use the above described PP, it can be mixed with other resin for giving a desired property and using it as a blend polymer. The blend polymer can be manufactured in the stage of the palletization. Alternatively, different kinds of materials can be mixed and blended in a hopper in the injection molding in the stage of measuring the materials entered in a heating cylinder of the injection molding machine. This is called "mold blend."

(Masterbatch of Foaming Agent for PP)

The above described PP formed in a pellet shape is also used for carrying the powder of the foaming agent. The foaming agent can be manufactured by mixing the powder of PP and the powder of the foaming agent and hardening the mixture like H processing by using the varnish such as maleic acid-modified PP for pelletizing them (carrying the foaming agent on the periphery of the pellet of the PP).

Hereafter, the principle of the H processing will be shown. The pellet of the PP is added in a frying pan, which is a cooking appliance coated with Teflon and the pellet of the PP is heated to approximately 80° C. Then, 20 wt. % of the powder of the sodium bicarbonate is added with respect to the pellet of the PP, for example. The solution of the maleic acid-modified PP is sprayed on the mixture while the mixture is stirred so that the pellet and the foaming agent are uniformly mixed. The solvent contained in the maleic acid-modified PP solution is evaporated. As a result, the sodium bicarbonate is carried on the periphery (surface) of the pellet of PP while the maleic acid-modified PP acts a binder (e.g., function of glue). After the solvent is evaporated sufficiently, residual substance is taken out. Thus, it can be used as the masterbatch of the foaming agent carrying 20 wt. % of the sodium bicarbonate. When the pellets are adhered to each other, the masterbatch is sieved to uniform particle diameter. The masterbatch is crushed as needed.

The masterbatch of the foaming agent for PP manufactured by the foaming agent manufacturers such as EIWA CHEMICAL IND. CO., LTD, SANKYO KASEI CO., LTD. and Otsuka Chemical Co., Ltd. is manufactured by using inorganic or organic foaming agent and the PE (polyethylene) having compatibility with the PP as a carrier resin or a base resin and is commercially available. For example, EIWA CHEMICAL IND. CO., LTD sells Polythlene EE207 (trade name).

The masterbatch of the foaming agent of Polythlene EE207 (trade name, grade, base resin: PE) manufactured by EIWA CHEMICAL IND. CO., LTD is added by 3.5 wt. % to PP (Noblen AZ864) to form the molded article without having the swirl marks (reference numeral 3) by the later described GCP method. However, the phenomenon (reference numeral 2) similar to the swirl marks is seen near the gate (FIG. 1).

When the foaming agent of Polythlene EE25C (trade name, grade, base resin: PE) manufactured by EIWA CHEMICAL IND. CO., LTD is used, the phenomenon similar to the swirl marks occurs near the gate.

As a result of FT-IR (infrared spectroscopy analysis), it is revealed that the phenomenon similar to the swirl marks is the PE contained in the masterbatch of the foaming agent. When the powder of ADCA is spread and attached to the pellet by using paraffin oil and the foam molding is performed by the GCP, the phenomenon of the reference numeral 2 shown in FIG. 1 does not occur near the gate. The reference numeral 1 shown in FIG. 1 is the gate.

Figure 3:
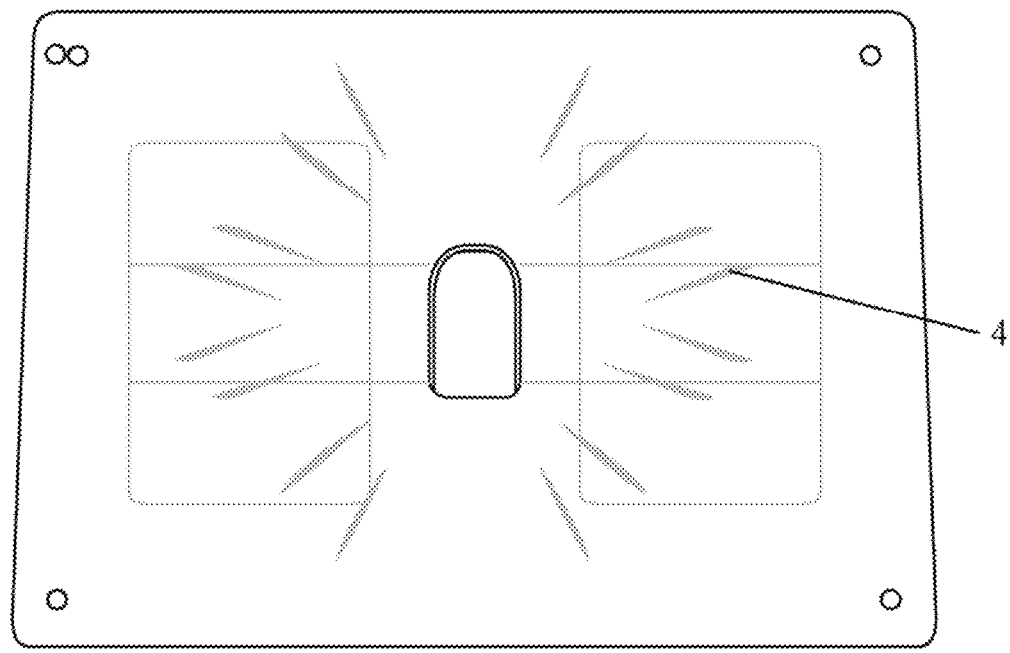
FIG. 3 is a drawing (photograph) (used material: transparent ABS) showing a state that swirl marks are formed on the entire surface without performing GCP.

As reference, FIG. 3 shows the situation that the swirl marks occur on the entire surface in the foam molding (transparent ABS) without performing the GCP.

As for the means for solving the above described problem, the inventor considered to use the PP having compatibility with the PP to be foam molded as the base resin of the masterbatch of the foaming agent. Even when a single or multi screw extruder, a kneader and the like are used, since the melting temperature of the PP is higher than that of the PE by 20° C. or more, the foaming agent to be blended is pyrolyzed in the process of melt kneading in the above described devices. Thus, the function of the masterbatch of the foaming agent is deteriorated. Namely, the amount of the foaming gas to be generated per unit (e.g., per 100 grams of the masterbatch of the foaming agent) is reduced.

As for the means for solving the above described problem, the inventor got the idea that the foaming agent (e.g., ADCA, sodium bicarbonate) is carried on the surface of the pellet of PP by heating the pellet of PP to be foam molded on the plate while stirring with paraffin oil, stearic acid, volatile solvent and the powder of the foaming agent. When the above described masterbatch of the foaming agent is used, since the PE does not exist, there is no problem of occurring the silver streak near the gate shown in FIG. 1 and FIG. 2 caused by the PE.

As for the above described processing method, TOWA CHEMICAL CO., LTD has already had the mass production technology of processing the masterbatch of colorants. Therefore, as for the masterbatch of the foaming agent for the PP, the inventor experimentally produced the masterbatch of the foaming agent containing 10 wt. % of ADCA and the masterbatch of the foaming agent containing 10 wt. % of sodium bicarbonate while the PP which has miscibility and compatibility with the PP is used as the base resin.

The inventor confirmed that the foaming agent for PP (PP having miscibility or/and compatibility with PP) could be manufactured by entering 90 parts of the pellet of the PP, 10 parts of the powder of ADCA and 5 parts of Multi-primer EXC-3000 as the binder in Henschel Mixer (product name), and gradually raising the temperature of the mixer from the room temperature to 60° C. while stirring the mixture. Thus, the solvent contained in Multi-primer EXC-3000 is evaporated and the ADCA is carried on the periphery of the PP. Here, the binder can be entered from the first, but the binder can also be entered by spraying or dropping. The foaming agent for PP can be also manufactured by using the sodium bicarbonate or the potassium bicarbonate instead of the ADCA. In addition, the emulsion type primer or the suspension type primer where the multi-primer is mainly composed of the maleic acid-modified resin can be also used (shown in Example 18).

The masterbatch of the foaming agent containing ADCA was manufactured by mixing 70 wt. % of the pellet of the PP, 20 wt. % of the powder of ADCA and 10 wt. % of the maleic acid-modified PP (ARROWBASE DB-4010 manufactured by UNITIKA LTD., property is emulsion type), heating the mixture to approximately 80° C., and drying/solidifying the mixture (evaporating the solvent such as water in the emulsion).

It was also confirmed that the masterbatch of the foaming agent could be also manufactured by using the powder of the sodium bicarbonate instead of the ADCA. In addition, it was also confirmed that the masterbatch could be also manufactured by using sodium dihydrogen citrate which was the foaming nucleating agent.

In the above described means (method), other than the sodium bicarbonate, alkali metal salts of hydrogen carbonate or micro balloons, hollow air bubbles and the like in the foaming agent sold as ADVANCELL (trade name) can be also used as the foaming agent (masterbatch) since they can be carried on the surface of the pellet of the resin.

HARDLEN NZ-1015 (emulsion type, aqueous type) sold (marketed) by TOYOBO CO., LTD. containing the maleic acid-modified (amount of dissolved solids are approximately 30 wt. %) can be also used. The maleic acid-modified PP (PMA-H1100P, PMA-F6 (trade name)) is powder. The mixing ratio of the powder of the PP, the ADCA and PMA-H1100P or PMA-F6 is set to 7:2:1, and the mixture is heated to approximately 100° C. so that the maleic acid-modified PP is melted. Thus, the ADCA can be carried on the periphery of the pellet of the PP. The maleic acid-modified PP obtained by dissolving the above described maleic acid-modified PP using the organic solvent (e.g., toluene, alcohol and ketone) can be used.

There are many kinds of molecular structures of the maleic anhydride depending on a functional group. When the maleic acid-modified PP is used for manufacturing the foaming agent for PP, the varnish, the emulsion or the suspension dissolved by using the solvent can be used. An emulsifier (surface active agent) is used when manufacturing the emulsion and the suspension. When the thermal stability of the emulsifier is not good, the problem of discoloration and scorch may occur on the foam-molded article. The emulsifier is not used or the emulsifier having good thermal stability (emulsifier is not pyrolyzed under the molding temperature) is used.

By using the above described method, the foaming agent can be carried on the pellet of the PE by using the maleic acid-modified PE. The above described masterbatch of the foaming agent is also used for PE.

By applying the means for manufacturing kompeito (sugar plum) to the powder of the AS or the powder of the ABS, the sodium bicarbonate and small amount of water, the masterbatch of the foaming agent for the foam molding can be manufactured when the resin to be molded is the AS or the ABS. The masterbatch for PS and HIPS can be also manufactured easily. By using the above described method, the masterbatch for coloring the PC can be manufactured.

(Masterbatch of Foaming Agent for ABS)

The manufacturing method of the masterbatch of the foaming agent for ABS will be explained. First, the dope cement is manufactured by dissolving the ABS using, for example, methyl ethyl ketone (MEK, 2-butanone, methyl ethyl ketone, n-butanone) as the solvent capable of dissolving the ABS. Then, the pellet of the ABS is entered in Henschel Mixer and then the powder of the foaming agent (e.g., ADCA and sodium bicarbonate) is entered in Henschel Mixer, and the dope cement is sprayed while the mixture is heated to approximately 45° C. The viscosity of dope cement is adjusted by MEK or other solvents such as the toluene as needed so that dope cement can be sprayed. After the drying is finished, the masterbatch of the foaming agent can be obtained in a state that the foaming agent is carried on the periphery (surface) of the pellet of the ABS.

In case of the foaming nucleating agent (e.g., sodium dihydrogen citrate), the masterbatch of the foaming nucleating agent can be manufactured by carrying the foaming nucleating agent (property: powder) instead of the foaming agent similarly.

The urea is the substance for reducing the decomposition temperature of the foaming auxiliary such as the ADCA. When the urea is carried by using the similar means, the masterbatch of the foaming auxiliary (masterbatch carrying the foaming auxiliary) can be obtained.

The dope cement of the ABS was used for the binder for carrying the foaming agent. However, Repele S#1100 shown in Example 6 is an acrylic coating material and the styrene-modified acrylic resin, which is the main component of it, has compatibility with the ABS, the HIPS and the m-PPO (m-PPE). Thus, the varnish (e.g., ACRYDIC M-1156 (trade name) which is the styrene-modified acrylic resin manufactured by DIC Corporation) used for manufacturing Repele S#1100 (trade name) can be used instead of the dope cement of the ABS. In addition to the ABS, the AS can be also used since the AS has compatibility with the ABS. Of course, the styrene-modified acrylic resin of the emulsion type can be also used in addition to the solvent type.

In case of the PS, the HIPS and the m-PPO (m-PPE), it is preferable to use the dope cement of the HIPS or/and the PS instead of the ABS. In case of the PC, the dope cement of the PC or the ABS having compatibility with the PC can be used. Of course, in case of the varnish of the emulsion type, the above described dope cement can be used as the emulsion. The masterbatch of the foaming agent for ABS using the styrene-modified acrylic resin can be also used for the PC.

In case of the PC, when the sodium bicarbonate or the ADCA is used for the foaming agent, the foam molding having a smooth surface can be obtained by using the GCP device of the present invention. However, the physical properties are deteriorated extremely due to the foaming agent. As for the effective foaming agent for the foam molding of the PC, the means of injecting volatile liquid such as ethanol into the molten resin to evaporate the ethanol and give foaming properties to the resin by using the vapor of the ethanol or the means of entering dry ice into the molten resin (in case of the injection molding machine, a hole is formed in the middleway of the heating cylinder to inject an optimum amount of the dry ice into the molten resin) to sublimate the dry ice, evaporate the carbonic acid gas in the PC, and give foaming properties to the resin are effective. The above described method can be also performed for the other thermoplastic resins. In this case, when the foaming nucleating agent is used, finer foam cells can be formed.

As described above, the foaming agent, the foaming nucleating agent or the foaming auxiliary is carried on the pellet to form the masterbatches of different kinds. When each kind of masterbatch is mixed with the pellet with an optimum ratio before the molding process, the mixing ratio can be easily changed and an optimum foamed state can be created easily.

As for the carrier resin used for manufacturing the masterbatch of the HIPS, the ABS and the modified PPO (modified PPE) modified by using the HIPS, the ABS has the structure where the butadiene rubber on which the acrylonitrile is grafted is floated as islands on the sea of the AS, for example. The AS forming the sea structure is used although the above descried grafted butadiene rubber can be also used. The PS can be used for the HIPS and the modified PPO (modified PPE).

In the present invention, the pellet or the powder (powder in the middle of the manufacturing can be used in case of the PP) of the resin to be foam molded is used for manufacturing the foaming agent. Since the resin of the same kind is used, the deterioration in physical properties can be reduced or avoided.

(Coating Appropriateness)

A primer treatment was applied to the molded article of the PP having the swirl marks caused by the PE shown in FIG. 1 and FIG. 2 using Multi-primer EXC-3000 (trade name, product number) manufactured by Musashi Paint Co., Ltd. and used in Example 6, and then a top coating was applied by a coating material of EC-GPX79-ECO HAI-UREX Silver (mixing ratio of main agent and curing agent was 10:1) (trade name, product number) manufactured by Musashi Paint Co., Ltd. When the molded article was tested for 240 hours based on the salt water spray test (Salt Spray Test (SST)) of Japanese Industrial Standards (JIS) K5600-7-1, the blister occurred near the portion where the PE appeared.

When the masterbatch containing 10 wt. % of the ADCA as the foaming agent was used for the base resin of the PP and the appropriateness of the coating film was evaluated similarly by SST, the blister did not occur since the PE is not contained and the adherability of the coating film was good.

When the sodium bicarbonate was used as the foaming agent and the PP was used as the base resin, the malfunction caused by the PE was not seen near the gate.

When the coating was similarly applied and the adherability test (SST) of the coating film was performed, the blister of the coating film occurred on the entire surface and the coating appropriateness was not good. When the surface of the foam-molded article was observed in detail, the residue (unreacted sodium bicarbonate and foam residue of, sodium carbonate) was seen. The inventor considered that the foam residue was the reason of the blister. When the foam-molded article was immersed in acetic acid solution of 1 wt. % for 10 minutes, washed with water and dried to remove the foam residue. Then, the coating was applied to the foam-molded article. As a result, the blister of the coating film was not seen and the coating appropriateness of the coating film was good.

(Removal of Foam Residue)

For removing (removal by dissolving) the foam residue existed on the surface of the molded article formed by the foam molding using the hydrogen carbonate represented by the sodium bicarbonate, the molded article was immersed in an acid solution or the acid solution was sprayed on the surface of the molded article for dissolving the carbonate and the hydrogen carbonate of the alkali metal existing on the surface of the molded article and then the coating was performed. When the above described method was used, it was confirmed that the blister and the peeling were not seen on the coating film.

The acid used for the acid cleaning is a strong acid such as hydrochloric acid, sulfuric acid, nitric acid and chromic acid or weak acid represented by acetic acid, citric acid, malic acid and sulfamic acid. Both the acid of inorganic type (inorganic acid) and the acid of the organic type (organic acid) can be used.

The effect of dissolving the carbonate (removal from the surface of the molded article) becomes higher as the concentration (PH) of hydrogen ions of the solution used for the acid cleaning becomes lower. However, if the PH is low, the working environment is bad. The chemical reaction (chemical reaction and neutralization reaction between the foam residue and the acid in the molded article) is possible if the PH is 7 or less. When the temperature of the solution is increased during the acid cleaning, the effect of the removal is increased. The effect of removing the foam residue is increased as the temperature of the solution of the cleaning liquid becomes higher. The above described acid can be used alone or used as a mixed acid.

(Coating Appropriateness of Other Foaming Agents)

The adhesiveness test was performed by using ADVANCELL which was a commercially available foaming agent for No. 6 of TSOP (the resin mainly composed of PP and used for the resin molded article of automobiles in TOYOTA MOTOR CORPORATION).

As a result, similar to the case of the sodium bicarbonate, the blister occurred and the adherability of the coating film was deteriorated. The adherability of the coating film was deteriorated also when FINEBLOW (trade name) was used.

It is presumed that the reason of causing the deterioration in FINEBLOW is the usage of the sodium bicarbonate for the foaming agent.

(GCP)

The GCP is a means of eliminating the swirl marks generated on the surface of the foam molding. The GCP is a process of preliminarily compressing (pressurizing) the molding space in the sealed mold shown in FIG. 10, FIG. 11 and the like by, for example, air, nitrogen gas, carbonic acid gas, carbon hydride such as methane and ethane, or rare gas such as hydrogen, helium and argon with the pressure higher than atmospheric pressure. The above described process of preliminarily compressing the molding space is referred to as a GCP. The action of preliminarily compressing the molding space is also referred to as "gas compression." The gas in the molding space ($L_1$, $L_2$ and $L_3$) is also referred to as "compressed gas (pressurized gas)." The process of compressing the molding space by the compressed gas, filling the foamable resin having foaming properties and then discharging the compressed gas is also the GCP.

The gas compression is an effective means for obtaining the foam-molded article having an excellent outer appearance without having swirl marks by suppressing the foaming at the surface, but the compressed gas can be bothersome since it obstructs the filling of the resin. In the GCP, the compressed gas is pressed to the parting line (PL) by the force of filling the resin filled into the molding space and the surface transferability is improved. When the speed of filling the resin is too fast, when the surface of the mold is glossy, when the depth of embossing is too shallow, when the temperature of the resin is too high, when the viscosity of the molten resin filled in the molding space is low or when the temperature of the mold is high, the gas of the GCP is involved in the resin. The involved gas of the GCP cannot be escaped and stayed at the surface to form sink marks (referred to as a raindrop in this case).

As for the means for solving the above described problem, after the gas of the GCP is discharged, the mold is opened (retreated, recessed, or the mold-back or the core-back is performed) to suddenly discharge the gas of the GCP involved in the surface of the molded article to outside. The evacuation is performed as needed as shown in FIG. 49.

It has been already described that the gas vent of approximately 0.05 is formed on the PL of the mold. It is also possible to provide sintered metal (portion of the reference numeral 149 in the right part in FIG. 50) on the PL. In this case, since the strength of the sintered metal is low, a part of the sintered metal is sandwiched by the material having high strength (hardness). It is also possible to form the parting line in multilayers (the portion of the reference numeral 150 located at the left side of the PL in FIG. 50) so that the gas is discharged smoothly (FIG. 51).

Figure 51:
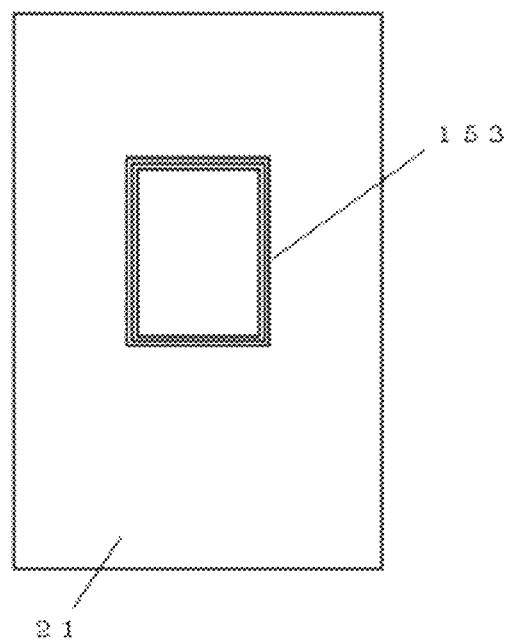
FIG. 51 is a schematic diagram showing the structure of the mold where the means of flowing the compressed gas onto/out from the product surface of the mold is shown.
Figure 52:
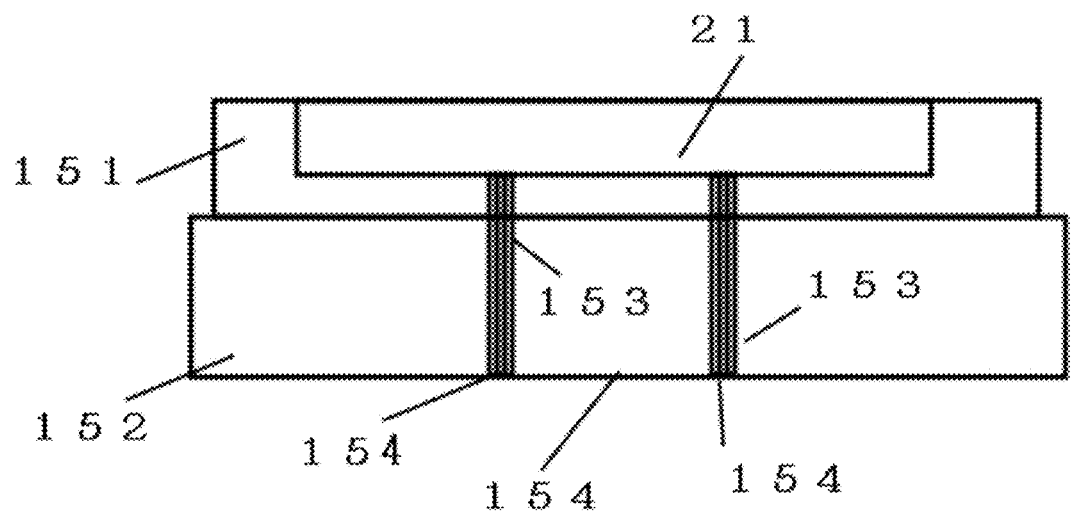
FIG. 52 is a schematic diagram showing a cross-section of FIG. 51.

As shown in FIG. 51, it is also possible to form the gas vent (reference numeral 153) at the center part of the mold. In this case, since the gas vent 153 is covered with the molten resin, the function and effect of discharging the gas is small. It is effective to discharge the gas from the parting line. Since the mold shown in FIG. 10 and FIG. 11 has a nested structure (e.g., reference numeral 23), the compressed gas can be entered in the molding space and the same effect as the reference numeral 153 can be obtained. Since the gas can be partly discharged, the gas circuit (e.g. FIG. 39) formed on the PL is necessary.

(Principle of GCP)

The principle of the GCP will be explained by using a carbonated water shown in FIG. 6. The carbonated water is the substance obtained by dissolving the carbonic acid gas into the water by pressure. A cap (cock, reference numeral 5) located at the upper part is closed, and the carbonic acid gas is compressed (pressurized) and dissolved in the reference numeral 7 (water as solvent) by the pressure (reference numeral 6) applied to the portion of the reference numeral 6. In the carbonated water (reference numeral 7), the carbonic acid gas is in a supersaturation state under the atmospheric pressure.

When the cap 5 is opened, the pressure of the reference numeral 6 becomes the atmospheric pressure. Thus, the carbonic acid gas excessively dissolved becomes gas to be foamed. The reference numeral 8 is a container.

Here, if the carbonated water is replaced with the heating cylinder of the injection molding machine, the cap of the reference numeral 5 is a shut-off nozzle. The container (glass or plastic bottle) of the reference numeral 8 is the heating cylinder. When the foaming agent and the resin pellet are mixed with each other in the hopper and the mixture is heated and molten, the foaming agent is pyrolyzed and the foaming gas is generated. When the back pressure of a predetermined pressure or more is applied in the stage of the plasticization and the measurement, the foaming gas is finely dispersed in the molten resin of the heating cylinder or dissolved by pressure in the molten resin of the heating cylinder.

As for the typical example of the foaming gas, nitrogen gas, carbon monoxide, carbonic acid gas, water vapor and vapor of the organic solvent such as alcohol can be listed.

Since the nitrogen gas has low affinity (solubility) with the thermoplastic resin, a large part of the nitrogen gas is finely dispersed in the resin. Since the carbon monoxide and the carbonic acid gas have high affinity, a large part of the carbon monoxide and the carbonic acid gas is dissolved in the resin. The water vapor has an approximately intermediate solubility between the nitrogen gas and the carbonic acid gas. The alcohol vapor has extremely high affinity with the resin. When the alcohol vapor or the like is used for the foaming gas, the fluidity of the molten resin is increased.

The foaming gas in the heating cylinder is governed by Henry's law and Boyle's law. The former Henry's law is applied to the gas represented by the carbonic acid gas having high affinity with the molten resin. The latter Boyle's law is applied to the gas such as the nitrogen gas having low affinity with the molten resin.

(GCP Mold)

The principle of the GCP will be explained by using beer where the carbonic acid gas is dissolved by pressure same as the carbonated water (shown in FIG. 7 and FIG. 8).

Figure 7:
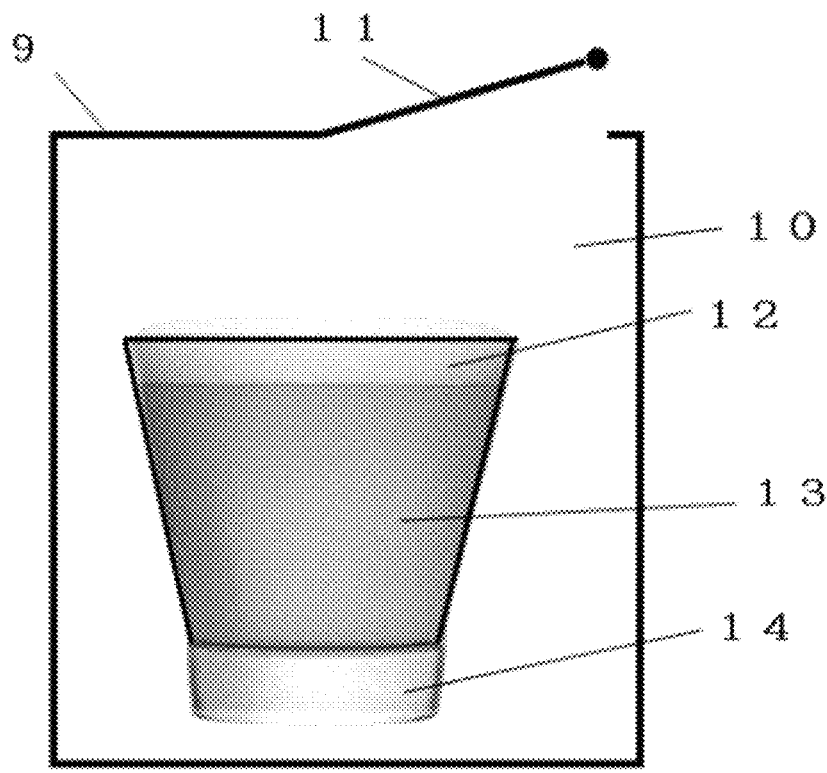
FIG. 7 is a drawing (photograph) showing a reason of foam formation.
Figure 8:
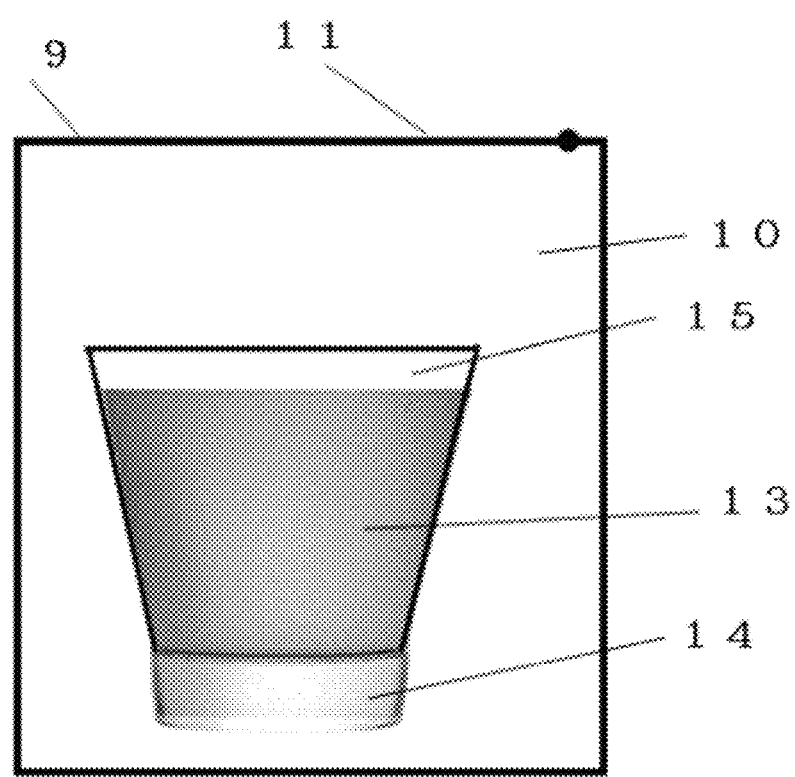
FIG. 8 is a drawing (photograph) showing a principle of GCP.
Figure 9:
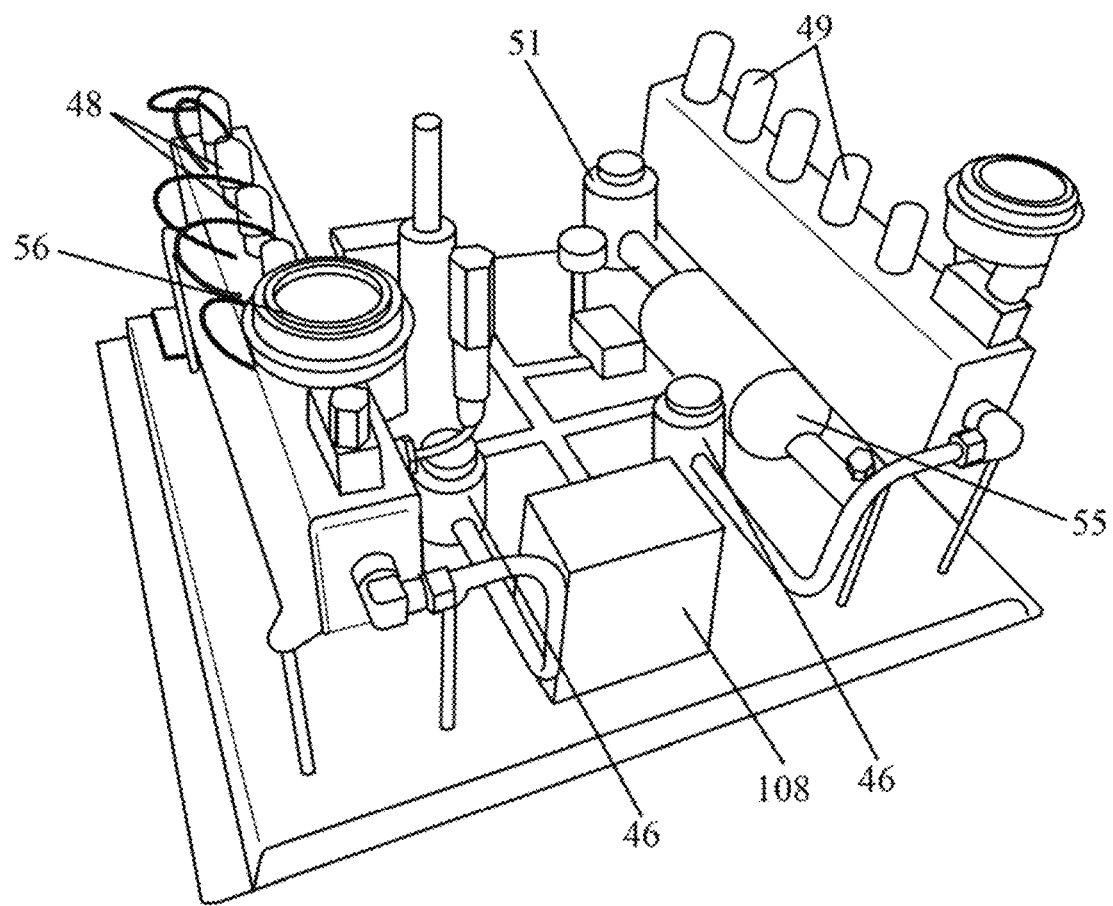
FIG. 9 is a GCP device.

When the beer is poured in a glass while the space (reference numeral 10) partitioned by the reference numeral 9 is under atmospheric pressure (same pressure as 1 atm) by opening a door (reference numeral 11), the foam (reference numeral 12) of the beer appears on the upper part of the glass as shown in FIG. 7. Then, when the door of the reference numeral 11 is closed and the partitioned space (reference numeral 10) is compressed by the air to the pressure (10 atm) ten times as much as the atmospheric pressure by using a compressor or the like and beer is poured in the glass under the compressed atmosphere, the beer can be poured without forming the foam since the pressure of 10 atm is applied from the outside (FIG. 8).

Then, when the door 11 is opened and the pressure in the space 10 is suddenly reduced from 10 atm to 1 atm, the external pressure is reduced and the carbonic acid gas, which is dissolved in the water by pressure and in a supersaturation state, appears inside the beer in accordance with Henry's law. The above describe phenomenon indicates the principle of the GCP. In case of the nitrogen, the foaming gas, which is reduced in volume by the compressed gas, increases in volume since the compressed gas is discharged and the external pressure (corresponding to the pressure of the GCP and preliminarily applied pressure in the mold) is eliminated.

The means for performing the processing of the injection molding will be explained specifically. In the manufacturing method of the foamable resin, the foaming properties are applied to the thermoplastic resin by mixing the resin pellet to be foam molded with the foaming agent of gas, liquid or solid in a desired ratio and adding the mixture to the molten resin in the heating cylinder. The resin is not limited to the pellet. The resin can be powder or bulk. The shape of the resin is not limited as long as the resin can be plasticated in the heating cylinder of the molding machine. The ratio of the foaming gas with respect to the volume of the resin to be molded is 25 vol. % to 250 vol. %. However, when the pressure of the compressed gas is low, the force (pressure) of suppressing the foaming is small and the foaming agent cannot be added a lot. When the pressure of the compressed gas is high, a lot of foaming gas can be dissolved by pressure and finely dispersed. When the air is used for the GCP, the pressure is approximately 2 MPa. When the nitrogen gas is used, the pressure is same as the air. When the carbonic acid gas is used, it is preferred that the pressure is slightly lower than the critical pressure at the temperature of the compressed gas since the carbonic acid gas is easily liquefied. When the foaming agent is liquid, the resin to be foam molded can be impregnated with the liquid. For example, when the ABS is immersed in the water and the ABS is impregnated with the water and then the molding is performed, the water in the ABS is evaporated at the temperature in the heating cylinder (temperature of the heating cylinder, the screw and the molten resin) to function as the foaming agent. It is also possible to impregnate silica gel with water to be mixed with the pellet. When the foaming agent is gas, the gas is added to the plasticized and molten resin to apply foaming properties to the heated and molten resin. Of course, similar to the gas, the foaming agent of the liquid can be also added to the heated and molten resin to apply foaming properties to the heated and molten resin. When the foaming agent is solid, the foaming agent is mixed with the pellet and then entered in the hopper. It is possible to form a hole on a part of the heating cylinder. For example, solid carbonic acid gas (dry ice) is entered in the molten resin of the heating cylinder to sublimate the dry ice. Thus, foaming properties can be applied to the inside of the molten resin. In this case, there is no foam residue and the adherability of the coating film is not affected. Of course, the sodium bicarbonate and chemical foaming agent such as the ADCA can be also used similar to the dry ice. In the stage of the plasticization where the resin is heated, molten and plasticated, the foaming agent is evaporated and pyrolyzed to generate the foaming gas. Thus, the foaming agent is finely dispersed in the molten resin heated and molten in the heating cylinder. In order to finely disperse the foaming agent, it is preferred to increase the pressure applied to the molten resin in the heating cylinder. In order to compress (pressurize) and melt the resin, it is generally preferred to increase the back pressure during the plasticization and increase the rotational speed of the screw. The shape of the screw is preferably high kneading type. If needed, when the screw having the Dulmage is used, the foaming gas is finely dispersed in the molten resin easily. Thus, the foam cells formed inside the foam-molded article become smaller and finer.

The property of the foaming agent can be any one of gas, liquid and solid.

In the foaming agent of the gas, since the forming agent is injected into the heating cylinder and dispersed by the screw, the specification like the Dulmage is required. When the forming agent is the liquid or the solid, since the gas is generated at a molecular level (the liquid is mainly evaporated and the solid is mainly pyrolyzed) and concentrated to form the foaming gas, the Dulmage can be eliminated although it is also possible to provide the Dulmage. In the foaming agent of the solid, since the foaming agent is preliminarily mixed with the resin pellet as the masterbatch and then plasticated, the Dulmage is not used in many cases although the Dulmage can be provided. The means for finely dispersing the foaming gas generated from the foaming agent of any one of gas, liquid and solid in the molten resin of the heating cylinder will be described below.

The screw used for the plasticization is preferably has high kneading property and high L/D ratio. When the plasticization (melt-kneading) is performed for a long time while applying high back pressure, the foaming gas is finely dispersed in the molten resin.

As described above, when the plasticization (measurement) is performed while applying high back pressure, the molten resin in the heating cylinder leaks from the tip of the nozzle by the back pressure and the pressure of the foaming (the resin plasticated in the heating cylinder, the resin having foaming properties). For solving the above described problem, a shut-off nozzle having any one of a spring-type air cylinder, a hydraulic cylinder or a mechanical mechanism is used. It is necessary to continue to apply the pressure to the molten resin in the heating cylinder and suppress the foaming of the resin in the heating cylinder after the measurement is finished until the next injection so that the molten resin in the heating cylinder is not foamed in the heating cylinder. This is referred to as a back pressure blocking (end back pressure).

Here, the function of the shut-off nozzle has the same function as the above described cap of the reference numeral 5. A hot runner having a valve-gate structure opened and closed by a hydraulic means, a pneumatic means or other mechanical means (e.g., actuator) has the same function as the shut-off nozzle.

The mold structure for the GCP can be classified into an ejector box type (FIG. 10) and a type of sealing the ejector pin with the loaded O-ring or the like (FIG. 11). Each structure will be explained by using FIG. 10 and FIG. 11.

First, the ejector box type (FIG. 10) will be explained. In FIG. 10, the reference numeral 16 is a spool bush, the reference numeral 17 is a mounting plate of the fixed side, the reference numeral 18 is a mold plate for housing a nested element of the fixed side, the reference numeral 19 is the nested element of the fixed side, and the reference numeral 20 is a mating surface of the nested element of the fixed side for allowing the gas to flow into or out from the mating surface (gas can easily pass through the mating surface). The reference numeral 21 is a cavity (molding space) into which the molten resin is filled, the reference numeral 22 is a mold plate for housing a nested element of the mobile side, the reference numeral 23 is the nested element of the mobile side, the reference numeral 24 is an ejector pin, the reference numeral 25 is an (upper) ejector plate for fixing the ejector pin, the reference numeral 26 is a (lower) ejector plate for fixing the ejector pin, the reference numeral 27 is a spacer block and a support pillar having a sealing function, the reference numeral 28 is a mounting plate of the mobile side, and the reference numeral 29 is a hole of an ejector rod. The reference numeral 30 is a mating surface of the nested element of the mobile side, and the reference numeral 20 is a mating surface of the fixed side of the nested element for allowing the gas to flow into or out from the mating surface (gas can easily pass through the mating surface).

In order to form the sealed mold from the mold, it is necessary to arrange an O-ring on each clearance (mating surface). The reference numeral 31 is an O-ring arranged on the spool bush, the reference numeral 32 is an O-ring arranged on the mounting plate of the fixed side, and the reference numeral 33 is an O-ring arranged on the parting line. A cross-sectional shape of the above described O-rings is not necessarily a circular shape. The cross-sectional shape of the O-rings may be a triangular shape, a square shape or a polygonal shape. The cross-sectional shape of the O-rings also can be a V-shape or a U-shape.

The nested element forming the cavity of the mobile side is finely divided into a child nest (reference numeral 23), a grandchild nest (not illustrated) and the like. These are fixed to mold plate of the reference numeral 22 by bolts (not illustrated) or the like. For example, even when the circuits (same circuits) provided on the parting line of the inlet and the outlet of the gas of the GCP and the cavity are compressed by using the air as the compressed gas, the gas leaks from the clearance of the nested element and the clearance of the ejector pin. For preventing the gas from leaking from the clearance of the nested element and the clearance of the ejector pin, the spacer block of the reference numeral 27 is formed in a shape of "ro" (square shape) of katakana in Japanese character for surrounding the whole ejector mechanism (reference numeral 34). The above described structure is referred to as an ejector box. In the mold structure of the above described ejector box, the reference numeral 35 is an O-ring formed between the reference numeral 22 and the spacer block the reference numeral 27 having an ejector box shape, and the reference numeral 36 is an O-ring formed around the hole of ejector rod for sealing the hole when the ejector plate (reference numeral 34, ejector mechanism) is retreated.

Figure 12:
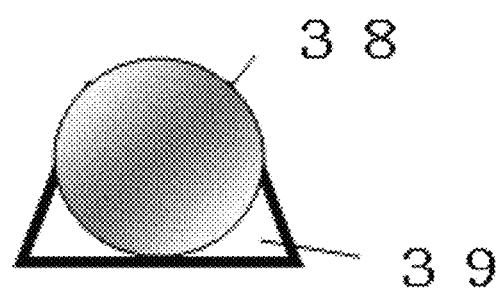
FIG. 12 is a schematic diagram showing a dovetail groove for fixing an O-ring.

In FIG. 10, since the parting line and the ejector plate are movable, it is required to prevent the O-rings (reference numeral 33 and reference numeral 36) from detaching. For example, the O-rings are fitted into a dovetail groove (reference numeral 39). In FIG. 12, the reference numeral 38 is the O-ring of one of the reference numeral 33 and the reference numeral 36 (FIG. 12).

Figure 13:
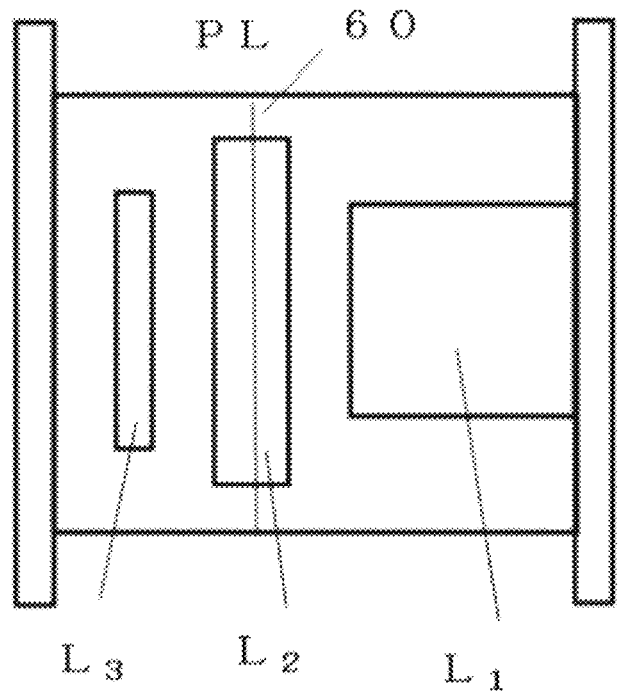
FIG. 13 is a schematic diagram showing a mold structure for foam molding where pneumatic spaces $L_1$ to $L_3$ of the mold of FIG. 10 are shown.

In FIG. 11, it is not necessary to form the ejector box (space sealed by the reference numeral 27, $L_1$ in FIG. 13). Thus, the reference numeral 37 is a spacer block having a normal shape (simple square block shape).

In case of FIG. 10, since the ejector mechanism (reference numeral 34) is surrounded by the reference numeral 27, the space formed by them (volume compressed by the air or the like) is large and a large amount of the gas is required for the compression.

Even when the air is used for the gas, the structure of FIG. 10 is economically disadvantageous. When the nitrogen gas, the carbonic acid gas and the like are used for the compressed gas, the structure of FIG. 10 is not realistic since a large amount of gas is used and consumed.

When expensive gas such as the nitrogen gas, the carbon dioxide and the like are used, it is possible to collect the gas after the usage and reuse it. However, it is necessary to be careful sufficiently since there is a risk of the trouble of a boosting device or the like when the monomer in the resin enters in the boosting device or the like.

Figure 24:
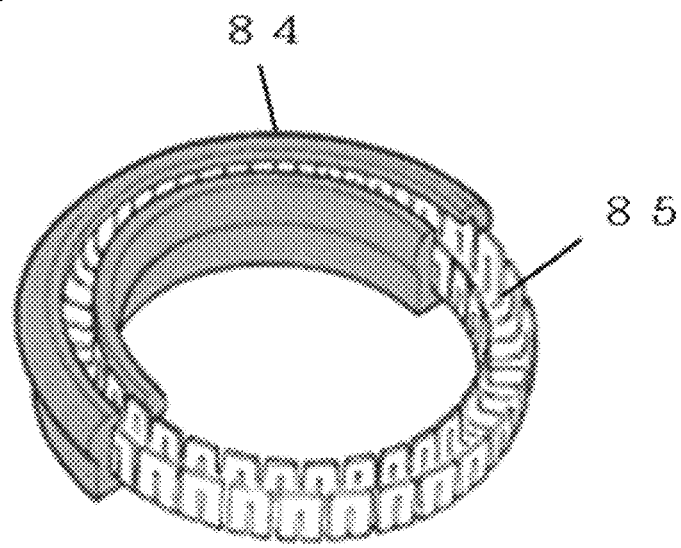
FIG. 24 is a schematic diagram explaining a loaded O-ring (a spring having a function of applying load is assembled).
Figure 25:
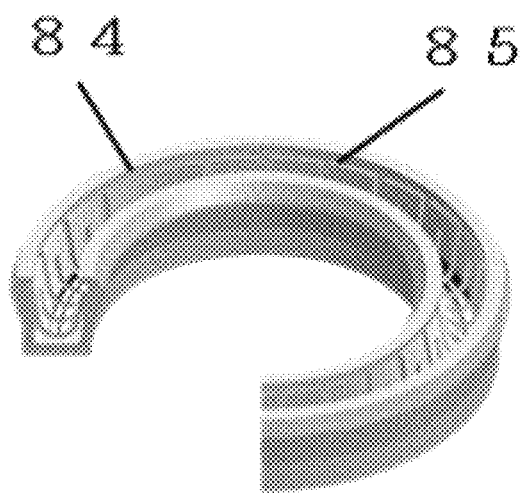
FIG. 25 is a schematic diagram with cross-section explaining the loaded O-ring (an opening portion of the spring having the function of applying load is directed upward).
Figure 26:
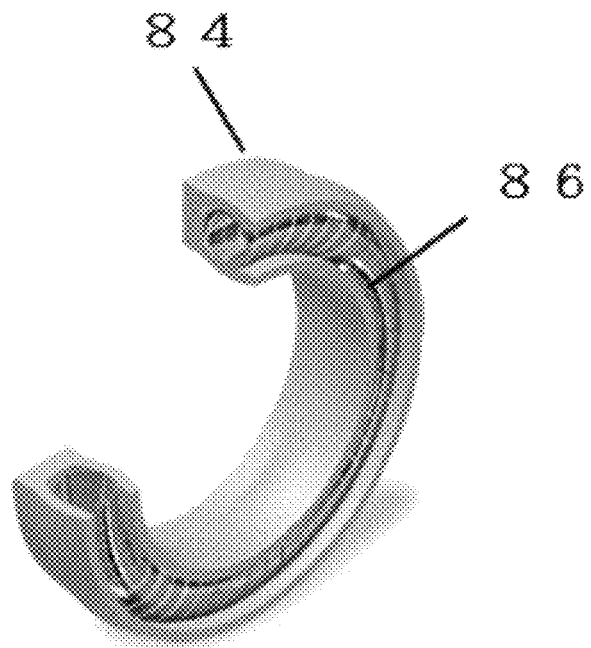
FIG. 26 is a schematic diagram with cross-section explaining the loaded O-ring (an opening portion of the spring having the function of applying load is directed downward).
Figure 27:
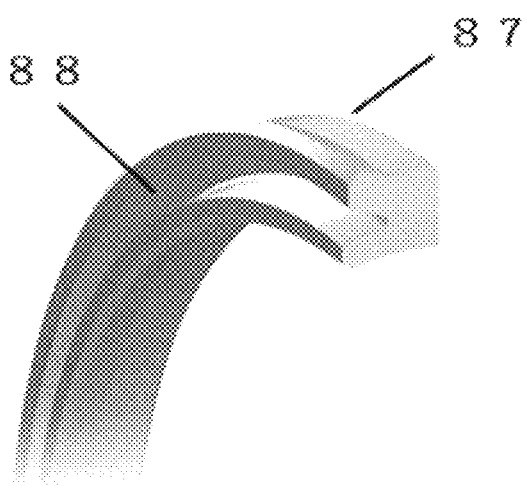
FIG. 27 is a schematic diagram showing a cross-section of a U-shaped (V-shaped) O-ring.
Figure 28:
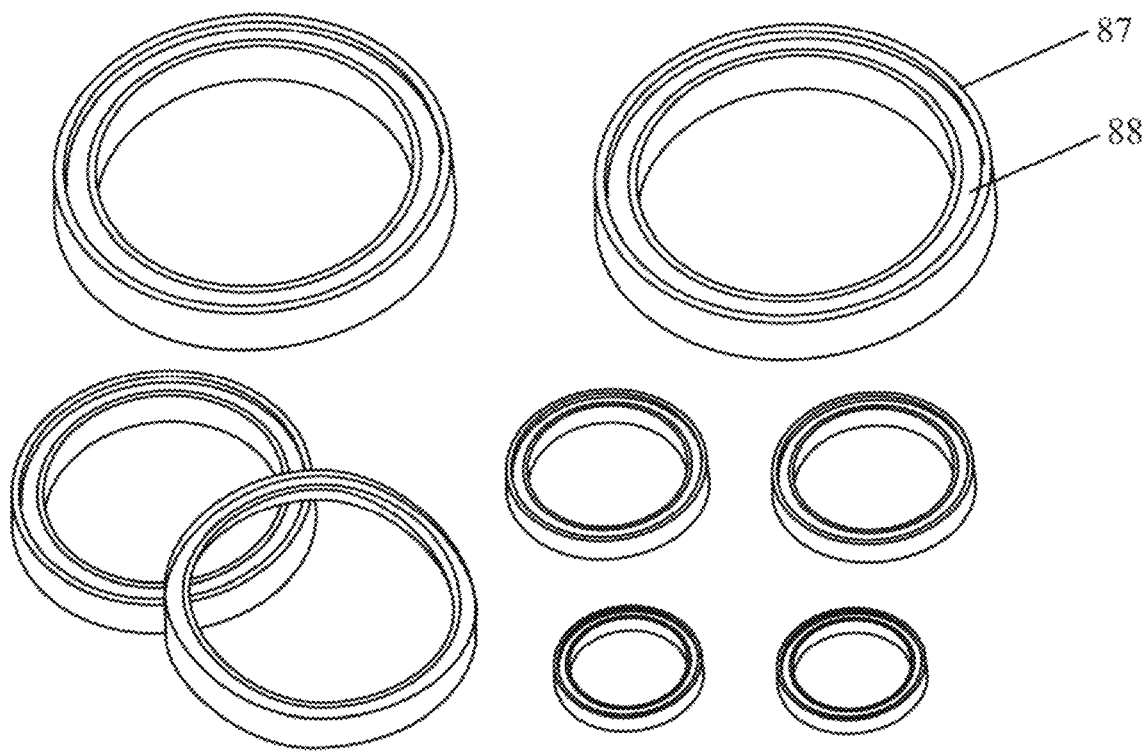
FIG. 28 is a schematic diagram showing U-shaped (V-shaped) O-rings.
Figure 29:
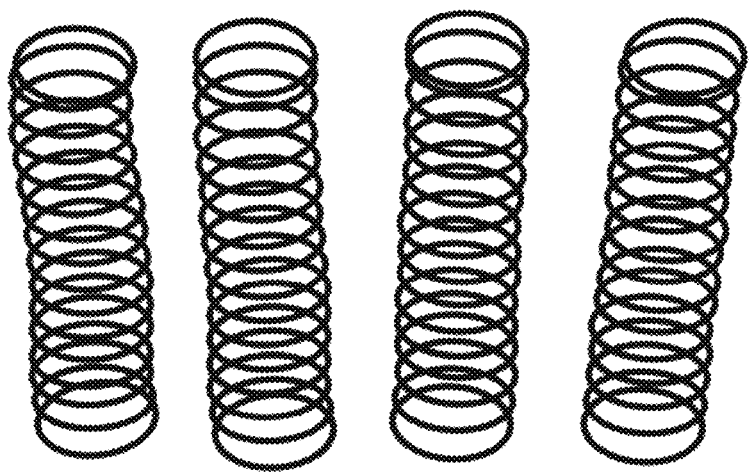
FIG. 29 is a drawing (photograph) of commercially available coil springs having the substitution function of the reference numeral 85.
Figure 30:
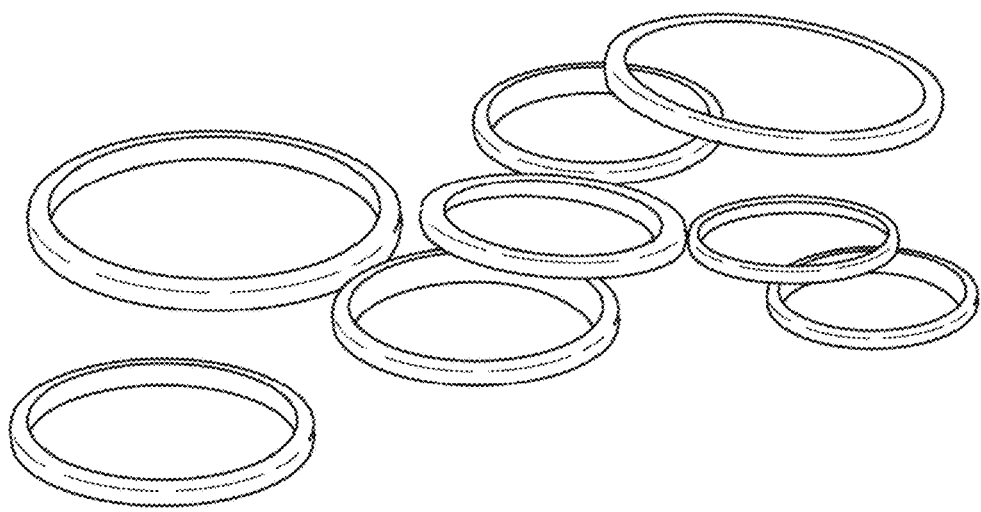
FIG. 30 is a drawing (photograph) of commercially available O-rings.

Instead of the ejector box of the reference numeral 27, when the ejector pin is sealed by using the loaded O-ring of the present invention where the O-ring (packing, seal) has a U-shaped groove (recess) as shown in FIG. 24, FIG. 25, FIG. 26, FIG. 27 and FIG. 28, the above described economical problem can be solved since the amount of the gas required for the gas compression can be reduced. The packing having a U-shape as shown in FIG. 27 and the loaded O-ring (e.g., Omni Seal (trade name), Variseal (trade name)) having a spring (for the purpose of loading function and fastening to the inside) of the reference numeral 85 having a U-shape inside shown in FIG. 24, FIG. 25 and FIG. 26 are effective for sealing the ejector pin. Instead of the spring having a U-shape (reference numeral 85), a spring having a general shape shown in FIG. 29 and a commercially available O-ring shown in FIG. 30 can be also used. The material of the packing having a U-shape and the loaded O-ring is preferably Teflon (trade name) having high slidability, a material in which approximately 10 wt. % of graphite is contained in Teflon for increasing the slidability, Turcon (trade name) and a silicone rubber. A urethane rubber and a nitrile rubber can be also used.

Figure 36:
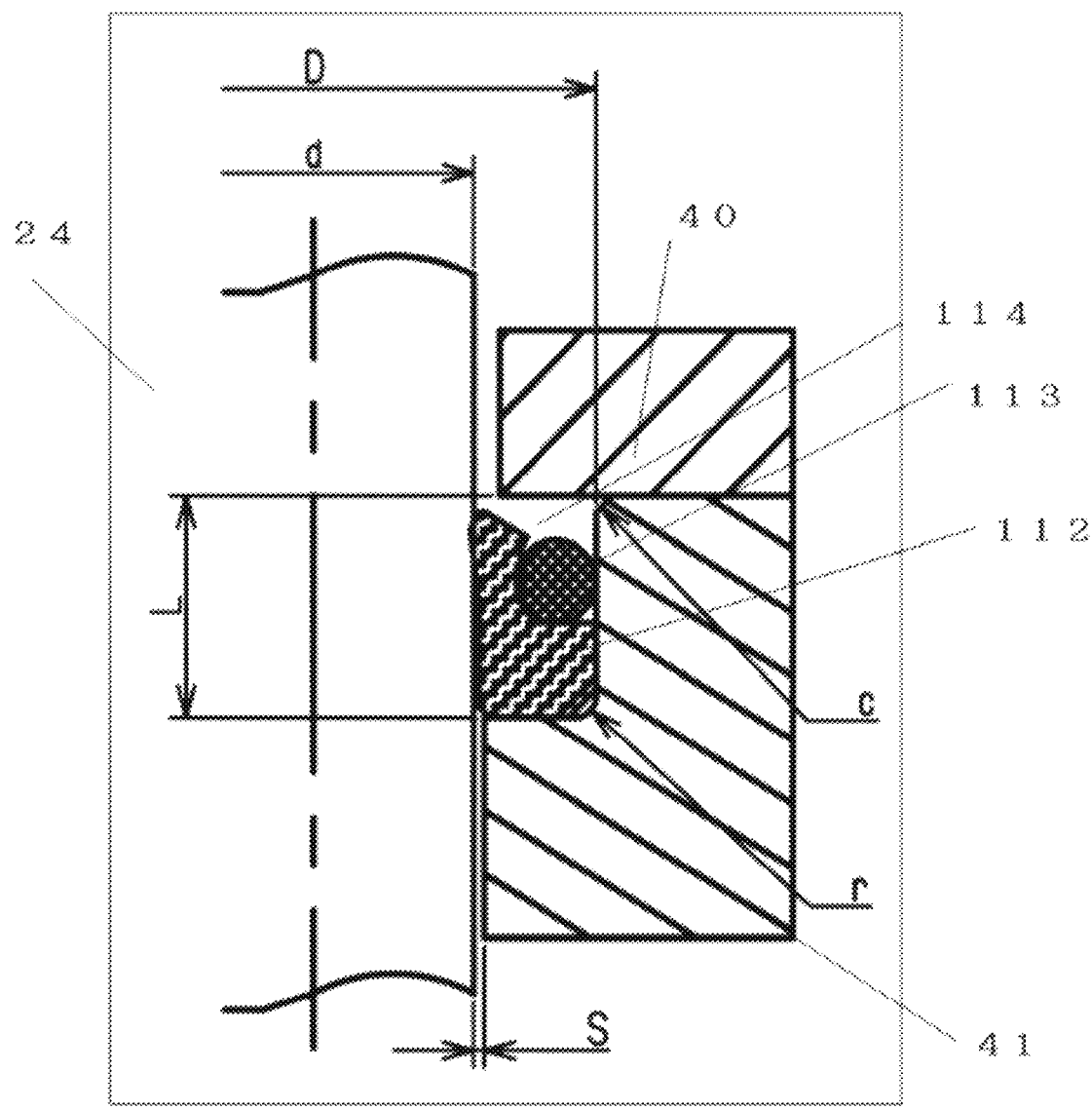
FIG. 36 is a schematic diagram of a single acting (single loaded) O-ring for sealing the ejector pin where the load is applied on one side of the O-ring.

As shown in FIG. 36, when a single acting seal (fastening to the inside) is used, the sealing force is strong and enough airtightness can be ensured even when the pressure is low. The O-ring of the reference numeral 42 is used while the O-ring is fitted in the ejector pin to fix and support the O-ring. Thus, the O-ring of the reference numeral 42 is fitted between the (upper) plate of the reference numeral 40 and the (lower) plate of the reference numeral 41 when the O-ring is used. The O-ring (reference numeral 38) for the sealing is inserted between the (upper) plate of the reference numeral 40 and the mold plate for housing the nested element of the reference numeral 22 of the mobile side. Although the O-ring is also arranged between the (upper) plate of the reference numeral 40 and the (lower) plate of the reference numeral 41 just to be safe in FIG. 11, the O-ring is not necessary since the loaded O-ring of the reference numeral 42 is provided. In case of a tilting core, it is enough if the sealing is effective when the mold is closed (PL is aligned). Thus, it is possible that the lower part is formed in a cylindrical shape and sealed by the loaded O-ring shown in FIG. 24 to FIG. 28.

It is also possible that the shape is formed on the front part of the tilting core and the O-ring is arranged so that the sealing is effective when the mold is closed. In the mold structure of the GCP, it is enough if the sealing is effective when the mold is closed. In case of a slide core using an angular pin, the O-ring is arranged (provided) on the inner side of the O-ring (reference numeral 33) arranged on the PL. This is the same in case of the slide core of hydraulic, pneumatic or mechanical type.

When the surface of the parting line of the slide core should be sealed, the sealing is performed similar to the parting line.

In FIG. 36, the reference numeral 112 is a single acting seal and referred to as an "L-shape seal." The PTFE such as Teflon (trade name) having high slidability and a material in which approximately 5 wt. % to 25 wt. % of graphite is mixed in Teflon are used as the material of the L-shape seal. However, other materials can be also used. Although a commercially available O-ring (material is NBR, acrylonitrile-butadiene rubber or nitrile rubber) is used as the reference numeral 113 for applying the load on the reference numeral 112, the coil spring illustrated in FIG. 29 can be also used for the same purpose.

The L-shape seal is housed in a housing 114 formed by the reference numeral 40 and the reference numeral 41. The detailed shape of the reference numeral 114 is shown in FIG. 48 (Table 15). The "EP" shown in Table 15 is the abbreviation of the ejector pin. The diameter (symbol: d) and h9 (fit tolerance) of the ejector pin are shown. The K seal number is the control number of the L-shape seal having the shape suitable for each ejector pin. The diameter (D) is +0.05, the depth (L) is +0.2, the fit tolerance of the space (S) is H7/f8, the c-shape (C) of the inlet is 0.3 and the R-shape (r) of the bottom is 0.4 at the maximum (0.4 Max). The cautions when the ejector pin is inserted into the K seal are written in the remarks. The above described symbols and the like shown in FIG. 48 are made correspond to (associate with) FIG. 36.

Figure 37:
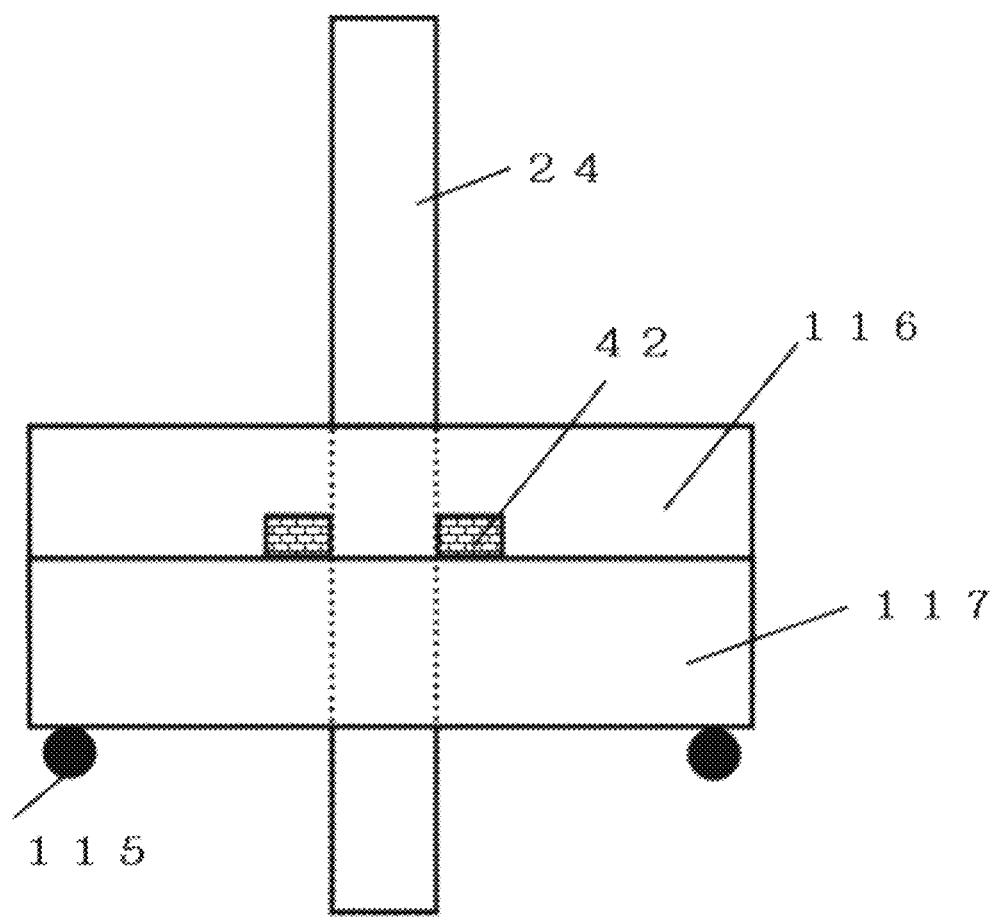
FIG. 37 is a drawing showing a means for sealing only one ejector pin.

In FIG. 11, reference numeral 42 is sandwiched by using the reference numeral 25 and the reference numeral 26 to seal the ejector pin with the loaded O-ring. In FIG. 37, the reference numeral 42 is similarly sandwiched by using the (upper) block of the reference numeral 116 (for pressing the seal) and the (lower) block of the reference numeral 117 (for pressing the seal) to seal the ejector pin 24. Different from FIG. 11, the means shown in FIG. 37 seals each ejector pin (inclined pin, inclined slide) one by one (independently). The reference numeral 115 is an O-ring having the function of the O-ring shown by the reference numeral 118 or the reference numeral 119. In FIG. 37, a plate and a volt and the like provided on the lower part of the mold plate of the mobile side for fixing the reference numeral 115 are not shown in the drawings (illustration is omitted).

(GCP Process)

The GCP device is approximately same between the mold sealed by the structure of the ejector box and the mold where the ejector pin is sealed with the loaded O-ring although a sub tank 55 is provided in the mold sealed with the loaded O-ring. (1) The mold is closed. (2) Nozzle touching is carried out. (3) The gas compressed by the compressor is injected in the mold (gas compression: this is referred to as GCP in some cases). (4) While the gas is still compressed (pressurized), the resin having foaming properties (the molten resin to which the foaming properties are given by using the physical foaming agent or/and the chemical foaming agent) is filled into the cavity. The timing of starting the injection (filling) is determined by monitoring the pressure of the gas injected into $L_2$ and confirming that the pressure reaches a desired (predetermined) pressure, for example. (5) The compressed gas is discharged or collected by a separately prepared container during the injection or after the injection is finished. (6) After the cooling of the foamable resin is finished in the mold, the mold is opened and the molded article is taken out from the mold. The means for obtaining the foam-molded article having an excellent outer appearance without having swirl marks on the surface is referred to as a GCP method. The above described process is referred to as a GCP process. In the present invention, the GCP means a series of the above described processes (the closing of the mold, the injection of the resin in the mold, the filling (injection) of the foamable resin and the discharge). The action of injecting the gas in the mold (e.g., $L_1$, $L_2$ and $L_3$) for giving the foaming properties is referred to as "to compress," "to perform GCP," "to compress (pressurize) by GCP" or "to apply pressure of GCP," for example. The "gas compression" may mean the gas itself injected in the mold (e.g., $L_1$, $L_2$ and $L_3$) in some cases.

(GCP Device)

Figure 14:
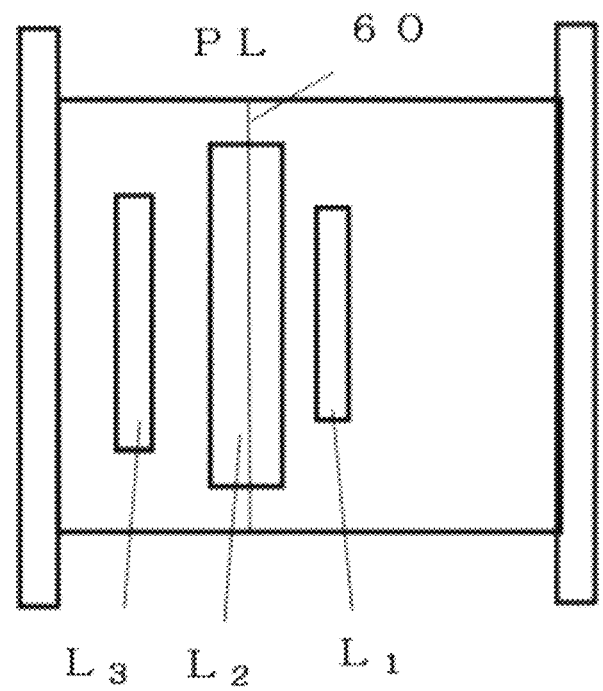
FIG. 14 is a schematic diagram showing a mold structure for foam molding where pneumatic spaces $L_1$ to $L_3$ of the mold of FIG. 11 are shown.

$L_1$ shown in FIG. 13 is the space surrounded by the reference numeral 27 for housing the ejector mechanism 34 in $L_1$. In FIG. 14, $L_1$ is the space provided on the bottom of the nested element of the mobile side. Namely, $L_1$ is the sealed space surrounded by the reference numeral 33, the reference numeral 118, the reference numeral 119 and the reference numeral 42.

In FIG. 13 and FIG. 14, $L_2$ is the space of the cavity (reference numeral 21). $L_3$ is the space formed on the bottom of the nested element of the fixed side and sealed by the reference numeral 32 and the reference numeral 33 (FIG. 13, FIG. 14). When the reference numeral 40 and the reference numeral 41 shown in FIG. 14 are used, similar to the mobile side, the O-rings corresponding to the reference numeral 118 and the reference numeral 119 should be arranged. The compressed gas is an effective means (has a role) for suppressing the foaming of the molten resin when the molten resin is filled in $L_2$. However, this prevents the filling of the molten resin into $L_2$ and may cause the short-molding, discoloration, scorch and the like.

$L_1$ and $L_3$ are provided for solving the above described problem. The gas in $L_2$ is pushed to the space of $L_1$ and $L_3$ by the force of filling the resin into $L_2$. Thus, the pressure in $L_2$ is prevented from being increased abnormally and the problem of the short-molding, discoloration, scorch and the like can be avoided.

Figure 15:
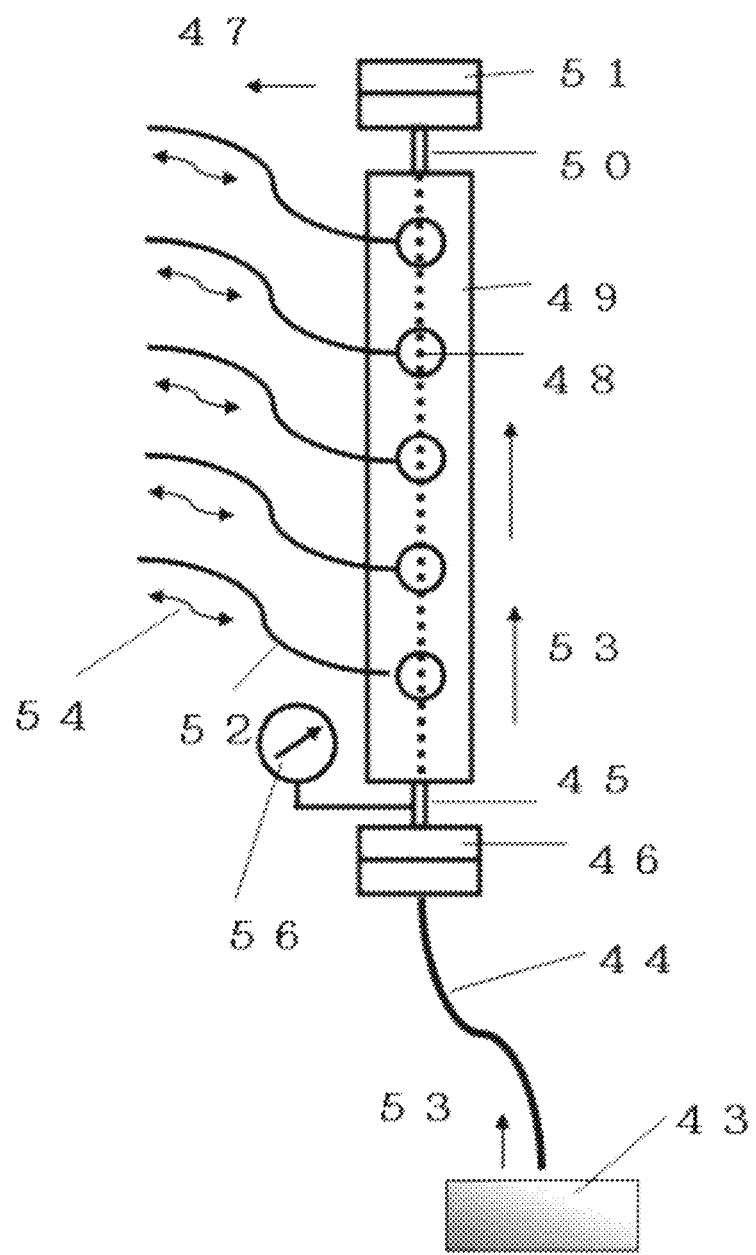
FIG. 15 is a GCP device.

FIG. 15 shows the GCP device. The reference numeral 43 is an air compressor having an injection (compression) valve (reference numeral 46) for injecting (compressing) the compressed gas compressed to the pressure higher than atmospheric pressure into the mold with an optimized timing, as described above. The reference numeral 51 is a discharge valve for discharging the compressed gas injected into the mold. From the viewpoint of safety, assuming the troubles such as power failure, the inventor selected the injection valve 46 of normally closed type and the discharge valve 51 of normally opened type. By using the above described combination, in case of the power failure, the compressed gas transferred to the mold is immediately stopped and the compressed gas transferred to the mold is immediately discharged. Thus, the accident of opening the mold by the pressure of the compressed gas can be prevented, for example. In the device shown in FIG. 15, a separately provided controller (not illustrated) or a program of the controller is integrated in the controller of the molding machine and the molding machine is operated by the command (e.g. injection and discharge of the compressed gas) of the program of the controller. The GCP device shown in FIG. 15 is a simple type having one injection valve and one discharge valve. The GCP device is connected to $L_1$ to $L_3$ via flexible hoses (reference numeral 52). In this case, the injection of the gas into the spaces of $L_1$ to $L_3$ and the discharge of the gas from the spaces of $L_1$ to $L_3$ are performed by using these hoses. Depending on the size, the shape and the like of the molded article, three devices shown in FIG. 15 may be prepared in some cases. More than three devices may be prepared in some cases.

First, the means for performing the GCP using one device shown in FIG. 15 will be explained. A plurality of hoses 52 is connected to a manifold 49. The ends of the hoses 52 are connected to the spaces $L_1$ to $L_3$ of the mold shown in FIG. 13 (the mold having the ejector box structure). When one GCP device shown in FIG. 15 is used, the injection of the gas into the space of $L_1$ to $L_3$ and the discharge of the gas from the space of $L_1$ to $L_3$ are simultaneously performed. The reference numeral 44 is a circuit (flexible hose is generally used, steel pipe can be also used) connecting the reference numeral 43 and the reference numeral 46, and the reference numeral 48 is a portion (single action coupler is generally used) connected to the hose 52. As for the shape of the coupler, the inventor used a male shape for the manifold and a female shape for the end of the hoses. Although the mold is standardized with the male shape, this is an exception. The arrow mark of the reference numeral 53 shows the flow direction of the compressed gas, the reference numeral 54 shows the fact that the injection of the compressed gas to the mold and the discharge of the compressed gas from the mold are performed by using the same hose, and the reference numeral 47 shows the fact that the compressed gas is discharged into the atmosphere.

When three devices shown in FIG. 15 are prepared and connected respectively to the spaces of $L_1$ to $L_3$ in the mold shown in FIG. 13, it is possible to inject the compressed gas simultaneously after the mold is closed and discharge the compressed gas with a time difference, for example. The case of using one device shown in FIG. 15 to connect it to the spaces of $L_1$ to $L_3$ is referred to as single stage discharge. The case of preparing three devices shown in FIG. 15 to connect them to the spaces of $L_1$ to $L_3$ respectively for discharging the compressed gas with a time difference is referred to as three stage discharge. The three stage discharge is effective for the molded article having a complicated shape. When $L_1$ and $L_3$ are discharged first and then $L_2$ is discharged with a little delay, the swirl marks can be easily suppressed (easily controlled).

Figure 16:
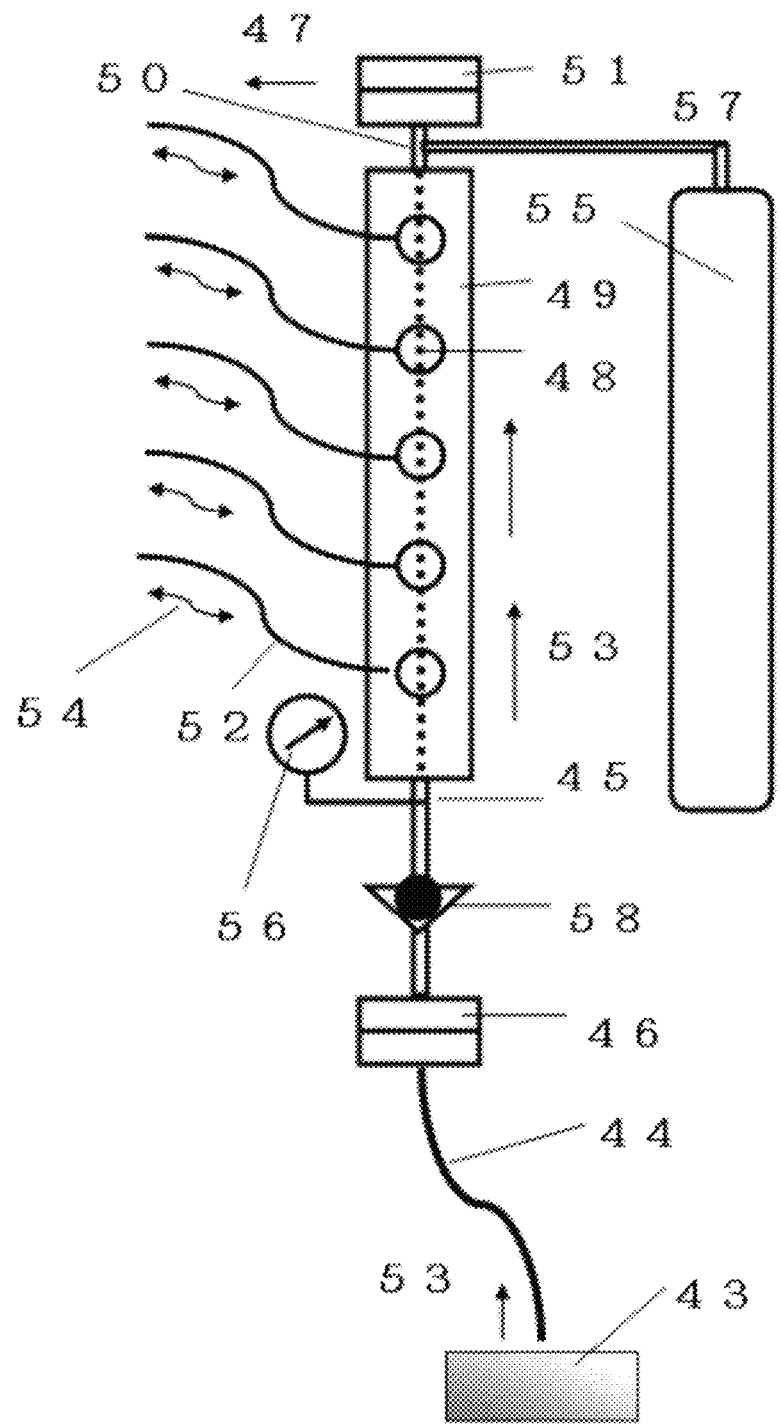
FIG. 16 is a GCP device (with a sub tank 55).

The GCP device shown in FIG. 16 is different from the GCP device shown in FIG. 15 in that a sub tank shown by the reference numeral 55 is provided. In the GCP device shown in FIG. 16 where the ejector pin shown in FIG. 14 is sealed by the loaded O-ring, the gas in the mold structure $L_2$ is transferred to the sub tank (reference numeral 55). Thus, the sub tank 55 has the function of preventing the pressure in $L_2$ from being increased abnormally.

The sub tank 55 is not required in the cases of FIG. 10 and FIG. 13 since an ejector box $L_1$ has the same role as the sub tank. However, in a large-sized molded article, the volume of the ejector box $L_1$ becomes larger, a large amount of the compressed gas is required, and extra time for compressing the gas is required. As a result, the processing cost of the molded article is increased and this is economically disadvantageous. As for the means for solving the above described problem, when the reference numeral 42 is used for sealing the ejector pin (using the loaded O-ring), the amount of the gas required for the gas compression can be smaller and the required time can be shortened. However, when the molten resin is filled in $L_2$, the place for releasing the compressed gas in the cavity is a little and the pressure in $L_2$ is abnormally increased (raised) and this may cause the short-molding, discoloration and scorch. The above described problem is solved by providing the sub tank 55 on the GCP device.

The pressure gauge of the reference numeral 56 is provided in FIG. 15 and FIG. 16. The pressure of the compressed gas in the spaces of $L_1$, $L_2$ and $L_3$ and the boosting state are measured visually or measured by using other measuring devices. Alternatively, it is also possible to start the injection when the pressure of the compressed gas reaches the preliminarily specified pressure. Consequently, the time of the transition from the gas compression to the injection can be shortened and a loss time (extra time) can be eliminated (almost at all). Thus, it is expected that the productivity is improved compared to the case of using the mold structure shown in FIG. 10. In addition, since the pressure is monitored, the occurrence of the failure caused by the insufficient pressure of the compressed gas can be monitored.

(Quick Discharge Valve)

In order to discharge the compressed gas in the mold more quickly, a quick discharge (exhaust) valve can be provided on the mold for increasing the discharge speed of the compressed gas by using QEV2 Series (trade name) manufactured by CKD Corporation or Quick Exhaust Valve AQ Series (trade name) manufactured by SMC Corporation.

(Connection and the Like Between GCP Device and Sealed Mold)

FIG. 11 specifically shows the connection between the GCP device shown in FIG. 16 and the mold in which the ejector pin is sealed. The reference numeral 127 is a circuit provided in the mold for introducing the compressed gas into the space of $L_1$ and discharging the compressed in the middle of (during) filling the foamable resin or after the filling is finished. The reference numeral 126 is a circuit provided in the mold for introducing the compressed gas into the space of $L_2$ and discharging the compressed gas in the middle of (during) filling the foamable resin or after the filling is finished. The reference numeral 125 is a circuit provided in the mold for introducing the compressed gas into the space of $L_3$ and discharging the compressed gas in the middle of (during) filling the foamable resin or after the filling is finished. The reference numeral 128 is a single action coupler provided on each circuit.

Figure 38:
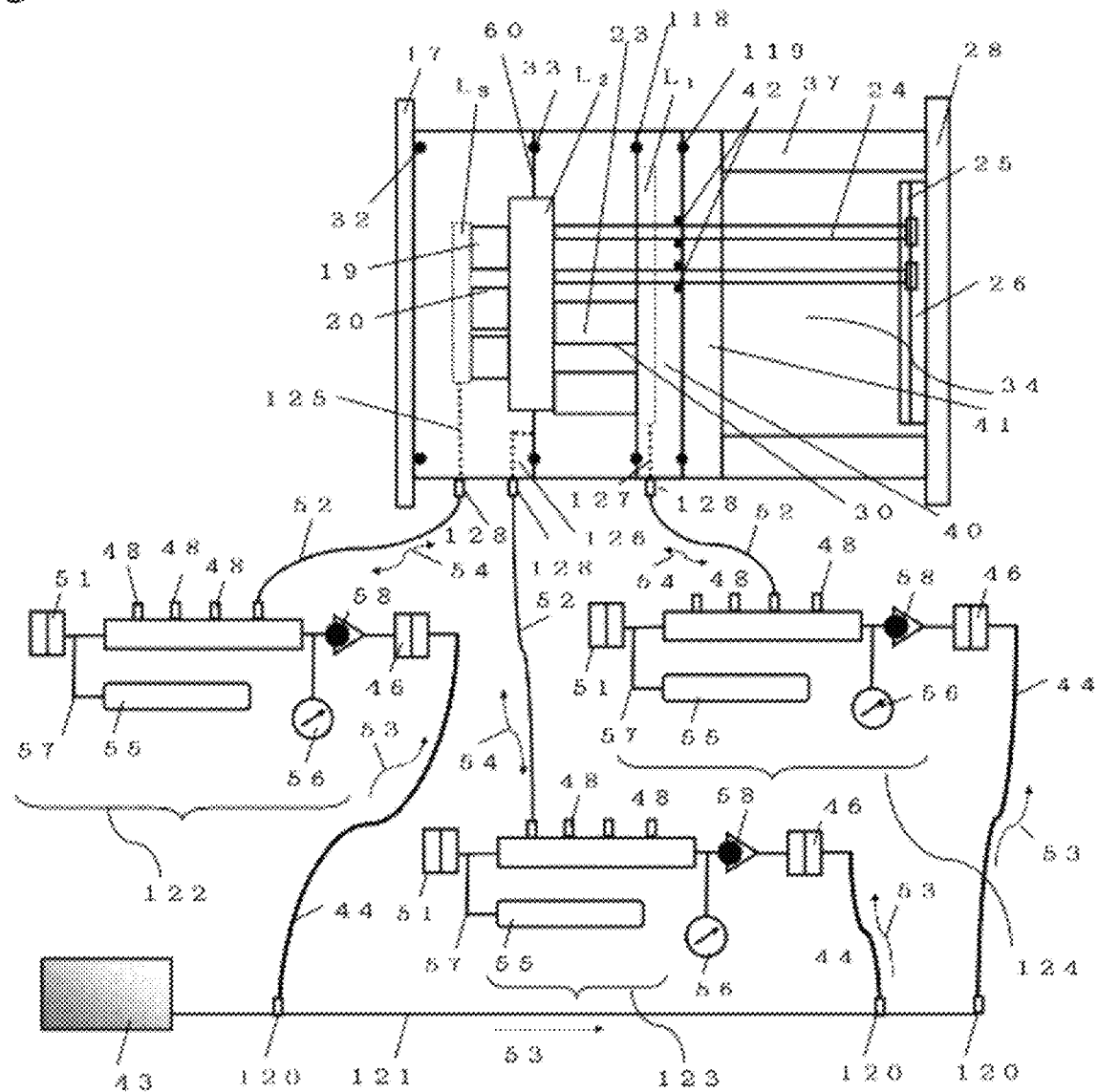
FIG. 38 is a drawing showing a connection between the mold and the GCP device, for example.

The reference numeral 118 and the reference numeral 119 are O-rings. The reference numeral 120 is a single action coupler provided on a piping 121 which is provided for introducing the compressed gas of a compressor 43 to the GCP device. The compressor 43 is provided for introducing the compressed gas into the spaces of $L_1$ to $L_3$. The reference numeral 122 is a GCP device for injecting and discharging the compressed gas into/from $L_3$. The reference numeral 123 is a GCP device for injecting and discharging the compressed gas into/from $L_2$. The reference numeral 124 is a GCP device for injecting and discharging the compressed gas into/from $L_1$. As described above, the opening and closing (injection and discharge of the compressed gas into/from the spaces $L_1$ to $L_3$ in the mold) are controlled by the injection molding machine or the separately provided controller. In FIG. 38, the GCP devices shown by the reference numeral 122 to the reference numeral 124 are connected to the mold so that multi stage discharge is enabled. When the shape is not complicated, it is possible to use one of the GCP devices shown by the reference numeral 122 to the reference numeral 124 so that single stage discharge is enabled by connecting $L_1$ to $L_3$ to a coupler 48 attached to the reference numeral 123, for example. Of course, there is no problem even when the GCP device shown in FIG. 16 is used for the mold shown in FIG. 10.

Figure 39:
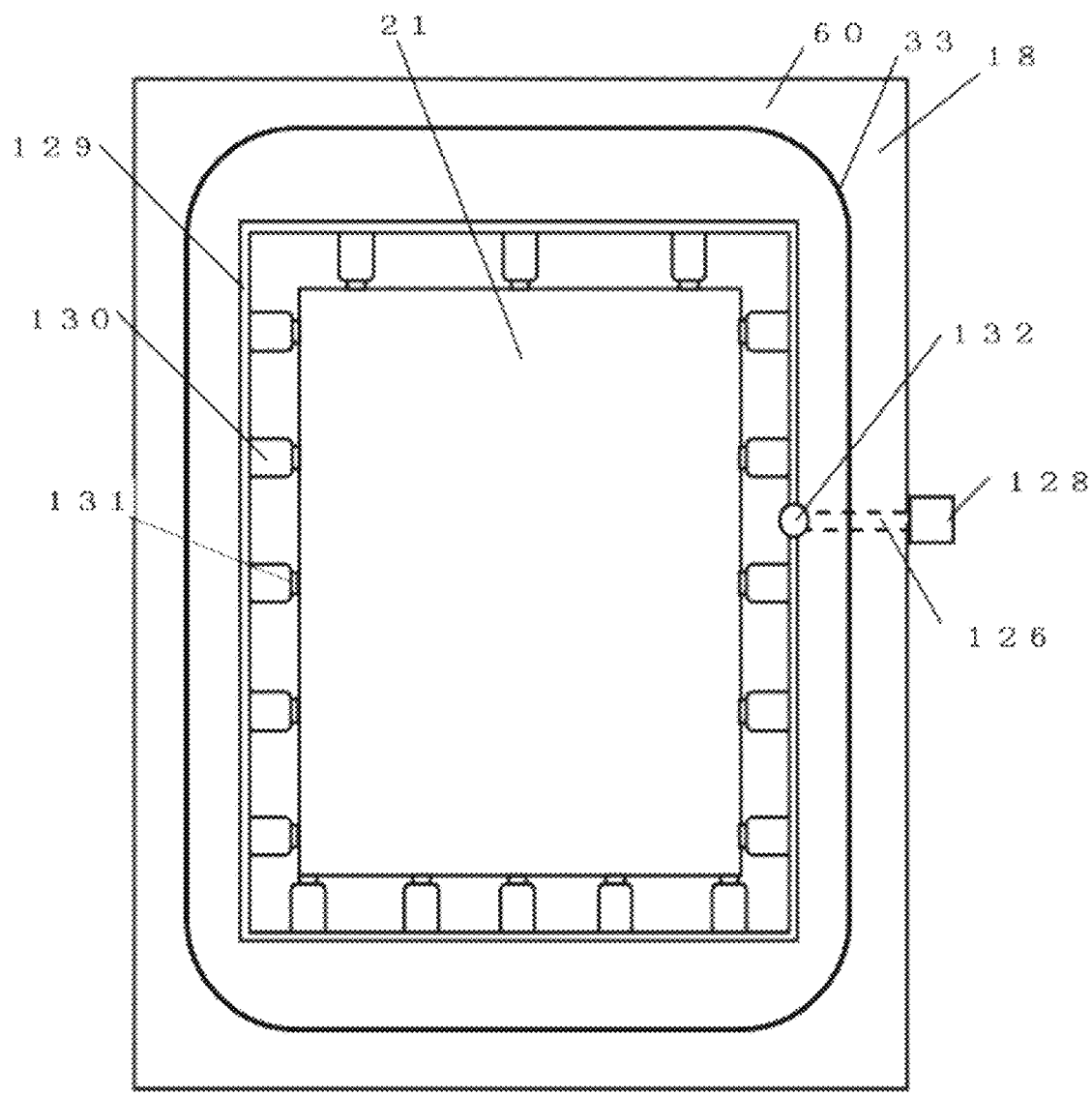
FIG. 39 is a drawing showing a gas vent of a parting line of the mold where the compressed gas of the GCP flows into or out from the gas vent.

The means for injecting the compressed gas into the space (cavity) of $L_2$ and discharge the compressed gas from the space (cavity) of $L_2$ will be explained. FIG. 39 shows a drawing of a surface of the parting line of the fixed side viewed from the front. The reference numeral 129 is a groove formed on an outside of the product shape. The inventor specified the width of the groove to be approximately 8 mm and the depth to be approximately 3 mm. However, the shape of the groove is not particularly limited as long as the groove does not obstruct the injection and the discharge of the compressed gas significantly. The reference numeral 130 is a gas vent connected to the reference numeral 129. Although the inventor formed the gas vent having the width of approximately 5 mm and the depth of approximately 1 mm, the shape of the gas vent is not particularly limited as long as the gas vent does not obstruct the injection and the discharge of the compressed gas significantly. The reference numeral 131 is also a gas vent. Since the reference numeral 131 is directly connected to the product shape (molding space), the reference numeral 131 has the shape allowing the compressed gas to pass easily while preventing the molten resin from passing. When the viscosity of the molten resin is relatively high (e.g., when the styrenic resin such as ABS is used), the inventor specified the width to be approximately 5 mm and the depth to be approximately 0.05 to 0.1 mm. When the viscosity of the molten resin is relatively low (e.g., when PP is used), the inventor specified the width to be approximately 5 mm and the depth to be approximately 0.02 to 0.05 mm. The depth of the gas vent of the reference numeral 131 is optimum when the injection and the discharge of the compressed can be performed without resistance while burr does not occur. In the foam molding of the present invention, when the resin pressure keeping is not used or when the resin pressure keeping is used with a low pressure and short time (e.g., pressure is approximately 30% of the maximum injection pressure and the compressing time is approximately 0.5 to 2 seconds) and with the primary filling speed and pressure, the amount of the foamable resin filled into the molding space is same as the volume of the molding space or smaller than the volume of the molding space. Thus, even when the gas vent is provided, burr does not occur significantly.

Figure 40:
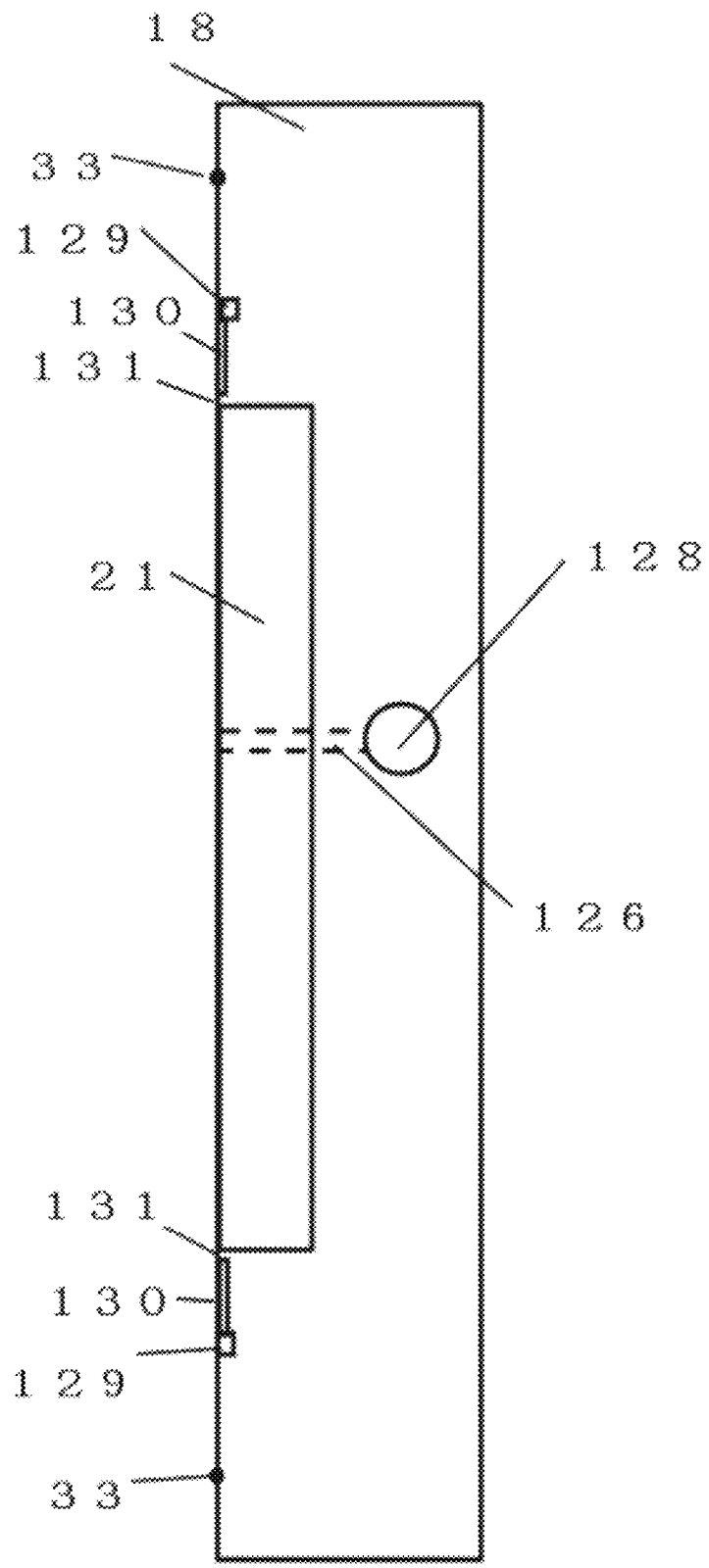
FIG. 40 is a drawing showing a gas vent of a parting line of the mold where the compressed gas of the GCP flows into or out from the gas vent.

FIG. 40 is a drawing viewed from the lateral surface of FIG. 39. FIG. 40 shows the connection between a compression gas circuit 128 connected to $L_2$ and the compression gas path formed on the mold of the reference numeral 132.

Figure 41:
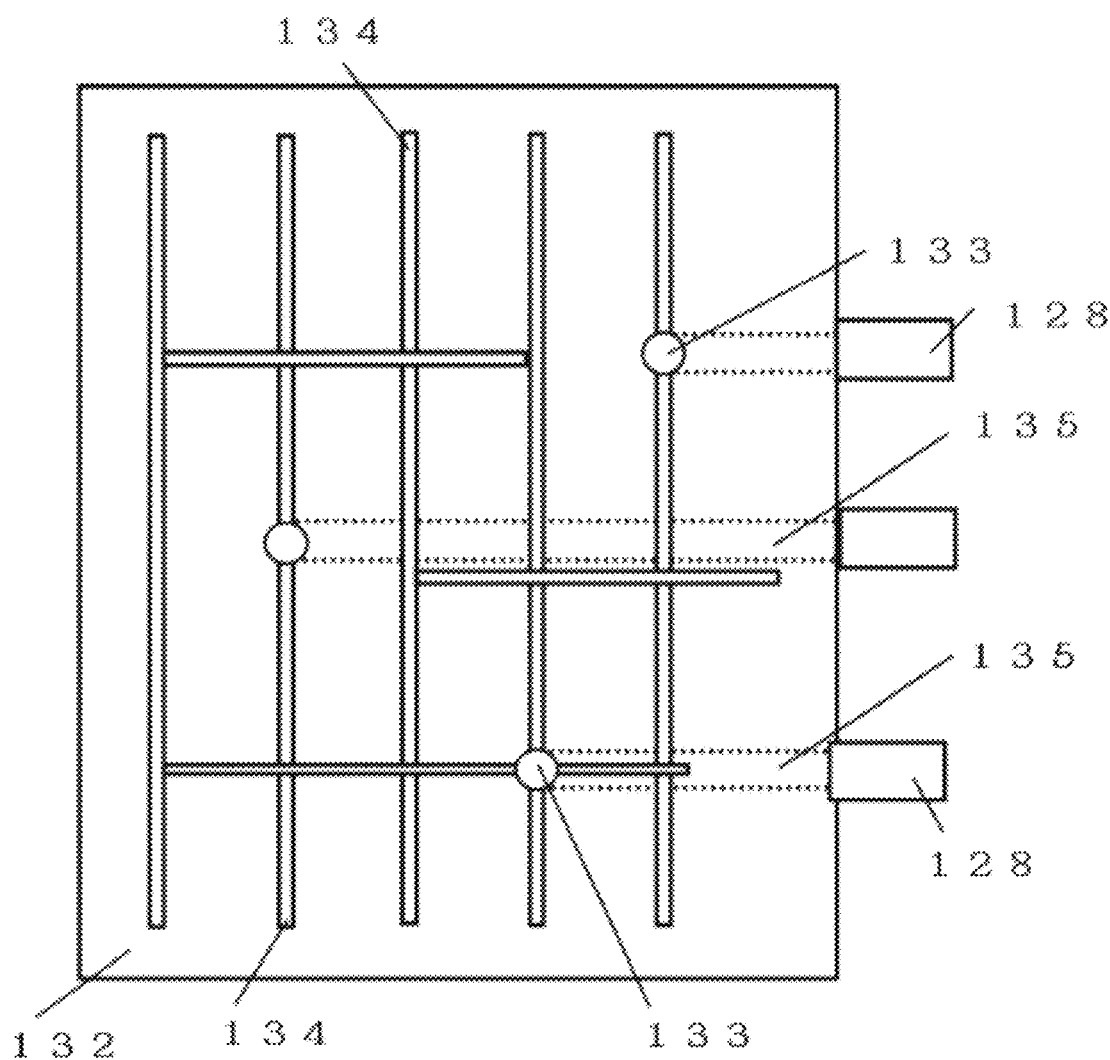
FIG. 41 is a drawing showing the shape (path of the compressed gas) of $L_1$ and $L_3$ located at the bottom part of the nested element.

FIG. 41 shows the space of $L_1$ shown in FIG. 11 and the space of $L_3$ shown in FIG. 10 and FIG. 11. The explanation will be made considering FIG. 41 is the space of $L_1$ shown in FIG. 11. The reference numeral 132 shows the portion where the reference numeral 40 is in contact with the bottom part of the reference numeral 23. The reference numeral 134 is a groove through which the compression gas is passed. The reference numeral 133 and the reference numeral 134 are holes (circuits of the compression gas corresponding to the reference numeral 127) formed on the reference numeral 40. The reference numeral 133 and the reference numeral 134 are the circuits of the injection and the discharge of the compressed gas.

The same shape as the reference numeral 131 and the reference numeral 130 is formed on the mating surface 30 of the reference numeral 23 for forming a sufficient gas vent. When the foamable resin is filled into the molding space, the compression gas is smoothly pushed out by the pressure of the foamable resin. Thus, the troubles of the short-molding, discoloration and scorch are eliminated. The gas vent is connected to the reference numeral 134.

FIG. 38, FIG. 39, FIG. 40 and FIG. 41 are connected to $L_1$ to $L_3$ shown in FIG. 10 and FIG. 11. These figures show the fact that the injection and the discharge of the compressed gas can be performed without resistance when the air compressed by the compressor 43 is used as the compression gas, for example. When the nitrogen gas is connected to a suction port of the compressor 43, the GCP of the nitrogen gas can be performed.

In FIG. 39, FIG. 40 and the like, the gas circuit is formed on the mating surface of the PL and the injection and the discharge of the compressed gas is performed from the space of the gas circuit. The injection and the discharge of the compressed gas can be performed by providing the gas circuit on the portion of the molded article where the decorative surface is not formed (mainly the mobile side where trace of the ejector is left). However, the discharge can be performed more smoothly when the injection and the discharge of the compression gas is performed into/from the parting line. As reference of FIG. 50, FIG. 51 shows the configuration where the circuit of the injection and the discharge of the compressed gas is formed at the center part of the mold. The explanation has already made above.
(AMOTEC, GCP of Nitrogen Gas)

The check valve 58 is provided on the device shown in FIG. 16. The function of the check valve will be explained. For example, the gas compression is preliminarily performed with the pressure of approximately 1 MPa by using cheap air, and then the gas compression is performed in the space of $L_2$ by the separately provided device and circuit with the pressure of approximately 2 MPa by using the nitrogen gas. Consequently, the oxygen concentration in the space of $L_2$ is lowered. Since the concentration of the inert gas and the oxygen is lowered in the GCP, the discoloration and the scorch can be reduced.

When the carbonic acid gas is used instead of the nitrogen in the GCP of the above described method, the carbonic acid gas is melted into the foamable resin from the molten end portion of the foamable resin. Thus, the transferability to the mold can be improved and the inductivity of the molten resin can be seen. In a composite material to which a glass fiber or the like is added, the floating of the glass fiber is suppressed and an excellent outer appearance can be obtained.

A commercially available reciprocating type compressor (with receiver tank) has a breakdown voltage of approximately 1.41 MPa and a safety valve (not illustrated) is provided, of course. However, since it is dangerous if the pressure higher than the breakdown voltage of the compressor is applied to $L_2$, the check valve 58 is provided to prevent the nitrogen gas and the carbonic acid gas which are applied later from entering the compressor. Of course, considering safety, a safety valve (not illustrated) is installed on the manifold 49 of the GCP device shown in FIG. 15 and FIG. 16. The device shown in FIG. 16 can be used for the molds shown in FIG. 13 and FIG. 14. The method of connecting one GCP device or three GCP devices shown in FIG. 15 to the mold shown in FIG. 13 has been already explained. Similarly, single stage discharge and multi stage (e.g. three stages) discharge can be also performed by using the mold shown in FIG. 14 and one or three GCP devices shown in FIG. 16.
(Control of Injection Molding Machine)

The details of the control of the GCP device shown in FIG. 15 and FIG. 16 will be explained. First, the manufacturing method of the foamable resin will be explained. In other words, the details of the means for applying foaming properties to the molten resin in the heating cylinder of the injection molding machine will be explained. First, when the solid foaming agent such as the powder of ADCA or the sodium bicarbonate is used, the foaming agent is spread and attached to the pellet. For example, the resin pellet to be foamed is entered in a tumbler, a necessary amount of the foaming agent is entered in the tumbler, a small amount of paraffin oil is added to function as a spreader and a tumbling process is performed. Thus, the powder of the foaming agent is spread and attached to the periphery of the resin pellet.

The material obtained in the above described process is entered in the hopper and transferred to the heating cylinder to heat and melt this material. Consequently, the foaming agent is pyrolyzed, the foaming gas is generated, and the generated foaming gas is finely dispersed in the molten resin by the rotation force of the screw of the heating cylinder and the back pressure or the like applied to the molten resin in the heating cylinder. Since the pressure applied to the molten resin is high, the foaming agent is also dissolved in the molten resin by pressure.

When the foaming agent is the powder, the handling is difficult. When the foaming agent is formed in a shape of the pellet, the foaming agent is simply kneaded into the pellet to be foamed or carried on the pellet to be foamed. Thus, the foamable resin can be manufactured by mixing the pellet (masterbatch) of the foaming agent and the pellet of the resin to be foamed in the tumbler and entering them in the hopper together.
(Screw)

In order to dissolve the foaming gas in the molten resin of the heating cylinder by pressure and finely disperse the foaming gas in the molten resin, high kneading property is required and the compression ratio (CR) should be approximately 2.4 to 4. In case of the engineering plastic, the compression ratio may be 4 or more. The effective length (L/D, entire length of screw/diameter of screw) is 15 or more and preferably 18 or more. When the L/D (value obtained by dividing L by D) is large, the kneading property becomes high. Thus, high L/D is effective for dissolving the foaming gas in the molten resin by pressure and finely dispersing the foaming gas in the molten resin.

The screw is divided into zones of a supply portion, a compression portion and a measurement portion. When a general solid molding is performed, the length of the supply portion is approximately one half, the length of the compression portion is approximately one quarter and the measurement portion is approximately one quarter. However, in case of the foam molding, the length of the compression portion is lengthened as long as possible from one quarter to dissolve the foaming gas sufficiently by pressure and dispersing the foaming gas finely. When the compression portion is lengthened, the above described L/D becomes large and the time of compressing the molten resin can be longer. Alternatively, the flight of the screw is made shallower to increase the kneading property. Alternatively, a double flight screw or other means can be used.

As apparent from the pressure of the gas compression of the GCP, when the external pressure exists, the foaming gas can be enclosed. However, when the back pressure during the plasticization (measurement) is higher, the foaming gas can be more evenly and finely dissolved by pressure and finely dispersed in the molten resin of the heating cylinder. In the present invention, although the condition of the back pressure varies depending on the kind of the resin and the foaming agent to be used, the back pressure may be generally 5 MPa or more during the measurement (the resin is plasticated and the foaming gas is dissolved in the resin by pressure and finely dispersed in the resin). The inventor specified the back pressure to be slightly lower than the pressure causing the sagging from the shut-off nozzle to be used during the measurement so that the back pressure becomes as high as possible. If the back pressure is stopped after finishing the measurement, the foaming (pre-foaming) occurs in the heating cylinder. Thus, it is necessary to keep applying the back pressure (end back pressure, EBP) until the injection is started. In that case, the pressure of the EBP to be applied is approximately 5 MPa.

In the present example, the screw having the CR of approximately 3 and the L/D of 18 was used. In case of a full flight screw of $\varphi60$, a length of a flight portion is 1,560 mm, a length of a supply portion is 480 mm, a length of a compression portion is 540 mm, a length of a measurement portion is 540 mm, the CR is 3, a groove depth of the supply portion is 8.3 mm, a groove depth of the measurement portion is 2.5 mm, a width of the flight is 6 mm, and an angle of an end portion of the screw is approximately 90° to 30°, for example.

In case of the liquid foaming agent such as the ethanol and the sodium hydrogen carbonate which is an aqueous solution of the hydrogen carbonate, a hole is formed on the heating cylinder, an injection port with a valve and an injection port embedded with a sintered metal are provided, the liquid is injected into the resin heated and molten in the heating cylinder at the same time when the measurement is started or with a little delay, the foaming agent is evaporated, dried/solidified and pyrolyzed by the temperature (heat energy) of the heating cylinder and the temperature (heat energy) of the molten resin. Thus, the foaming gas is generated and the foaming properties are applied to the molten resin in the heating cylinder. The injection of the liquid is stopped before finishing the measurement of the liquid, at the same time when the measurement is finished or a predetermined time has elapsed after the measurement is finished. If required, the injection of the liquid may be temporarily stopped in the middle of the measurement. In case of MuCell and AMOIEC which are the means for adding the gas in the heating cylinder to disperse the gas in the molten resin of the heating cylinder and apply the foaming properties, the processes are approximately same as the means of the above described case of using the liquid.

The programs actually incorporated in the injection molding machine are as follows. (1) A time when the measurement is started is set to a zero start position. (2) The delay time before starting the injection of the liquid or/and gas is set (when the delay time is set to zero, the injection is started at the same time when the measurement is started). (3) While monitoring the position of the screw after the measurement is started, the position of the screw is set when the injection is stopped in the middle of the measurement. (4) When the injection is started again, the position of the screw of restarting the injection can be set. (5) When the injection is stopped before the measurement, the instruction for stopping the injections is specified by the position of the screw. (6) When the injection is stopped at the same time when the measurement is finished or when the injection is delayed, the delay time can be specified (when the delay time is zero, the injection is stopped at the same time when the measurement is finished).

The above described signal is connected (transferred) to a separately provided liquid injection device or a gas injection device. The program of the injection molding machine transmits the instruction of opening and closing the injection valve in case of the gas injection and transmits the instruction of pushing the plunger in case of the liquid injection. Interlocking with the above described instruction, the actuator or the like is operated.

(Means for Increasing Foaming Ratio)

As for the means for increasing the foaming ratio, the method of reducing the pressure of the foamable resin filled in the mold can be used. For example, a so-called short-shot can be used where the resin smaller than the full capacity of the cavity is filled in the cavity without fully filling the resin in the cavity. Alternatively, immediately after the foamable resin is filled in the cavity or when a predetermined time has elapsed after the foamable resin is filled in the cavity, the means for retreating (sucking back) the screw to reduce the pressure can be used. Alternatively, an extension core can be used where a part of the mold is expanded after the foamable resin is filled in the cavity to reduce the pressure of the foamable resin filled in the cavity.

In this case, since the volume of the cavity is not changed, the foaming ratio is not significantly changed. In the present invention, the foaming ratio is defined as the percentage of the value obtained by subtracting the volume of the foam-molded article from 100 with respect to the volume of the solid molded article: (100-volume of foam-molded article)/volume of solid molded article. The foaming ratio is also referred to as a weight reduction ratio.

Figure 17:
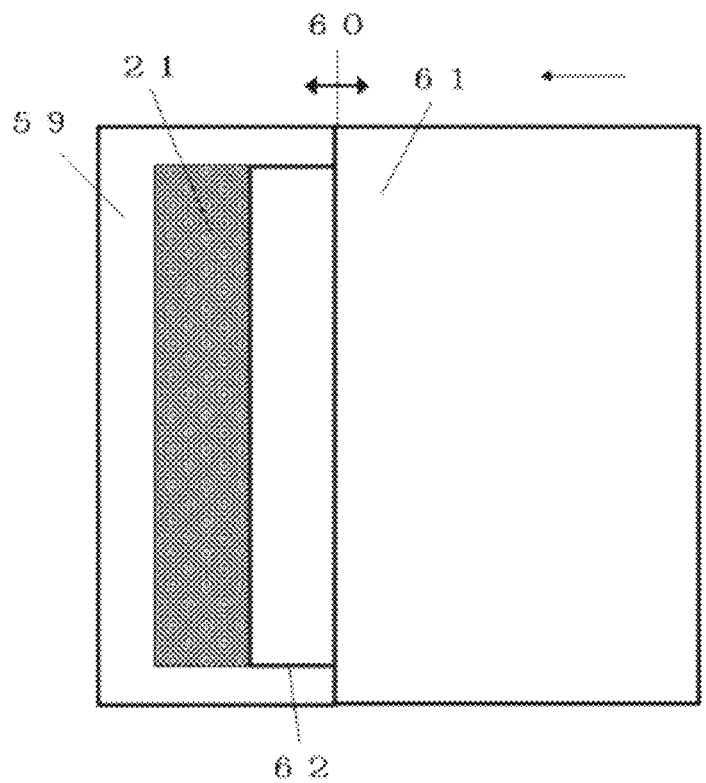
FIG. 17 is a schematic diagram explaining the state before performing core-back (when filling foamable resin).
Figure 18:
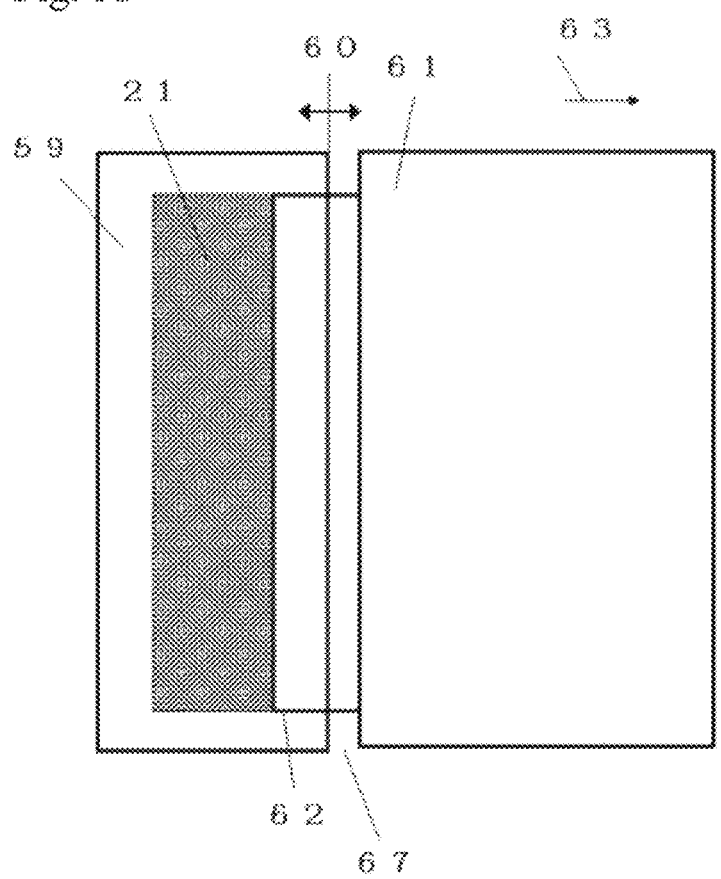
FIG. 18 is a schematic diagram explaining the state (expanded state) after performing the core-back.
Figure 19:
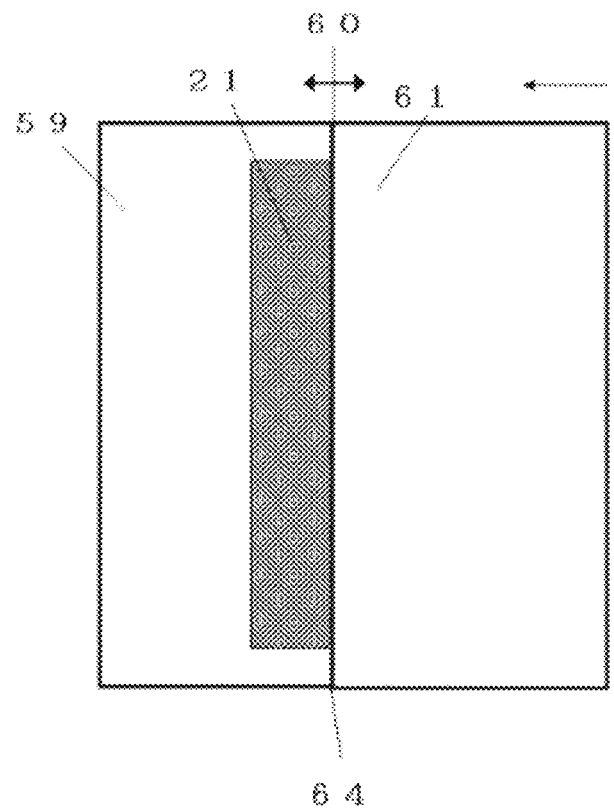
FIG. 19 is a schematic diagram explaining the state before performing mold-back (when filling foamable resin).
Figure 20:
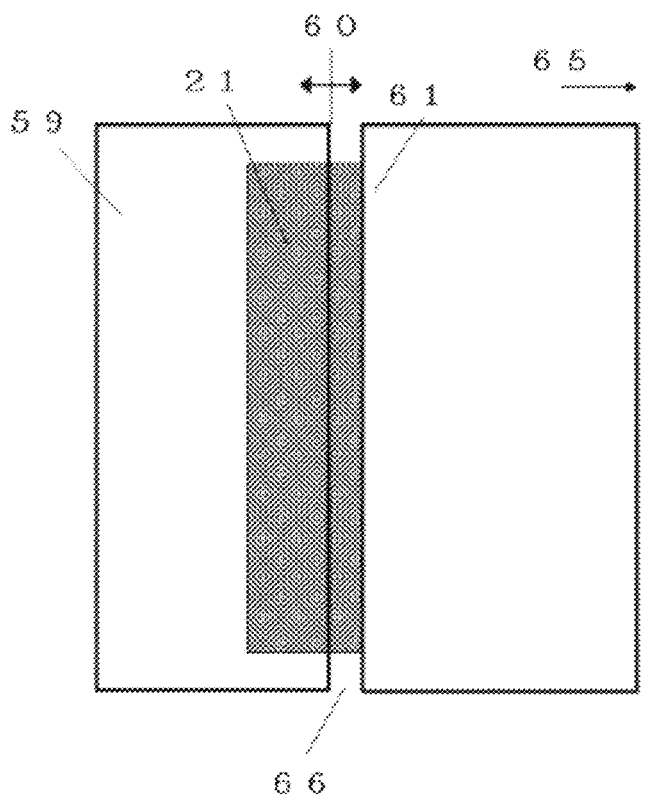
FIG. 20 is a schematic diagram explaining the state (expanded state) after performing the mold-back.
Figure 53:
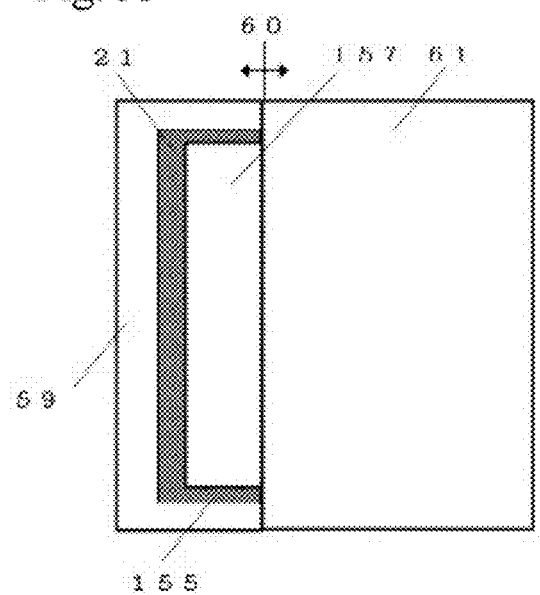
FIG. 53 is a schematic diagram showing a state that the mold of the mobile side is entered in the molded article and the mold of the mobile side is retreated after the foamable resin is filled into the molding space so that the metal of the mold of the fixed side and the metal of the mobile side are not contacted at the parting line during the core-back.

As for the means for obtaining the large foaming ratio, both the core-back and the mold-back are preferably performed in the mold. When using the opening such as a circular hole, the resin may be entered in the opening when the mold is opened in case of the mold-back. Thus, the present invention adopts the shape of the core-back. When performing the GCP, the core-back and the mold-back are performed at the same time when the discharge of the GCP is started, in the middle of (during) the discharge of the GCP, immediately after the discharge of the GCP or a little delayed after the discharge of the GCP. The (opening) operation of the mold is similar between the core-back and the mold-back. The operation is referred to as the core-back when the parting line (surface where the mold of the fixed side and the mold of the mobile side are mated with each other) shown by the reference numeral 60 is vertical as shown in FIG. 17 and FIG. 18. On the other hand, the operation is referred to as the mold-back when the parting line shown by the reference numeral 60 is horizontal (parallel) as shown in FIG. 19 and FIG. 20. In FIG. 17 and FIG. 18, the mold of the fixed side and the mold of the mobile side are parted between the metals as shown by the reference numeral 62. In FIG. 53, the molds are not parted from each other.

(Control of Molding Machine when Plural GCP Devices are Installed on One Mold)

When the control of the GCP is performed by attaching the GCP device shown in FIG. 15 or FIG. 16 to each of the spaces $L_1$, $L_2$ and $L_3$ shown in FIG. 13 and FIG. 14, the injection of the compressed gas into the molding space of the mold is started by the completion signal of clamping the mold or the like similarly as described above. Namely, the valve shown by the reference numeral 46 is simultaneously opened. The difference is the timing of discharging the compressed gas. When only one GCP device is connected, the compressed gas of $L_1$, $L_2$ and $L_3$ is discharged simultaneously since the compressed gas is discharged from one port shown by the reference numeral 51. When the GCP device is connected to each of $L_1$, $L_2$ and $L_3$, the timing of the discharge of each of $L_1$, $L_2$ and $L_3$ can be different. The discharge signal is determined based on the position of the screw, a discharge timer or the like. The program capable of controlling a plurality of GCP devices is installed in the PLC the molding machine.

Similar to the case of using one GCP device, the mold-back, the core-back, the retreat of the mold and the removal of the molded article after the discharge are controlled by one signal.

(Injection of Liquid or Gas from Nozzle: Simbo Process, Minoru Shimbo, Emeritus Professor at Kanazawa Institute of Technology)

The case of injecting the gas or the liquid (e.g., alcohol) into the heating cylinder from an injection port with a nozzle provided on the end part of the heating cylinder during the process of the injecting the resin for dispersing the gas or the liquid in the resin and dissolving the gas or the liquid by pressure by the force of injecting the resin will be explained. The structure of the injection port is same as the above described injection port used for injecting the gas or the liquid in the heating cylinder. A porous sintered metal capable of passing the gas and the liquid is used for the injection port. (1) The delay time can be set from a time when the injection is started as zero (when the delay time is zero, the gas or the liquid is injected at the same time when the injection is started). (2) The instruction of stopping the injection is specified (determined) by the position of the screw. (3) Of course, when the injection is temporarily stopped and then the injection is restarted, the stop and the restart of the injection are determined by the position of the screw which can be arbitrarily specified (set).

Other than the method of providing the injection port of the gas or the liquid on the nozzle, the injection port of the gas or the liquid may be provided on the hot runner similarly and the injection port is controlled by the programs of the injection molding machine.

In case of the means (mixed process) for applying the foaming properties by the gas, the liquid or the solid and mixing the foamable resin with the non-foamable resin in the nozzle during the process of injecting the resin, the control is same as the above described control of injecting the liquid or the gas from the nozzle. Of course, the above described mixed process can be also performed in case of the hot runner.

(Control of GCP Device by Sequencer of Injection Molding Machine)

In case of the GCP, the instruction from the injection molding machine to the GCP device is performed as follows. (1) It is confirmed that the mold is closed. (2) It is confirmed that the nozzle touching is finished. (3) The injection valve shown by the reference numeral 46 in FIG. 15 and FIG. 16 is opened to compress (pressurize) the inside of the mold by the gas (compression process). (4) The time of the GCP is preliminarily specified (set) and the filling of the foamable resin into the cavity is started by time-up of the timer (when the preliminarily specified time has elapsed) (injection process). (5) When the pressure gauge shown by the reference numeral 56 is used instead of the timer, the filling of the foamable resin into the cavity is started when the pressure reaches the preliminarily set pressure. (6) The discharge of the GCP is performed in the middle of the injection or after finishing the injection (discharge process). When the discharge is performed in the middle of the injection, the position of the screw at the time of starting the injection is set as a start position, and the discharge valve shown by the reference numeral 51 in FIG. 15 and FIG. 16 is opened to release the gas in the mold into the atmosphere when the screw passes through the arbitrarily set position (discharge process). (7) When the discharge is performed immediately after the injection is finished or with a delay time, the delay time can be set (when the delay time is zero, the discharge is performed at the same time when the injection is finished) (discharge process). In the means for recessing (retreating) the screw to a preliminarily set position when a predetermined time has elapsed after the timing of zero which is the timing of finishing the injection to reduce the pressure of the foamable resin filled in the cavity and facilitate the foaming, the following process is performed. (8) In addition to the above described discharge of the gas in the middle of the injection, immediately after the injection or when a predetermined time has elapsed after the injection, the gas can be discharged at the same time when the suck back is started, in the middle of the suck back or the suck back is performed with a delay time. In that case, the delay time can be specified (set) (when the delay time is zero, the discharge is performed at the same time when the suck back is finished, namely when the valve is retreated to the preliminarily set position).

In the means for expanding (breezing, expansion core or extension core) a part of the mold to reduce the pressure of the foamable resin filled in the cavity and facilitate the foaming, the timing of the breezing is as follows. (1) The mold is expanded at the same time when the injection of the resin in the cavity is finished or a delay time is specified (when the delay time is zero, the mold is expanded at the same time when the injection is finished) (discharge process). The breezing can be performed, for example, by the operation of a hydraulic or pneumatic cylinder or motor provided on the mold. Alternatively, the breezing can be also performed by using the ejector mechanism of the injection molding machine. In any cases, the instruction is transferred from the program of the injection molding machine. Although the operation of the breezing is different from the operation of the suck back, the breezing and the suck back can be simultaneously performed.

(Core-Back and Mold-Back)

First, the difference between the core-back and the mold-back will be explained by using FIG. 17, FIG. 18, FIG. 19 and FIG. 20. FIG. 53 (before the core-back) and FIG. 54 (after the core-back) also show the mold structure of the core-back.

As shown by the reference numeral 62, the parting line (vertical parting line) of the reference numeral 60 of the mold of the core-back has a structure where the mold 61 of the mobile side is entered in the mold 59 of the fixed side (FIG. 17).

In this state, the foamable resin is filled in the cavity 21 formed by the reference numeral 59 and the reference numeral 61. When performing the GCP, (1) the delay time is specified (set) after the discharge of the gas of the GCP is finished (when the delay time is zero, the GCP is performed at the same time when the discharge of the gas is finished).

As shown in FIG. 18, the reference numeral 61 is retreated (core-back is performed as shown by the arrow mark of the reference numeral 63) to expand the reference numeral 21. Thus, a clearance 67 is formed on the parting line 60. Since the vertical parting line 62 is formed between the molds 59 and 61, the molten resin does not flow out of the mold.

The mold-back will be explained using FIG. 19 and FIG. 20. The parting line 60 is the vertical parting line 62 in FIG. 17 and FIG. 18, while the parting line 60 is the horizontal parting line 64 in FIG. 19 and FIG. 20. After the foamable resin is filled in the reference numeral 21, the mold of the mobile side shown by the reference numeral 61 is retreated (mold-back shown by the arrow mark of the reference numeral 65) to expand the reference numeral 21. The parting line of the reference numeral 60 is opened as shown by the reference numeral 66 by the amount where the horizontal parting line 64 is retreated. Thus, the force of pressing the resin in the reference numeral 21 is eliminated. However, when the clearance generated by the retreat is a little and when the skin layer is formed on the surface by using the GCP, the surface is cooled and solidified to form a solidified layer. Thus, the molten resin in the mold does not flow out of the mold.

When performing the GCP, (1) the delay time is specified after the discharge of the compression gas is finished (when the delay time is zero, the mold-back or the like is performed at the same time when the discharge of the compressed gas is finished). As shown in FIG. 20, the reference numeral 61 is retreated (reference numeral 65) to expand the reference numeral 21. The clearance 66 is formed on the parting line

60. The reason why the molten resin does not flow out of the mold has been described above.

The core-back and the mold-back will be compared. When the shape of the core-back is formed on the parting line, it is considered that the mold structure is complicated and the cost of the mold is increased (expensive). Thus, the mold-back shown in FIG. 19 and FIG. 20 is preferable for the structure of the parting line. In case of the hole, it is considered that the clearance is formed when the mold-back (horizontal parting line) is performed and the resin may be entered in the clearance. In this case, the structure of the core-back (vertical parting line) is used.

Both the core-back and the mold-back can be easily performed only by preliminarily integrating the program of the above described operation in an internal control board of the injection molding machine. The accuracy of retreating the mold can be obtained to a certain degree in the injection molding machine of the direct pressure. When a toggle mechanism is used and the accuracy of retreating the mold is lower than the direct pressure, a plar bolt or the like may be integrated in the mold to increase the accuracy of retreating the mold (accuracy of the retreating distance in the core-back and the mold-back).

When the above described (1) the program of applying the foaming properties to the molten resin in the heating cylinder by independently or simultaneously using gas, liquid and solid foaming agents (2) the program of retreating the screw or performing the breezing for the purpose of reducing the pressure of the molten resin filled in the cavity, the molten resin having the foaming properties, and (3) the program of injecting and discharging the compressed gas for performing the GCP and the program of the core-back or the mold-back are preliminarily integrated (installed) in the injection molding machine, the above described operations can be easily performed.

Of course, it is easier, safer and cheaper to integrate the above described programs in the control board of the injection molding machine than to manufacture a controller in which a sequencer is integrated separately from the GCP device to receive the signal from the injection molding machine or transmit the signal to the injection molding machine to take an interface between them.

(Means of Mold-Back and Core-Back)

In the mold-back or the like, the molded article is once separated from the fixed side (cavity) having designability. The molded article is adhered to the fixed side again by the foaming force and the shape of the mold is transferred. However, since the pressure of the foaming is low for transferring the shape of the mold. Thus, the mold reproducibility (transferability to the mold) may be low in some cases. The means for solving the above described problem will be explained below.

(Means for Controlling Timing of Discharge of $L_1$, $L_2$ and $L_3$)

In the GCP, the discharge of the gas of $L_1$ (space of the bottom part of the nested element of the mobile side or a space of the ejector box), $L_2$ (molding space) and $L_3$ (space of the bottom part of the nested element of the fixed side) are not performed simultaneously. The gas is discharged with a time difference and the mold-back or the like is performed by the pressure of the GCP while applying the pressure from the mobile side. Actually, the compressed gas of $L_1$, $L_2$ and $L_3$ is firstly discharged before the foamable resin is filled in the cavity ($L_2$), when the foamable resin is filled in the cavity ($L_2$) or when a predetermined time has elapsed after the foamable resin is filled in the cavity ($L_2$). Then, the compressed gas of $L_2$ is discharged at the same time when the compressed gas of $L_3$ is discharged or with a little delay. When the mold-back or the like is performed in a state that the pressure of the compressed gas is applied to $L_1$ (in a state that the molded article is compressed from the mobile side to the fixed side by the pressure of the compressed gas), the clearance is formed by opening the mold and the compressed gas in $L_1$ is suddenly discharged from the parting line of the reference numeral 60 and the like. At this time, since the mold-back or the like is performed in a state that the molded article is pressed (transferred) by the force of the compressed gas of $L_1$ as described above, the transferability to the mold is maintained. As for the mold structure to be used, in the ejector box structure shown in FIG. 10, a large volume of the compressed gas in the ejector box ($L_1$) is suddenly discharged and a loud noise is produced. Thus, the ejector box structure is not very suitable for mass production. In the mold structure shown in FIG. 11 where the ejector pin is sealed, the amount of the compressed gas to be discharged is relatively small. Thus, this structure can be performed safely. The pressures of $L_1$, $L_2$ and $L_3$ can be same ($L_1=L_2=L_3$). When $L_1$ is slightly higher than the others ($L_1>L_2=L_3$), the above described effect of pressing from the movable side to the fixed side increases. In this case, the GCP device of the multi stage discharge is used where $L_1$, $L_2$ and $L_3$ are separately discharged (FIG. 38). Three devices shown in FIG. 15 are prepared and each of the devices is separately connected to $L_1$, $L_2$ and $L_3$. Although the compressor 43 may be one, a regulator (not illustrated) is provided in the fore stage of the reference numeral 46 when the pressures of $L_1$, $L_2$ and $L_3$ should be changed. When the mold structure shown in FIG. 11 and FIG. 14 is used, the device shown in FIG. 16 is more suitable. Of course, when the regulator is provided, the pressures of $L_1$, $L_2$ and $L_3$ can be changed.

(Means for Additionally Compressing Mobile Side by Gas)

In FIG. 31 to FIG. 35, it can be used for the mold of sealing the ejector pin shown in FIG. 11 that gas compression circuits of the reference numeral 90, the reference numeral 92 and the reference numeral 94 and gas compression pins of the reference numeral 89, the reference numeral 91 and the reference numeral 93 are additionally provided on the mobile side. The gas compression circuits make the gas enter the clearance between the resin and the mold of the cavity of the mobile side to compress (pressurize) the resin from the mobile side to the fixed side by using the force of the gas which is different from the compressed gas.

After the gas of $L_3$ and $L_2$ is discharged, the compressed gas is entered from the circuit provided separately (independently). Thus, the mold-back or the like is performed while the resin is pressed from the mobile side to the fixed side by the pressure of the gas. Consequently, the foaming ratio is increased. The reference numeral 89, the reference numeral 91 and the reference numeral 93 are gas pins for compressing (pressurizing) the resin from the mobile side to the fixed side.

In the above described means, a gas injection (blowing) port is surrounded by ribs (reference numeral 101 in FIG. 35) to prevent the gas entered in the clearance from escaping. The height of the ribs is preferably higher than the distance of performing the mold-back or the like. When the mold-back is performed in a state that the compressed gas is applied from the mobile side to the fixed side without discharging the compressed gas, the solidification of the resin in the cavity is started and the clearance between the resin and the mold becomes larger by the distance of the mold-back. Thus, the compressed gas of the resin is released into the atmosphere.

The compressed gas is preliminarily applied to $L_1$, $L_2$ and $L_3$, the foamable resin is filled in the cavity ($L_2$), the gas in $L_3$ is discharged in the middle of filling the resin or after filling the resin, and the gas in $L_2$ is discharged simultaneously with $L_3$ or with a little delay. After finishing the filling of the foamable resin into the cavity, the gas is injected (blown) from the reference numeral 100. Thus, similar to the above described operation, the gas is entered in the clearance between the resin and the mold to compress the resin. As for the preliminarily injected compression gas ($L_1$, $L_2$ and $L_3$), the multi stage discharge is used where $L_3$ is discharged first, then $L_2$ is discharged and $L_1$ is discharged finally.

(Means for Additionally Compressing Mobile Side by Gas)

In FIG. 31 to FIG. 35, it can be used for the mold of sealing the ejector pin shown in FIG. 11 that a double structure (reference numeral 91) is adopted for the ejector pin, the ejector plate is provided, the gas circuit (reference numeral 92) of the ejector plate is provided, and the compressed gas is applied from the clearance between the inner core and the outer cylinder of the ejector pin having a double structure. The gas compression is made for entering the gas in the clearance between the resin and the mold of the cavity of the mobile side to compress (pressurize) the resin from the mobile side to the fixed side by using the force of the gas which is different from the compressed gas.

Figure 31:
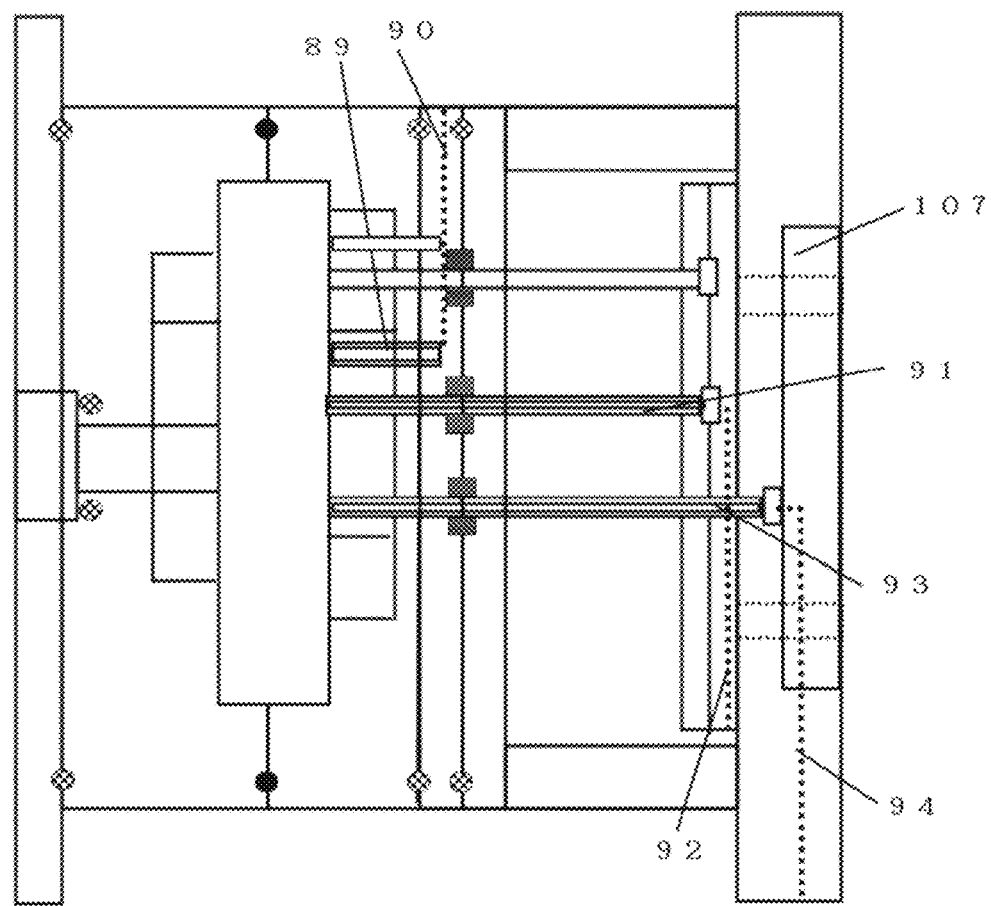
FIG. 31 is a schematic diagram showing a means for gas compression from the fixed side.
Figure 32:
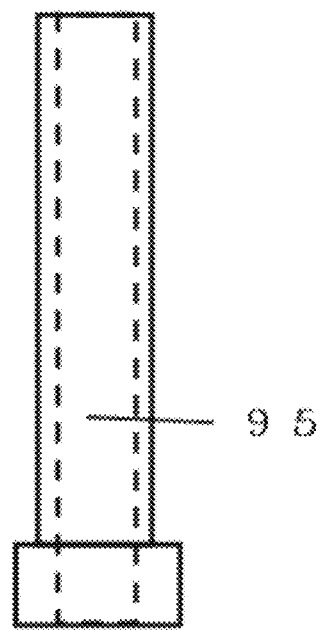
FIG. 32 is a schematic diagram showing an inner core of a gas pin used for the gas compression.
Figure 33:
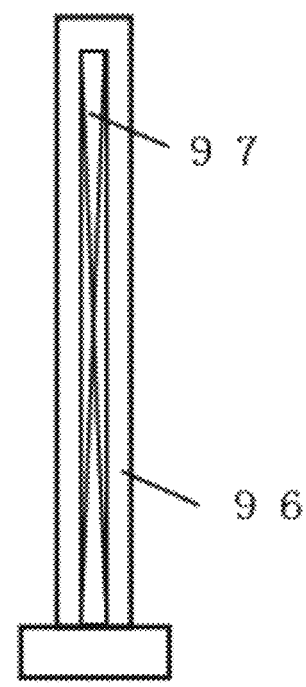
FIG. 33 is a schematic diagram showing an outer cylinder of the gas pin used for the gas compression.
Figure 34:
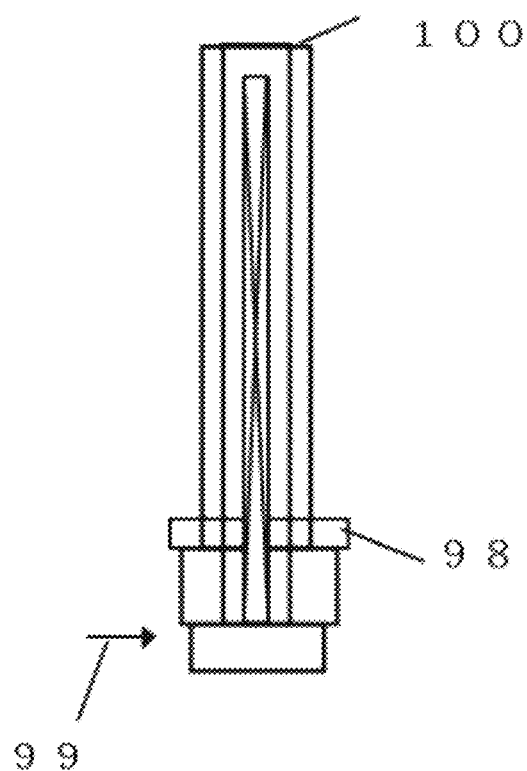
FIG. 34 is a schematic diagram showing a state that the inner core is inserted into the outer cylinder for assembling the gas pin used for the gas compression.

The structure of the above described case is also shown in FIG. 31. The structure of the compression pin is same as the structure shown in FIG. 32 to FIG. 35. Only the position of the gas compression of the mobile side is different (difference between the reference numeral 89 and the reference numeral 91).

FIG. 31 also shows the case where a gas compression pin is provided on the ejector plate. It is also possible to adopt the structure (reference numeral 107) of suppressing the pressure of the gas by using a mounting plate (reference numeral 28) of the mobile side.

Also in the above described case, the multi stage discharge is more preferable although the discharge of the GCP (compressed gas) can be performed by the single stage discharge.

(Means for Pressing by Ejector Pin)

The mold is retreated by using the ejector mechanism in the injection molding machine. By continuously pressing the ejector pin without retreating the ejector pin, the molded article is not separated from the fixed side when the mold-back or the like. Also in the above described case, the multi stage discharge is more preferable although the discharge of the GCP can be performed by the single stage discharge.

(Means for Applying Compressed Gas from Inside)

A hollow molding method (e.g., GasTy-2, Cinpres and AGI of Asahi Kasei Corporation) is known as the method of applying high-pressure gas to the inside of the molded article. The above described means is applied to the mold-back or the like of the foam molding. When high-pressure gas is injected into the inside of the foamable resin before the discharge of $L_1$, $L_2$ and $L_3$ to expand the resin by the force of the high-pressure gas injected inside, the foaming of the foamable resin in the cavity is suppressed by the pressure of the gas entered inside. Thus, even when the mold-back or the like is performed in a state that the foamable resin is not foamed, the foamable resin in the cavity is expanded following the action of the mold-back without separating from the fixed side and the mobile side. When the high-pressure gas injected inside is discharged into the atmosphere at the same time when the mold-back is finished or with a little time difference, the foamable resin is released from the pressure of suppressing the foaming from the inside. Thus, the foaming starts inside the foamable resin.

Figure 35:
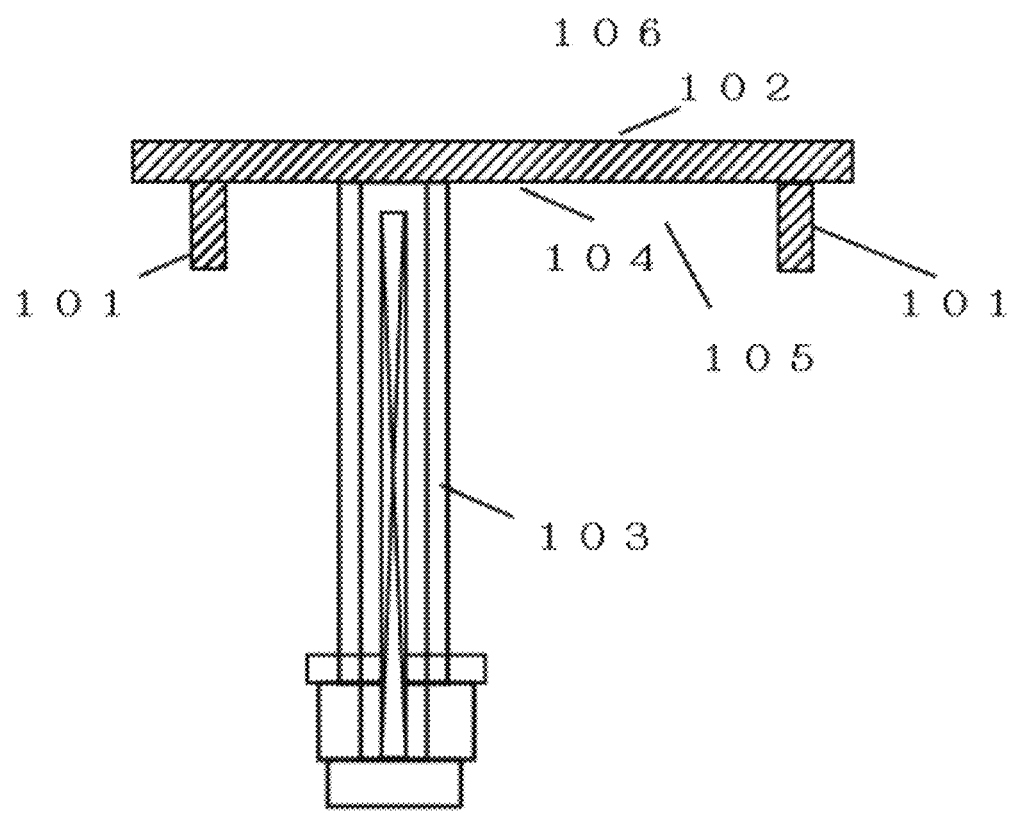
FIG. 35 is a schematic diagram showing the state that a gas compression pin is installed on the front surface of the molded article.

The structure of the gas injection pin can be a hollow structure by entering the gas injection port shown by the reference numeral 100 shown in FIG. 35 into the reference numeral 104 (to the position of approximately half of the plate thickness).

The discharge of the GCP (compressed gas of $L_1$, $L_2$ and $L_3$) should be finished before the operation of the mold-back or the like. In this case, the order of the discharge of $L_1$, $L_2$ and $L_3$ is not particularly limited. In general, the discharge is finished before the mold-back or the like.

Figure 21:
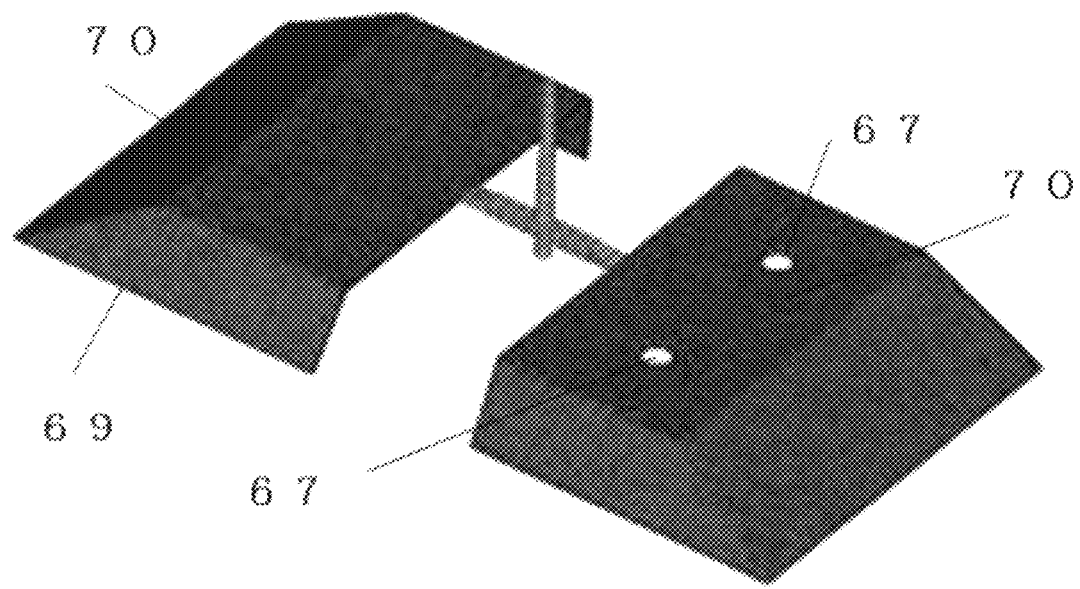
FIG. 21 is a drawing of the molded article used in the example where the drawing is created by CAD.
Figure 22:
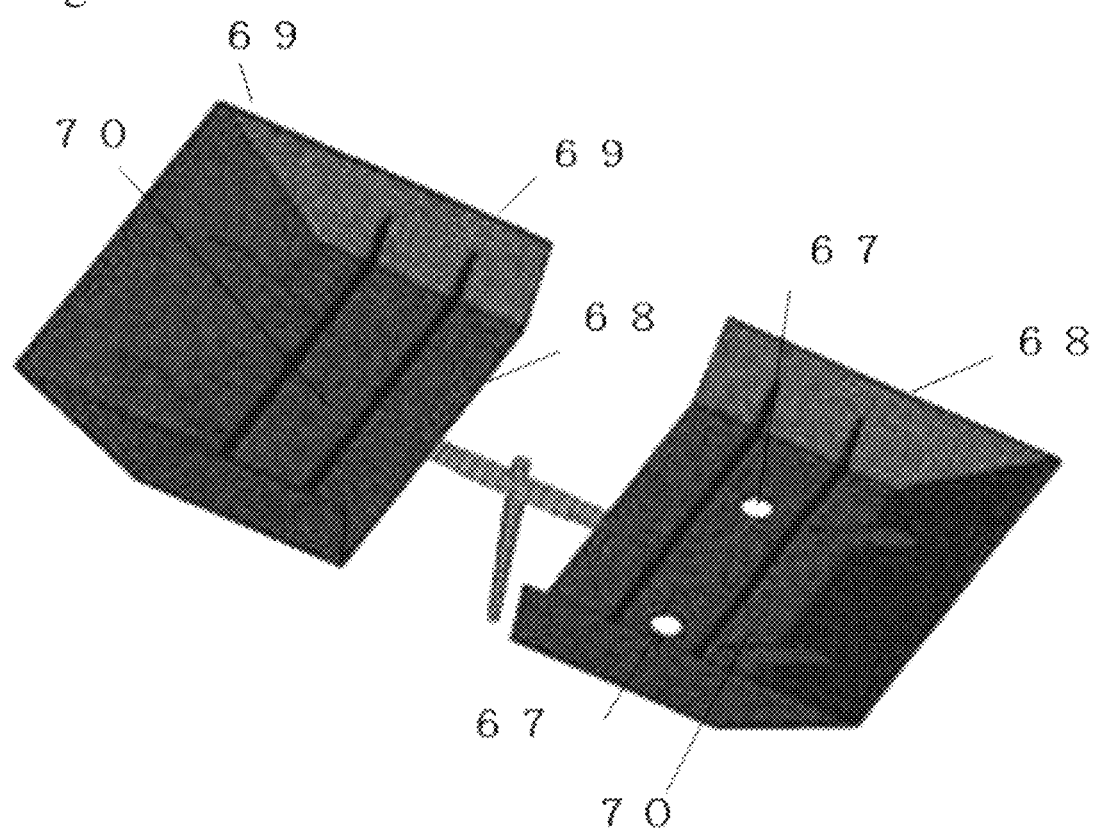
FIG. 22 is a drawing of the molded article used in the example where the drawing is created by CAD.

In the three-dimensional (3D) CAD drawings (FIG. 21, FIG. 22) of the product of the examples, the parting line of the mold for forming the hole 67 has the core-back structure to avoid the forming of the clearance on the mold when the mold is retreated while the parting line shown by the reference numeral 68 has the mold-back structure. A horizontal parting line (reference numeral 68) is formed on a part of the parting line only on the mobile side. A double side engraving (reference numeral 69) is applied on a part of the parting line for forming an R-shape on the fixed side. FIG. 21 shows the fixed side while FIG. 22 shows the mobile side. The reference numeral 70 shows a top part. The thickness of the top part is 2 mm when the mold is closed. By using the above described mold, the core-back (vertical parting line) and the mold-back (horizontal parting line) were performed while the parting line is opened by 0.5 mm and 1 mm respectively and the foaming ratio (weight reduction ratio) and the transferability to the mold were confirmed for each pattern.

(Heat and Cool)

In the GCP, the thickness of the skin layer located at the surface of the resin varies depending on the temperature of the surface of the mold (i.e., speed of cooling and solidifying the molten resin filled in the cavity). Of course, the thickness becomes thinner as the temperature increases.

FIG. 23 shows the means for increasing the temperature of the mold with heated water vapor generated by using a boiler. Although the heat and cool is general, the device using a magnetic fluid, an electromagnetic induction, a high-frequency heating or the like is used in the present invention.

The reference numeral 71 is a heating medium. Polyethyleneglycol, glycerin, silicone oil, mineral oil or the like is used as the heating medium. The reference numeral 72 is a heating portion. Small particles or powder of a magnetic substance (e.g., iron, stainless-steel, nickel and cobalt) is entered in the heating portion. The reference numeral 73 is a coil of an externally provided IH heater. When an electric current is supplied to (turned on) the reference numeral 73, high-frequency current is generated and the magnetic substance (reference numeral 72) housed inside is heated. Then, the heat is transferred to the heating medium (reference numeral 71) and the heating medium is heated. When the electric current is cut (turned off), the heating is stopped. Therefore, the temperature can be controlled by turning on and off the electric current. The reference numeral 74 is a blade provided in the circuit. A magnet (reference numeral 75) is attached to the blade. When an externally provided magnet (reference numeral 76) is rotated, the blade (reference numeral 74) provided inside is rotated with changes in the magnetic field. Thus, the heated heating medium can be circulated. The flow rate (flow speed) of the heating medium varies depending on the number of rotations. Thus, the heating efficiency can be controlled. Alternatively, the blade can be rotated also by using the principle of Arago's disc.

The reference numeral 78 is an arrow mark showing the flow direction of the heating medium. The reference numeral 79 shows a nested element or the like of the mold to be heated. The reference numeral 81 shows a heating device. The reference numeral 82 shows a circulator. The reference numeral 83 shows a piping into which the heating medium 71 flows. The piping is made of a steel pipe. A flexible hose can be also used for the reference numeral 83 if the heat-resistance property is enough. Although not illustrated, a flowmeter, a thermometer and a pressure gauge are integrated in FIG. 23 to control the temperature surely. The glycerin is recommended for the heating medium since the glycerin can be heated to a high temperature, the glycerin is soluble in water and the glycerin is excellent in usability. The chemical formula of the glycerin is $C_3H_8O_3$, the melting point is 17.8° C., the boiling point is 290° C. and the glycerin is liquid. Thus, the heat capacity ratio is larger and the heat exchange ratio is higher compared to the case where the heated steam compressed by the boiler is used. The glycerin has low toxicity and has water solubility. The toxicity can be removed by washing with water more easily compared to the case of oils and fats. Thus, the working environment is hardly deteriorated. Although the ethyleneglycol can be also used, the ethyleneglycol is not preferable since the ethyleneglycol is toxic. The reference numeral 77 is a flow control valve. The reference numeral 80 is a filter. The filter is provided so that the magnetic substance is stayed in the reference numeral 81.

The cooling is possible by making a cooling water flow through a circuit separately provided on the mold. It is also possible to make the gas flow or use the heat of the vaporization of the ethanol or the like. The above described circuit can be provided on the mold by forming a hole on the mold using a gun drill or the like, processing the above described heating and cooling circuits on the nested element and bonding them with each other using a heat treatment means such as diffusion welding. Thus, the circuit having high heat efficiency can be made. For the diffusion welding, a copper powder or a nickel powder is used as a welding material (agent). In case of the GCP, the thickness of the skin layer located at the surface becomes thinner as the surface temperature of the cavity ($L_2$) increases. In addition to the method of heating the mold by the heating medium of high temperature as described above, the temperature of the surface of the mold can be increased by providing a coil on an ejection device and heating the mold by high-frequency induction before filling the foamable resin (immediately before closing the mold). For example, BSM developed by Asahi Kasei Corporation can be used.

In addition, a heat insulation layer is formed on the mold to delay the cooling and solidification. Teflon (trade name) coating, ceramic coating, plasma coating of ceramic and the like are applied to the heat insulation layer. Other than the above, when WC tungsten carbide, TiN (titanium nitride), CrN (chromium nitride), alumina, DLC (diamond like coating, diamond like carbon) and the like are applied, the above described substances have the heat insulation effect and the speed of cooling and solidifying the foamable resin molten in the cavity is decreased. As a result, the thickness of the skin layer located at the surface becomes thinner. When the above described means is used, the speed of the cooling and the solidification is decreased by the temperature of the foamable resin itself. Thus, the operation and effect of increasing the fluidity can be obtained.

(Coating Material for Plastics)

The coating material used for decorating (cover marking) the resin molded article used in the present invention will be explained. In case of the molded article of the thermoplastic resin, since the heat distortion temperature (heat resistant temperature) of a material resin is low, a coating material capable of being dried and hardened at a low temperature is selected. For example, an acrylic resin, a styrene-modified acrylic resin and a urethane paint are selected. The coating material having a low baking drying temperature is selected. In the molded article of the PP, when the above described coating material is directly coated on the molded article, the affinity between the molded article of the PP and the above described coating material (coating film) is low and enough adherability cannot be obtained. When the coating is applied to the molded article of the PP, a primer mainly composed of a halogenated (chlorinated, brominated) PE or a halogenated PP or a primer mainly composed of a maleic acid-modified resin (PP, PE) is applied and then the above described coating material is applied as a top coating. The primer and the top coating material may be a solvent (solvent-based material) or an emulsion (emulsion-based material). After the primer is applied, dried to the touch and forcibly dried a little, the above described coating material (top coating material) for decoration is applied. The above described coating material may be a solvent-based material, an emulsion-based material or a water-based material. A powder-based material may be also used for the coating material.

(Pre-Treatment of Coating)

As a means for the coating, an air spray coating or an electrostatic coating is generally used. For obtaining beautiful coating film, the coating material is diluted and adjusted to the viscosity suitable for the operation by using an exclusive thinner. As for the pre-treatment of the coating, so-called dust removal and destaticization are performed to avoid the defects in coating by removing dusts, particles, oils and fats, mold release agents and the like adhered to the object to be coated and eliminating a static electricity.

Some manufacturers manually wipe the object with alcohol such as isopropyl alcohol (isopropanol, IPA) and then blow air before the spray coating is performed. As the means for automatically performing the above described pre-treatment, the processes of showering a degreasing liquid on the object or immersing the object with the degreasing liquid, washing the object, draining the degreasing liquid, drying the object and performing the coating are automated in some lines.

When the sodium bicarbonate is used for the foaming agent, the foam residue (sodium carbonate) and the undecomposed foaming agent (sodium bicarbonate) cannot be removed only by the above described pre-treatment. If the coating is performed in that state, there is a problem that the foam residue or the like interrupts the adherability of the coating film.

Although the above described residue cannot be completely removed only with the water washing, the residue is an alkaline substance and can be solubilized by neutralizing it with an acid. Thus, the residue can be easily removed with the water washing. Accordingly, the inventor solved the problem of the adhesion failure by showering a diluted aqueous solution containing an organic acid such as acetic acid, citric acid and succinic acid on the object to be coated as the pre-treatment or immersing the object with the diluted aqueous solution and then washing the object to remove the diluted aqueous solution with water at a normal temperature or hot water. In case of the immersion, the washing effect is increased by simultaneously using ultrasonic washing, bubbling and the like.

(Mold Structure of Core-Back)

Figure 54:
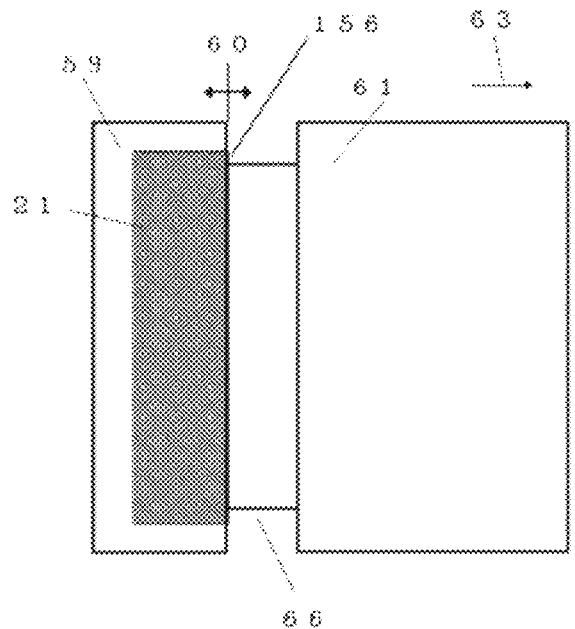
FIG. 54 is a schematic diagram showing a state that the reference numeral 61 (the mold of the mobile side) is retreated.

FIG. 53 and FIG. 54 illustrate the case of using the mold structure different from the case of FIG. 17 and FIG. 18. In FIG. 17 and FIG. 18, the metals are vertically parted. In FIG. 53 and FIG. 54, the shape of the mobile side (reference numeral 157) is entered in the molded article and the mobile side is retreated after the foamable resin is filled to increase the foaming ratio. The reference numeral 155 shows a space (molding space) between the mold of the mobile side and the mold of the fixed side so that the resin is entered (filled) into the space. The reference numeral 156 shows the molded article of the external side which is not expanded when the reference numeral 61 is retreated.

(Other Shapes of O-Ring Used for Sealing PL or the Like)

Figure 56:
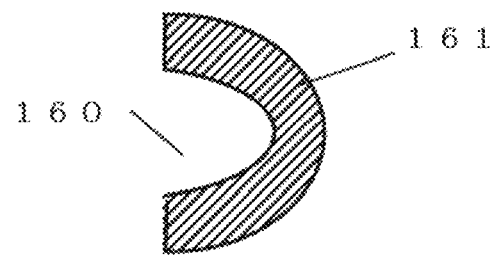
FIG. 56 is a schematic diagram showing a cross-section of a U-ring.
Figure 57:
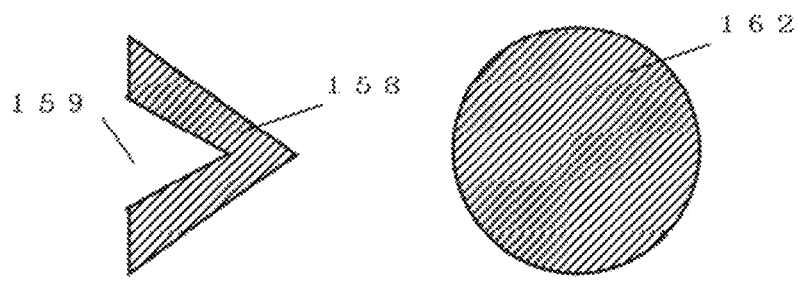
FIG. 57 is a schematic diagram showing a cross-section of a means for sealing the PL where the opening of the V-ring is directed toward the PL direction and an ordinary circular O-ring is also arranged.
Figure 58:
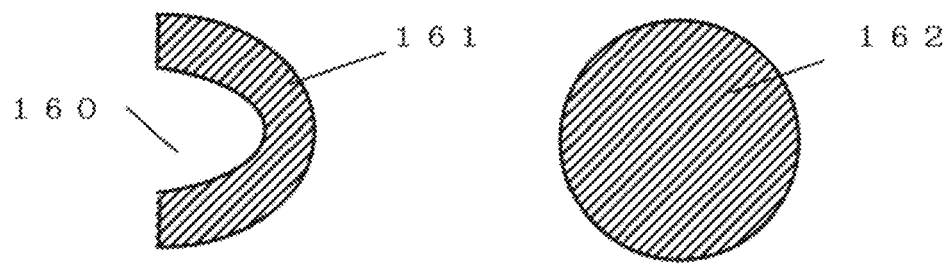
FIG. 58 is a schematic diagram showing a cross-section of a means for sealing the PL where the opening of the U-ring is directed toward the PL direction and an ordinary 1 circular O-ring is also arranged.

The O-ring of the reference numeral 33 shown in FIG. 11 generally has a circular cross-section. The diameter of the O-ring of the reference numeral 33 is made larger so that the PL is sealed sufficiently even when the mold-back and the evacuation are performed, the mold-back is performed for the means for eliminating the raindrop, and then the parting line is opened. Alternatively, the V-ring shown in FIG. 55 and the U-ring shown in FIG. 56 can be also used. The reference numeral 159 and the reference numeral 160 are openings. When the gas is entered in the openings, the opening is expanded outward by the pressure of the gas. Thus, the sealing performance can be secured. The reference numeral 158 shows a cross-section of the V-ring, and the reference numeral 161 shows a cross-section of the U-ring. FIG. 57 shows the case of combining the V-ring with a normal circular O-ring. FIG. 58 shows the case of the U-ring.

Figure 55:
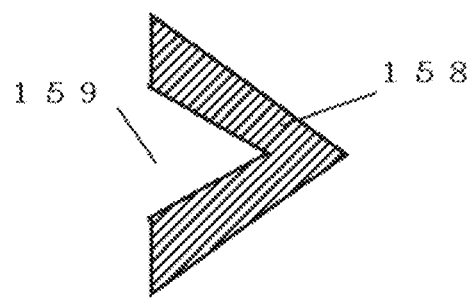
FIG. 55 is a schematic diagram showing a cross-section of a V-ring.
Figure 59:
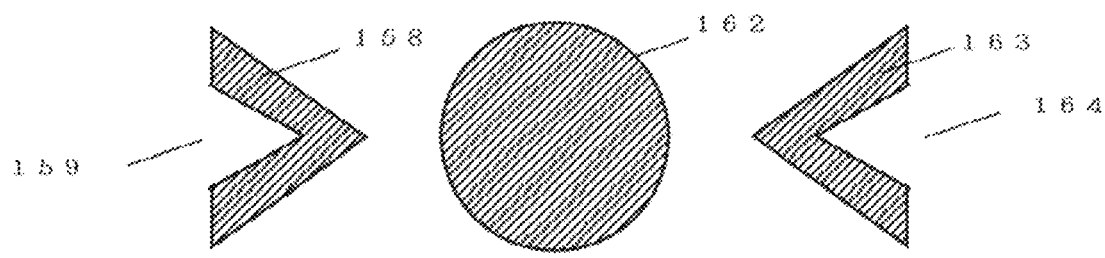
FIG. 59 is a schematic diagram showing the cross-section of the means for sealing the PL where the opening of a V-ring is directed toward the PL direction to have the function of sealing the gas compressed in the molding space, another V-ring is directed in an opposite direction of the PL to have the function of preventing (sealing) the external air from entering from the mating surface of the PL and the like when the evacuation is performed in the PL or the like, and an ordinary circular O-ring is further arranged.
Figure 60:
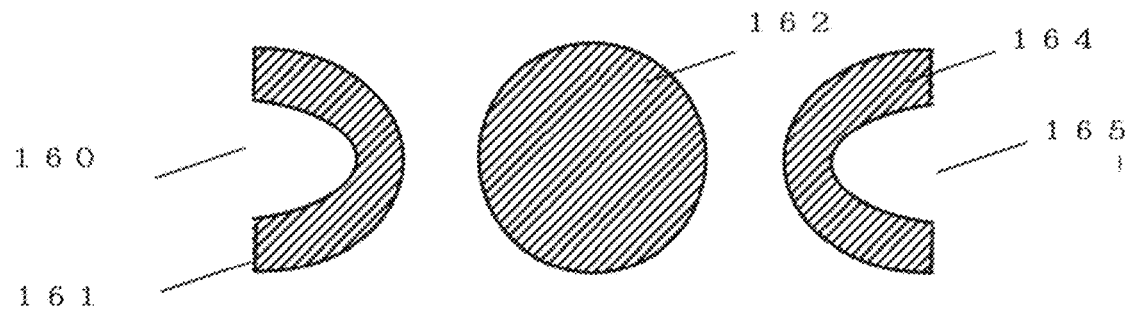
FIG. 60 is a schematic diagram showing the cross-section of the means for sealing the PL where the opening of a U-ring is directed toward the PL direction to have the function of sealing the gas compressed in the molding space, another U-ring is directed in an opposite direction of the PL to have the function of preventing (sealing) the external air from entering from the mating surface of the PL and the like when the evacuation is performed in the PL or the like, and an ordinary circular O-ring is further arranged.
Figure 61:
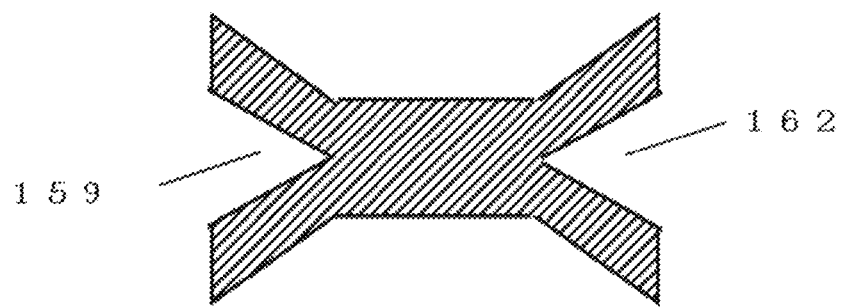
FIG. 61 is a schematic diagram where the U-ring of FIG. 55 is provided on the right and left sides and integrated with each other.
Figure 62:
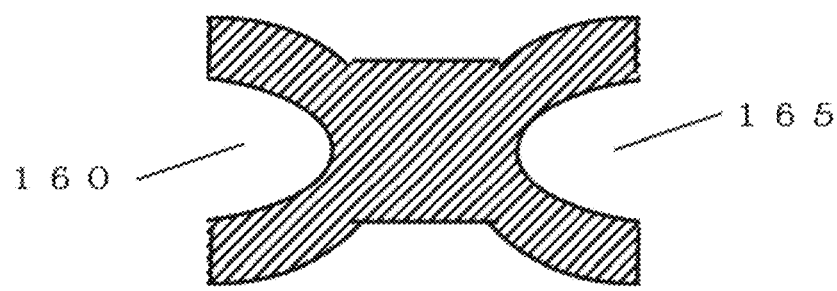
FIG. 62 is a schematic diagram where the V-ring of FIG. 56 is provided on the right and left sides and integrated with each other.
Figure 63:
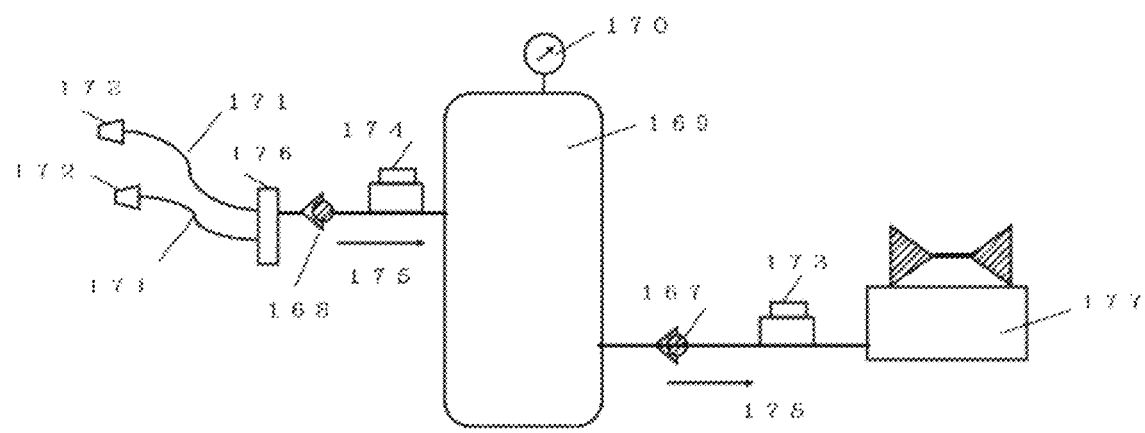
FIG. 63 is a schematic diagram of a device (vacuum device, evacuation device) for performing the evacuation.

As described above, the O-rings shown in FIG. 55 and FIG. 56 have the directionality of the sealing direction. When the compressed gas is applied to the molding space and the evacuation is performed after the compressed gas is discharged, both the left and right can be sealed by arranging the V-ring (V-seal ring) or U-ring (U-seal ring) where the openings 159, 160 are directed toward the molding space and the V-ring and the U-ring where the openings 159, 160 are directed in an opposite direction of the PL in the molding space. The O-ring of the reference numeral 162 can be provided between them (FIG. 59, FIG. 60). FIG. 61 and FIG. 62 show a shape where two O-rings shown in FIG. 55 are laterally arranged and integrated. FIG. 63 shows a shape where two O-rings shown in FIG. 56 are laterally arranged and integrated. It is also possible to provide a shape of the O-ring of the reference numeral 162 at the center. It is enough if the material of the above described rings is the same material as a commercially available O-ring such as NBR and urethane rubber. If required, a silicone rubber, fluororubber and the like can be used. The hardness of the rubber should be appropriately changed depending on the size of the mold and the pressure of the compressed gas.

In FIG. 55 to FIG. 62, although it is not illustrated, the molding space is located on the left side of the drawing and the right side is connected to the external space through the PL. The PL surface of FIG. 55 to FIG. 62 is the surface where the seal is arranged (not illustrated).

The reference numeral 163 is a V-seal of FIG. 55 where the opening 164 is directed to the outer side. The reference numeral 166 is a U-seal of FIG. 55 where the opening 165 is directed to the outer side. It is also possible to insert (fit) the spring shown in FIG. 29 or the O-ring shown in FIG. 30 in the reference numeral 159, the reference numeral 160, the reference numeral 164 and the reference numeral 166 similar to FIG. 24 to FIG. 26 so that the opening is directed to the outer side (weighed type, loaded type).

(Evacuation Device)

The means for evacuating the compressed gas in the mold after the discharge of the GCP for eliminating the raindrop which is the trouble particular to the GCP. In the GCP device shown in FIG. 15 and FIG. 16, after the discharge valve of the reference numeral 51 is opened and the compressed gas in the mold is discharged, the mold-back or the core-back is performed for discharging the compressed gas entered in the clearance between the mold and the resin to the outside via the discharge valve of the reference numeral 51 of the GCP device since the compressed gas causes the raindrop. Consequently, the raindrop is reduced, faded or eliminated. When the evacuation is further performed, the raindrop can be reduced.

The mold is closed, the compressed gas is applied to (injected into) the sealed mold shown in FIG. 10 and FIG. 11, the valve of the reference numeral 51 is opened when the foamable resin is filled in the mold or after the foamable resin is filled in the mold to discharge the compressed gas. When the compressed gas is discharged or after the compressed gas is discharged, the PL of the mold is opened (by performing the mold-back or the core-back) to discharge the compressed gas entered in the clearance between the mold and the resin since the compressed gas causes the raindrop.

When performing the evacuation, the valve 51 is closed, the reference numeral 174 of the evacuation device shown in FIG. 63 is opened and the compressed gas in the mold is sucked in a tank of the reference numeral 169. Thus, the compressed gas in the clearance between the resin and the mold is reduced and the shape of the mold is transferred by the foaming force of the molded article.

Although the raindrop increases when the surface temperature of the mold is high, the temperature of the molten resin is high or the pressure of the compressed gas is high, this problem can be solved by adopting the evacuation. In FIG. 63, the reference numeral 177 is a vacuum pump, the reference numeral 173 is an electromagnetic valve, the reference numeral 169 is a tank and the reference numeral 170 is a pressure gauge (capable of outputting signals) for checking the pressure of the tank. The electromagnetic valve is driven (turn on and off) by the pressure specified (set) in the pressure gauge. The reference numeral 176 is a manifold, the reference numeral 171 is a hose and the reference numeral 172 is a single action coupler for the evacuation. The single action coupler is connected to $L_2$ (compression gas circuit to molding space) of the mold. The reference numeral 168 is a check valve and the arrow mark of the reference numeral 175 shows a flow of the evacuated compression gas.

Next, the present invention will be explained based on the examples.

The resins used in the examples will be explained. For the ABS, KRALASTIC GA-501 (trade name) manufactured by NIPPON A&L INC. was used. For the PS, TOYO STYROL G100C (trade name) manufactured by Toyo Styrene Co., Ltd. was used. For the HIPS, TOYO STYROL H450 (trade name) manufactured by Toyo Styrene Co., Ltd. was used. For the m (styrene-modified)-PPE (polyphenylene ether), Xyron 100Z (trade name) manufactured by Asahi Kasei Corporation was used. For the PC/ABS (polymer alloy or blend polymer of PC and ABS), Multilon T3714 (trade name) manufactured by Teijin Chemicals Ltd. was used. For the PC, Iupilon S2000 (trade name) manufactured by Mitsubishi Engineering-Plastics Corporation was used. For the PP, Noblen AZ864 (trade name) manufactured by Sumitomo Chemical Co., Ltd. was used.

For the molding machine, the injection molding machine manufactured by Toyo Machinery & Metal Co., Ltd. was used. The programs for controlling, commanding and instructing the GCP device, the liquid injection device, the hollow molding device, the pressure molding device, the temperature regulator of the mold shown in FIG. 23 and the like of the present invention are incorporated in the PLC of the molding machine manufactured by Toyo Machinery & Metal Co., Ltd.

EXAMPLE 1

(Manufacture of Masterbatch of Foaming Agent)

The powder of the sodium bicarbonate was prepared as an inorganic foaming agent, the powder of the ADCA was prepared as an organic foaming agent, and the powder of the sodium dihydrogen citrate (1-sodium citrate, monosodium citrate) was prepared as a foaming nucleating agent. The above described sodium bicarbonate, the ADCA and the monosodium citrate and the pellet of the ABS, the PS and the PP were sent to TOWA CHEMICAL CO., LTD (6-66-35, Wakaehigashi-machi, Higashiosaka-shi, Osaka 578-0935 Japan) to ask the company to perform H-processing (coloring) modified from MC-processing and SC-processing. Each foaming agent (sodium bicarbonate and ADCA) and the foaming nucleating agent were carried on the surface of each resin pellet. TOWA CHEMICAL CO., LTD explained that the details of the H-processing was business secrets and could not be revealed.

The masterbatch (development code: Wn-B-sodium bicarbonate-10) of the foaming agent for the ABS obtained by carrying 10 wt. % of the sodium bicarbonate on the ABS, the masterbatch (development code: Wn-S-sodium bicarbonate-10) of the foaming agent for the PS obtained by carrying 10 wt. % of the sodium bicarbonate on the PS, the masterbatch (development code: Wn-P-sodium bicarbonate-10) of the foaming agent for the PP obtained by carrying 10 wt. % of the sodium bicarbonate on the PP (AZ864, block copolymer, MI value: approximately 30), the masterbatch (development code: Wn-B-ADCA-10) of the foaming agent for the ABS obtained by carrying 10 wt. % of the ADCA on the ABS, the masterbatch (development code: Wn-S-ADCA-10) of the foaming agent for the PS obtained by carrying 10 wt. % of the ADCA on the PS, the masterbatch (development code: Wn-P-ADCA-10) of the foaming agent for the PP obtained by carrying 10 wt. % of the ADCA on the PP (AZ864), the masterbatch (development code: Wn-B-CANa-10) of the foaming agent for the ABS obtained by carrying 10 wt. % of monosodium citrate on the ABS, the masterbatch (development code: Wn-S-CANa-10) of the foaming agent for the PS obtained by carrying 10 wt. % of the monosodium citrate on the PS, and the masterbatch (development code: Wn-P-CANa-10) of the foaming agent for the PP obtained by carrying 10 wt. % of the monosodium citrate on the PP were manufactured.

Although the H-processing was used in Example 1, the Pellet processing of Hexa Chemical Co., Ltd. (Higashiosaka-shi) can be also used. Alternatively, it was also confirmed that the same product (e.g., masterbatch of foaming agent, masterbatch of foaming auxiliary) could be manufactured by using the above described means such as Henschel Mixer. It is also possible to use the rocking mixer of RHM-(SJ) (trade name) and the rocking mixer of RMDHLV (trade name) both manufactured by AICHI ELECTRIC CO., LTD.

EXAMPLE 2

(Manufacture of Foam-Molded Article without GCP)

The foam molding was performed with the mold shown in FIG. 21 and FIG. 22 without performing the GCP by using the above described ABS, HIPS, m-PPO (m-PPE), PP, PC, PC/ABS and the foaming agent suitable for each resin (e.g., the above described Wn-P-ADCA-10 is used for PP) and using the foaming nucleating agent if required.

Of course, since the foam molding is performed without using the GCP, it was visually confirmed that the swirl marks occurred on the surface of the molded article.

When the inside was confirmed by breaking (dividing) the molded article, it was confirmed that the foam cells existed and the foam layer was formed. FIG. 42 and FIG. 43 show the result of each molded article. FIG. 42 shows the combination of the molded resin and the foaming agent and the masterbatch, the adding amount of the foaming agent and the adding amount of the foaming nucleating agent.

When the adding amount of each foaming agent was 3 wt. % or 5 wt. %, the same result was obtained.

When the molded resin was the PP, the masterbatch of the foaming agent was manufactured by using the pellet of the PP to be molded and the acid-modified PP having the miscibility and the compatibility with the PP to be molded. Consequently, the silver streak (reference numeral 2) shown in FIG. 1 and FIG. 2 was not formed near the gate.

When the masterbatch of the foaming agent was manufactured by using the foaming agent (Wn-P-sodium bicarbonate-10) of the sodium bicarbonate having the particle diameter of 0.5 μm for the PP to reduce the amount of the foaming gas generated from each grain of the sodium bicarbonate so that the swirl marks became inconspicuous. However, the swirl marks occurred on the surface since the later described GCP was not performed.

EXAMPLE 3

(Manufacture of Foam-Molded Article with GCP)

In the above described Example 2, the sealed mold with the ejector box shown in FIG. 10 (FIG. 11 is also available) was used as the mold structure and one GCP device shown in FIG. 15 was connected to $L_1$ to $L_3$. The injection molding machine of 350 tons (Si-350-6S) manufactured by Toyo Machinery & Metal Co., Ltd. was used. The above described programs of the GCP for controlling the GCP device shown in FIG. 15 (e.g., the injection and discharge of the compressed gas into/from the mold, the suck back, the breezing, the core-back and the mold-back) were incorporated in the program of the injection molding machine (Si-350-6S). Accordingly, the controller was not separately provided on the device shown in FIG. 15, and the GCP device was operated by the programs installed in the programs of the injection molding machine.

The weight of the product of the mold shown in FIG. 13 is approximately 100 grams per each mold (approximately 200 grams for both molds). After the injection molding machine checked that the mold was closed and the nozzle touching was finished, the injection molding machine transmitted the signal of opening the injection valve of the reference numeral 46 to inject the air (gas) compressed by the compressor 43 from the injection valve 46 to the spaces $L_1$ to $L_3$ of the mold. The output signal of the pressure gauge of the reference numeral 56 was set to 0.8 MPa, and the injection molding machine opened the pneumatically operated shut-off nozzle by the output signal when the pressure gauge reached the set pressure (the pressure in the mold was presumed to be the same pressure). Then, the foamable resin in the heating cylinder was filled in the cavity (space of $L_2$). When the filling rate (vol. %) calculated by dividing the volume of the molten resin filled in the cavity by the volume of the cavity and multiplying 100 reached to 95 vol. %, the injection molding machine opened the discharge valve of the reference numeral 51 to discharge the gas in the spaces $L_1$ to $L_3$ of the mold. The state of the outer appearance and the foam layer formed inside are shown in FIG. 44. When the molded resin was PP, the PP having the miscibility and the compatibility with the PP was used for the masterbatch of the foaming agent of the base resin and the acid-modified PP (e.g., maleic acid) having compatibility (miscibility) with the PP which is the molding material was used for the PP for carrying the foaming agent. Consequently, the silver streak shown in the reference numeral 2 of FIG. 1 and FIG. 2 did not occur near the gate.

EXAMPLE 4

(Difference of Timing of Discharging Compressed Gas in Mold)

In Example 3, the timing of the discharge was set (1) immediately after 100% of the resin was filled into the cavity or three seconds after the filling was finished. However, it seemed that the outer appearance and the foam layer formed inside were same and there was no significant influence even if the timing of the discharge was delayed. On the contrary, when the timing of the discharge was shifted to the filling rate of 60% (during filling the resin), the foaming force (foaming force of the foaming gas) could not be pressed (suppressed) at the flow terminal and the swirl marks occurred at the flow terminal.

When the discharge was performed after 90% or more of the foamable resin having foaming properties was filled in the molding space, the swirl marks were not confirmed even at the flow terminal.

EXAMPLE 5

(Pressure of Compressed Gas of GCP)

In Example 3, the pressure of the compressed gas of the GCP (pressure in the molding space) was changed from 0.8 MPa to 1.0 MPa, 1.2 MPa and 1.4 MPa. The outer appearance and the foam layer were not changed depending on the difference of the pressure of the compressed gas. When the pressure of the compressed gas was reduced to 0.6 Mpa, the foaming force could not be suppressed and the swirl marks occurred entirely. In particular, when the ADCA was used for the foaming agent, the swirl marks occurred a lot. It is presumed that this is because the nitrogen gas (foaming gas) has low solubility to the resin to be used. The pressure of the compressed gas in the molding space of the GCP varies depending on the kind of the foaming agent, the adding amount of foaming agent and the kind of the resin. Of course, when the pressure of the compressed gas is high, the swirl marks can be eliminated even if the foaming agent (e.g. ADCA) having high foaming force is contained a lot.

EXAMPLE 6

(Property for Coating Molded Article without GCP)

The molded article obtained in Example 2 (the number or the reference numeral of the molded article is shown in FIG. 43) was coated with the material using the coating material suitable for each molded article to obtain the coated molded article. For the molded article of the ABS, the HIPS, the m-PPO (m-PPE), the PC and the PC/ABS, Repele S#1100 (trade name, product number) manufactured by TOHPE CORPORATION which was the coating material mainly composed of the styrene-modified acrylic resin was coated. For the molded article of the PP, since the primer was required, the primer treatment was applied using Multi-primer EXC-3000 (trade name, product number) manufactured by Musashi Paint Co., Ltd. and then the top coating was applied using EC-GPX79-ECO HAIUREX Silver (mixing ratio of main agent and curing agent was 10:1) (trade name, product number) manufactured by Musashi Paint Co., Ltd.

A cross-cut test was performed to the coating surface of the above described molded articles in accordance with JIS K-5600-5-6. The result is shown in FIG. 45. The swirl marks occurred in all molded articles shown in FIG. 45. The swirl marks were thin resin films attached to the surface of the molded article. Thus, the swirl marks and the main body of the molded article were not adhered to each other almost at all and the swirl marks caused the peeling.

As for the detailed method of the coating means in Example 6, in the molded articles of the ABS, the HIPS, the m-PPO (m-PPE), the PC and the PC/ABS, (1) the surface of the molded articles was degreased using isopropyl alcohol (IPA), (2) the molded articles were kept indoors to evaporate the IPA and (3) the spray coating was performed using the coating material suitable for each of the materials of the molded articles. The thickness of the coating was approximately 10 μm. (4) After approximately 3 minutes of setting time, (5) the molded articles were dried at the drying temperature of 50 to 60° C. and the drying time of 45 minutes. (6) After the molded articles were kept indoors for 48 hours, the above described adherability test was performed and the result was obtained. In case of the molded article of the PP, (1) the surface of the molded articles was degreased using isopropyl alcohol (IPA), (2) the molded articles were kept indoors to evaporate the IPA and (3) since a primer treatment using a primer mainly composed of chlorinated polyolefin resin as a main component was required, Multi-primer EXC-3000 was first sprayed, after 5 minutes of setting time, the molded articles were dried at the drying temperature of 60° C. for 30 minutes and the thickness of the coating was 3 μm. (4) The spray coating was applied by using suitable coating material (EC-GPX79-ECO HAIUREX Silver). The thickness of the coating was approximately 10 μm. (5) After 5 minutes of the setting time, (6) the molded articles were dried at the drying temperature of 60° C. for 45 minutes. The thickness of the coating was 15 μm. After the molded articles were kept indoors for 48 hours, the above described adherability test was performed in accordance with JIS K-5600-5-6 and the result is shown in FIG. 45.

When coating the foam-molded article of the PP, a primer composed of the maleic acid-modified PP is applied to the PP, and then the coating is performed using a two-liquid urethane coating material or the like. At that time, it is preferable to use the primer using the same substance (e.g., HARDLEN NZ-1015) as the maleic acid-modified PP of the masterbatch of the foaming agent.

Of course, it is also possible to use the different substance. In that case, the adherability of the primer to the foam-molded article containing the maleic acid-modified PP should be checked. The maleic acid-modified PP can be used even when the modification rate or the like is different. For example, when manufacturing the masterbatch of the foaming agent, the combination of HARDLEN NZ-1015 manufactured by TOYOBO CO., LTD. and ARROWBASE DA-1010 for the primer of the coating was used.

EXAMPLE 7

(Property for Coating Molded Article with GCP)

In Example 7, the GCP was performed for the molded articles used in the above described Example 6 to obtain the molded article (the number or the reference numeral of the molded article is shown in FIG. 44) having smooth surface without having the swirl marks. Then, the coated molded articles were obtained by using the same means as the coating material of Example 6. Same as Example 6, a cross-cut test was performed in accordance with JIS K-5600-5-6 for confirming the primary adherability. As a result, the adherability of the coating film of the molded articles was good (100/100) in all molded articles (FIG. 44).

A salt spray test (SST) was performed for 240 hours in accordance with JIS K-5600-7-1 for confirming the secondary adherability. As a result, when the ADCA was used for the foaming agent, the peeling of the coating film and the like were not confirmed. When the sodium bicarbonate was used for the foaming agent, the blister of the coating film was confirmed (FIG. 47). This is because the sodium carbonate (foam residue) and/or the undecomposed sodium hydrogen carbonate remaining after the sodium bicarbonate (foaming agent) was pyrolyzed to generate the carbonic acid gas (the foaming gas) and the water vapor are attached to the surface of the molded articles (merely degreased by IPA). It is presumed that this causes the blister of the coating film. In the water resistance test of JIS K-5600-7-2 (e.g., the molded articles were left for 240 hours under the atmosphere of 50° C. and the humidity of 98% RH) and the water resistance test of JIS K-5600-6-2 (e.g., the molded articles were immersed in hot water of 40° C. for 240 hours), the blister of the coating film was confirmed (FIG. 47).

EXAMPLE 8

(Removal of Foam Residue)

It was presumed in Example 7 that the sodium carbonate and the undecomposed sodium hydrogen carbonate caused the blister. Thus, only the molded articles using the sodium bicarbonate as the foaming agent were degreased by the IPA, immersed in an acetic acid solution of 1 wt. % for 10 minutes to solubilize the sodium carbonate and the undecomposed sodium hydrogen carbonate (since the acetic acid is acidic, the above describe substances are neutralized to facilitate water dissolution), washed with water, dried and washed with acid. Then, the SST was performed on the molded articles for 240 hours same as Example 7. As a result of the water resistance test and the salt water immersion test, the blister of the coating film did not occur (FIG. 47).

When the citric acid solution of 5 wt. % was used instead of the acetic acid, the result was same and it was confirmed that the adherability of the coating film was increased. From the result of Example 8, it was confirmed that the adherability of the coating film was increased by performing the acid cleaning when the sodium bicarbonate was used as the foaming agent. Although the sodium bicarbonate was used in Example 8, the same result was obtained even when the potassium bicarbonate was used.

EXAMPLE 9

In the case of Example 2, the mold shown in FIG. 13 was used. In Example 9, the GCP was performed similar to Example 2 using the mold shown in FIG. 14 (details are in FIG. 12) where the ejector pin was sealed by the loaded O-ring, the U-shaped packing, the V-shaped packing, the L-shaped packing and the like shown in FIG. 24, FIG. 25, FIG. 26, FIG. 27 and FIG. 28. The swirl marks did not occur in any resins. However, when the filling speed was set to the maximum and the pressure was set to the maximum, the pressure was rapidly increased and the release (e.g., transfer of gas, vent of gas) of the gas (compressed gas) of the GCP was not enough. Thus, the short-molding, discoloration and scorch occurred. The GCP device was changed to the GCP device having the sub tank 55 shown in FIG. 16. As a result, even when the molten resin was filled at high speed and high pressure, the gas of GCP was returned (transferred) to the sub tank 55 by the filling force. Thus, the short-molding, discoloration and scorch caused by the rapid increase of the pressure were eliminated. When the sub tank 55 was provided on the GCP device, the pressure of the compressed gas in the molding space was compressed when the resin was filled. As a result, the function and effect of eliminating discoloration and scorch are large. In case of FIG. 11, the ejector box $L_1$ serves as the sub tank 55.

EXAMPLE 10

(Mold-Back and Core-Back)

In Example 2, immediately after the compressed gas was discharged (the process of GCP was finished), the mold was retreated by 0.5 mm (the mold-back and the core-back were performed in the injection molding machine by retreating the mold of the mobile side by 0.5 mm). Thus, the weight reduction of 25% was achieved. The foaming ratio was 100-(0.5 mm 2 mm)×100=25%, where 0.5 mm is the value obtained by adding 2 mm (the initial thickness of the top part) to the distance of retreating the mold of the mobile side or the distance of opening the mold. Immediately after the compressed gas of the GCP was discharged, the mold was retreated by 1 mm. Thus the foam-molded article having the foaming ratio of 50% was also obtained. In both of the above described foam-molded articles obtained by the retraction of 0.5 mm and 1 mm, since the GCP was performed, the swirl marks did not occur on the surface of the above described resins. In addition, the sink marks and the blister caused by the mold-back and the core-back did not occur, the mold reproducibility was high and there was no variance in shape. It seemed that the cooling was advanced only at the part of the hole of the reference numeral 67 (structure of the core-back) or the forming was a little difficult at the periphery of the hole.

Although the reference numeral 67 is the mold structure of the vertical parting line, it is also possible to use the horizontal parting line.

EXAMPLE 11

In Example 9, the mold-back and the core-back (hole of the reference numeral 67) were performed using the mold shown in FIG. 14 and the GCP device shown in FIG. 16 by the retraction of 0.5 mm and 1 mm similarly. In the foam-molded article where the foaming ratio is increased, the swirl marks, the sink marks and the blister did not occur, the mold reproducibility was high and there was no variance in shape almost at all. When the timing of the retraction was delayed 5 seconds or 10 seconds after the compressed gas of the GCP process was discharged, the cooling and the solidification of the molded article in the cavity were advanced, of course. Thus, it was confirmed that the mold reproducibility after the mold-back and the core-back was deteriorated. The delay time varies depending on the kind of the resin, the kind of the foaming agent, the adding amount of the foaming agent, the kind of the foaming gas, the pressure of the GCP, the plate thickness of the molded article and the like. From the experience of the inventor, the delay of exceeding 10 seconds is not required for suppressing the swirl marks.

Even if the gas is discharged when the foamable resin is filled into the molding space by 90% or more, the time is required before the gas is completely discharged and the time is a little delayed before the foaming gas in the resin appears on the surface to form the swirl marks. Thus, the molded article having an excellent outer appearance without having the swirl marks on the surface can be obtained.

As explained above, the timing of the discharge of the gas is adjusted (specified) while checking the appearance of the molded article when the gas is filled into the molding space by 90% or more, when the gas is completely filled, or approximately 10 seconds delayed after the gas is completely filled.

The timing of the discharge of $L_1$, $L_2$ and $L_3$ can be simultaneously although it also can be specified within the range from the timing during the molding and to the timing with a delay time.

When the gas is discharged simultaneously, it is also possible to use one GCP device shown in FIG. 15 and FIG. 16. It is also possible to use a plurality (e.g., three) of GCP devices. Although the discharge is suddenly performed to foam the resin in principle, a flow control valve may be provided on the discharge valve to control the discharge speed in some cases. It is also possible to perform the evacuation after the discharge by adding the loaded O-ring 42 directed in an opposite direction of FIG. 11. Since the O-ring (loaded O-ring shown in FIG. 24) of the reference numeral 42 has a directionality of the sealing direction, the O-ring should be added in case of the evacuation (not illustrated in FIG. 12).

When the mold-back of the mold was performed immediately after the gas of the GCP was discharged or with a little time difference, the phenomenon of the raindrop caused by the gas involved when the resin is filled could be dissolved in the foam molding using the GCP. The mold is retreated and the gas vent is opened to rapidly discharge the compressed gas causing the raindrop involved when the molten resin is filled. The resin is pressed to the mold by the foaming force of the inside foam layer which has not been cooled and solidified yet. Thus, the mold reproducibility is exerted. In this case, the raindrop does not occur even when the surface is embossed thinly (shallowly) or the surface is a glossy surface.

EXAMPLE 12

(Temperature Adjustment of Mold)

In Example 3, the surface temperature of the mold of the fixed side and the mobile side was set to approximately 45° C. for the ABS, the HIPS, the m-PPO (m-PPE) and the PP and approximately 55° C. for PC. In Example 12, the surface temperature of the mold of the fixed side and the mobile side was set to 150° C. in the device shown in FIG. 23 using the glycerin as the heating medium. After the GCP was performed, the cooling water was circulated through a separate circuit provided on the mold and the foam-molded article was manufactured. When the temperature of the mold was set to high (85° C.), although the thickness of the top part was 2 mm, the skin layer located at the surface was extremely thin and the foam layer located inside was sufficiently foamed. In Example 9, the result was same. In Example 10 and Example 11, the mold reproducibility of the hole (reference numeral 67) was low since the mold-back and the core-back were performed. In Example 12, since the skin layer located at the surface was extremely thin, the mold reproducibility was sufficiently high even at the part of the hole (reference numeral 67). In Example 10 and Example 11, the retraction was performed by 2 mm, and the speed of the cooling and the solidification was slow even when the foaming ratio was 100%. Thus, the mold reproducibility was sufficient and the molded article having a good outer appearance could be obtained.

Although the GCP functions to suppress the foaming force of the foamable resin filled in the cavity, the gas in the cavity can be bothersome to obstruct the filling of the molten resin into the cavity. Therefore, in case of the foam molding using the GCP, the defect in the appearance (recesses are formed on the surface of the molded article) called the raindrop increase as the pressure of the GCP increases, the temperature of the mold increases and the temperature of the molten resin increases. The raindrop easily occurs in the PP which has lower melt viscosity than the styrenic resin such as the ABS having a higher melt viscosity. Here, the raindrop is a phenomenon, as if small recesses are formed on the surface of the water in the puddle by raindrops when the rainwater drops in the puddle. In order to eliminate the above described defect of the appearance, it is required to reduce the pressure of the compressed gas in the GCP, reduce the temperature of the mold or reduce the temperature of the resin. However, the desired foam-molded article cannot be obtained in this case. The effective means for solving the above described problem is to perform embossing process on the decorative surface of the fixed side. It is also possible to perform the embossing process on the mobile side. The function and effect of the embossing (emboss) are to attach a food wrap (thin film) on a glass beautifully while preventing air bubbles from entering between them by using a frosted glass although the air bubbles enters between them when the glass surface has a glossy surface. The air bubbles can be further prevented from entering when the surface roughness becomes larger. When rough embossing process is performed, an excellent outer appearance without having the raindrop can be obtained even in the foam molding using the GCP.

In addition to the embossing process, the problem of the raindrop can be also solved by the mold-back or the core-back. For eliminating the raindrop, it is enough if the amount of the mold-back or the core-back is at least 0.1 mm. In this means, since the foaming ratio is not set to high, the strength of the molded article is not deteriorated almost at all. When performing the core-back, the PL of the mold is preferably the horizontal parting line compared to the vertical parting line since the compressed gas causing the raindrop entered between the resin and the mold is rapidly discharged. Thus, the horizontal parting line is suitable for the means for eliminating the raindrop.

A sand embossing of the depth of 50 μm, a sand embossing of the depth of 20 μm and a satin embossing of 5 μm were performed on the fixed side of the molded article shown in FIG. 21 and FIG. 22 using the PP, and the pressure of the GCP was set to 1 MPa, and 3% of Wn-P-ADCA-10 and 1% of Wn-P-CANa-10 were used as the foaming agent. In case of 50 μm, the embossing was deep and the raindrop did not occur. In case of 20 μm, the raindrop occurred. When the mold-back or the like of 0.1 mm was performed, the raindrop did not occur on both the embossed surface of 20 μm and the embossed surface of 5 μm, of course. As a result, it can be judged that the mold-back or the like is extremely effective for the means for solving the problem of the raindrop. When 10 wt. % of the calcium carbonate was added to the PP and the mold-back of 0.1 mm was performed for a composite material similar to the above described case, the raindrop did not occur even in the shallow embossed surface of 5 μm or less. From the above described result of Example 12, the problem of the raindrop caused by the compressed gas involved in the clearance between the resin and the mold and not discharged when the resin is filled can be solved by performing a shallow embossing process and performing the mold-back. Although the problem of the raindrop can be sufficiently solved by adding inorganic substances such as calcium carbonate, glass fiber and glass bead to the resin, the adding amount of the inorganic substances can be reduced by performing the mold-back.

(Means for Eliminating Raindrop on Glossy Surface)

In the GCP device shown in FIG. 15 and FIG. 16, the compressed gas in the mold is discharged by receiving a gas discharge signal from the molding machine or the like and opening the discharge valve of the reference numeral 51 to discharge the gas by the pressure of the compressed gas (natural discharge, atmospheric discharge). It is also possible to provide a circuit (circuit on which reference numeral 141 or the like is arranged) for performing the evacuation as shown in FIG. 49 in addition to the discharge valve 51 to perform the evacuation after the discharge. In this case, in order to obtain the effect of the evacuation sufficiently, the discharge valve 51 is opened first and then the mold is opened if required after the discharge of the gas is finished. As for the amount of the opening, the method for eliminating the raindrop by expanding the gas vent by the distance of expanding the molding space of the mold (mold-back, core-back, recession, recess) for the purpose of increasing the foaming ratio or a little distance (e.g., 1 mm, 0.3 mm) has already been described. In this case, although the vertical parting line (the structure where the PL is the core-back) can be used for the structure of the PL, the horizontal parting line (the structure where the PL is the mold-back) is more effective for discharging the compressed gas between the surface of the mold and the molded article involved when the resin is filled.

After the gas is discharged if required, the reference numeral 51 is closed, the reference numeral 141 is opened and the gas is sucked in an evacuated (decompressed) tank of the reference numeral 142. At this time, as for the O-ring of the parting line of the reference numeral 33, a crushing margin of the O-ring should be larger than the distance of performing the mold-back for maintaining the sealing property even when the mold is opened. Since the loaded O-ring of the reference numeral 42 used for the ejector pin and the like has a directionality, the loaded O-ring is preferably installed on another direction (opposite direction) of the reference numeral 42 for increasing the effect of the evacuation when the evacuation is performed. The device of the evacuation is shown in FIG. 63.

A mixed gas obtained by mixing one of the air, the nitrogen gas, the carbonic acid gas and the nitrogen gas with the carbonic acid gas with the ratio of 1:1 was compressed with the pressure of 1.4 MPa was used as the compressed gas, the sealed mold was compressed with the above described mixed gas, the compressed gas was discharged using the GCP device shown in FIG. 49 of Example 12, the mold-back was performed by 0.2 mm, and then the evacuation was performed. As a result, it was confirmed that the raindrop was reduced or was not seen almost at all. Although the depth of the embossing was 0.5 μm in case of the GCP, it was also confirmed that the GCP could be performed even on the glossy surface. When the pressure of the compressed gas is high, the force of pressing the foam cells is large in the GCP and the effect of reducing the foaming stripe pattern is large. The vacuum device is controlled by the programs incorporated in the PLC of the molding machine. Alternatively, it is also possible to provide a PLC separately so that the signals are exchanged between the PLC and the molding machine to control the evacuation device.

A specific means for eliminating the raindrop on the glossy surface when the GCP is used will be described. First, when the temperature of the mold is higher, the non-foam layer (skin layer) located at the surface of the foam-molded article can be thinner.

Specifically, in a noncrystalline resin such as the ABS and the HIPS, the temperature of the mold is raised by using a commercially available heat and cool device, a device shown in FIG. 23 or a means for increasing the temperature of the mold surface by attaching a high-frequency induction coil to the ejection device to generate eddy current on the surface of the mold (e.g., BSM molding method developed by Asahi Kasei Corporation). The above described method can be also performed for the PP, the PC and the modified PPO (modified PPE). When the temperature of the mold is higher, the skin layer can be thinner as described above. However, the raindrop occurs more frequently compared to the case where the temperature of the mold is lower. For eliminating the raindrop, good result can be obtained by performing the embossing process or performing the mold-back of the mold as described above. When the evacuation is quickly performed after the mold-back is performed, the compressed gas entered in the clearance between the mold and the resin can be sucked rapidly. Thus, the compressed gas entered in the clearance between the resin and the mold can be eliminated. Consequently, the foam-molded article having an excellent outer appearance without having the swirl marks can be obtained by performing the GCP even when the mold surface is a finely embossed surface or a glossy surface.

EXAMPLE 13

KRALASTIC GA-110G-10 (trade name) manufactured by NIPPON A&L INC. was prepared as the ABS containing 10 wt. % of glass fiber and KRALASTIC GA-110G-20 (trade name) manufactured by NIPPON A&L INC. was prepared as the ABS containing 20 wt. % of glass fiber.

The above described materials containing 10 wt. % and 20 wt. % of the glass fiber were molded by a general solid molding with Example 12 without performing the foam molding. In case of the ABS, since the ABS is an amorphous resin, there is no glass transition point temperature (Tg). Thus, the device shown in FIG. 23 was used, the surface temperature of the mold is set to 150° C. which is equal to or higher than 120° C. while considering a Vicat softening temperature, heating deformation temperature (HDT), a deflection temperature under load and the like. As a result, the weld line caused by the hole of the reference numeral 67 and the floating of the glass fiber were not seen and the molded article having an excellent and glossy outer appearance could be obtained. In this case, the embossing process was not performed on the decorative surface of the fixed side Wn-B-ADCA-10 was used as the foaming agent and the adding amount to the above described resins of GA-110G-10 and GA-110G-20 was 4 wt. % and the pressure of the GCP was 1.41 MPa. As a result, the glass fiber was deposited and the raindrop occurred since the molded article is glossy.

When the sand embossing process was performed with the depth of the embossing of 50 μm or the depth of the embossing of 15 μm, the raindrop caused by the GCP did not occur (since the pressure was high and the amount of gas was large). The glass fiber was deposited, a beautiful and thin skin layer was formed on an outer appearance and the foam layer having the fine foam cells was formed inside since the glass fiber functioned as the foaming nucleating agent.

EXAMPLE 14

In Example 13, the molding material, the masterbatch of the foaming agent and the foaming nucleating agent if required shown in FIG. 42 were used and the surface temperature of the mold was, for example, set to 150° C. which is higher than Tg of each resin, and the embossing process of 50 μm was performed on the mold shown in FIG. 14. The mold-back and the core-back were performed by 2 mm using the GCP device shown in FIG. 16. Since the temperature of the mold was high, even when the foaming ratio was 100%, the defects in the appearance such as the raindrop were not seen, the mold reproducibility was high compared to the case where the temperature of the mold is low, the thickness of the skin layer was extremely thin and the swirl marks were not seen on the surface.

EXAMPLE 15

(Means for Pressing Resin to Another Side by Providing Time Difference in Discharge)

Three GCP devices shown in FIG. 15 were respectively connected to $L_1$ to $L_3$ of the compression gas circuit and the pressure of $L_1$ to $L_3$ was set to 1.3 MPa. The gas in $L_3$ was discharged when 95 vol. % of the foamable resin was filled into the cavity, the gas in $L_2$ was discharged when 100 vol. % of the foamable resin was filled into the cavity, the mold-back was performed by 2 mm, and the gas in $L_1$ was discharged when the mold-back was finished. Of course, since the parting line of the mold was opened, the discharge of the gas in $L_1$ was started at that time. As a result of the observation, since $L_1$ was delayed, the pressing to the fixed side was performed and the transferability to the mold was sufficient.

The function of pressing to the fixed side was also confirmed when the mold-back was performed by 2 mm after the gas in $L_2$ was discharged. When the distance of the mold-back was set to 0.1 mm, 0.2 mm, 0.5 mm and 1 mm respectively, the function and effect of the pressing was confirmed in all distances. It was also confirmed that the phenomenon of the raindrop was also solved in all distances of the mold-back.

EXAMPLE 16

In Example 3, three GCP devices shown in FIG. 16 were respectively connected to $L_1$ to $L_3$ of the compression gas circuit to form a state shown in FIG. 38. The pressure of $L_3$ and $L_2$ was set to 1.0 MPa, and the pressure of $L_1$ was set to 1.4 MPa. The gas in $L_3$ was discharged when 95 vol. % of the foamable resin was filled in the cavity, the gas in $L_2$ was discharged when 100 vol. % of the foamable resin was filled in the cavity, the mold-back or the like was performed by 2 mm, and the gas in $L_1$ was discharged when the mold-back was finished. Of course, since the parting line of the mold was opened, the discharge of $L_1$ was started at that time. As a result of the observation, since $L_1$ was delayed, the pressing to the fixed side was performed and the transferability to the mold was sufficient.

Even when the mold-back was performed after the gas in $L_2$ was discharged similar to Example 15, it was confirmed that the transferability to the mold was sufficient and the problem of the raindrop could be solved.

EXAMPLE 17

(Manufacture of Masterbatch of Foaming Agent)

The PC is dissolved with chlorinated organic solvents such as carbon tetrachloride, chloroform and methylene chloride, ester-based organic solvents such as ethyl acetate and butyl acetate, aromatic hydrocarbons such as benzene, toluene and xylene, ketones such as acetone, dimethylformamide (DMF) and diacetone alcohol, for example. The pellet of the PC is dissolved with the above described solvent (mixed solvent obtained by mixing two kinds or more is also available) and the varnish is formed. The pellet of the PC and the foaming agent (e.g., ADCA, property is powder) or the like are mixed in the rocking mixer, the above described varnish is added, and the solvent contained in the varnish is evaporated and the mixture is dried/solidified. Thus, the ADCA of the foaming agent is carried on the periphery of the pellet of the PC. In the rocking mixer, the varnish can be sprayed while the mixture is mixed and heated to evaporate the solvent.

Hereafter, the method of manually manufacturing the foaming agent for the PC with a simple process will be explained. First, 400 milliliters (ml) of ethyl acetate was added to 100 g of the pellet of the PC resin (LEXAN 141, trade name), the mixture was left for 24 hours under the room temperature, and the mixture was heated to 45° C. and stirred. Thus, the PC was dissolved with the ethyl acetate and the varnish of the PC was obtained. 500 grams of the pellet of LEXAN 141 and 50 grams of the powder of ADCA were entered and mixed in a frying pan to which Teflon coating was applied, the varnish of the PC was gradually added into the mixture while the mixture was stirred with a paddle or the like. Thus, the ADCA was carried on the periphery of the pellet of the PC. The frying pan was slightly heated to approximately 40° C. to 60° C. to quicken the evaporation of the ethyl acetate contained in the solvent. As described above, the ethyl acetate was evaporated and the mixture was solidified so that the ADCA was carried on the PC. When the pellet is adhered to the adjacent pellet, the pellet is crushed by using a wooden hammer or the like. The masterbatch of the foaming agent (PC001) for the PC was obtained as described above.

40 parts of the pellet of LEXAN 141 and 1 part of PC001 were mixed using a tumbler and the foam molding was performed by the injection molding machine of 350 tons. The adding amount of ADCA was 1/45×0.01=0.025 wt. %. Since the GCP was not performed, the swirl marks occurred on the surface but the foamed structure having discontinuous foam cells inside could be obtained.

In the above described foam molding, the sealed mold shown in FIGS. 10 to 14 was preliminarily compressed by the air having the pressure of 1.4 MPa using the GCP device (FIG. 9, FIG. 15, FIG. 16 and FIG. 38) of the present invention, and the foamable resin to which foaming properties were given by the foaming agent PC001 was filled in the sealed mold. Thus, the foamed structure having an excellent skin layer on the surface and fine foam cells inside could be obtained.

In case of the ADCA, the ADCA is pyrolyzed to generate the nitrogen gas, the carbon monoxide and the carbonic acid gas which are the foaming gas. At that time, a small amount of the ammonia gas is also generated. The ammonia gas is alkaline and there is a risk of decomposing the PC. Thus, a small amount of organic acid such as citric acid is added to react with the ammonia and make the ammonia harmless. Since the above described organic acid is also powder, it is preferable that the organic acid is carried on the periphery of the pellet of the PC same as the above described PC001 to form the masterbatch of the citric acid.

Since the gas generated in the case of the ADCA is the nitrogen gas having a low solubility, the size of the foam cells becomes large. As for the foaming nucleating agent, zinc flower, calcium carbonate, calcium sulfate, barium sulfate and the like are also powder. Thus, the foaming nucleating agent is similarly carried on the pellet of the PC to manufacture the masterbatch of the foaming nucleating agent.

The above described substances can be preliminarily mixed and the mixture can be carried on the periphery of the pellet of the PC. When the compounding ratio should be changed depending on the molded article, it is possible to manufacture the masterbatch of the foaming agent, the decomposition promoter, the organic acid, the foaming nucleating agent and the like separately and mixing the masterbatch carrying each substance before a molding process.

In the above described foaming agent for the PC, the means for carrying the foaming agent on the pellet of the PC has been already described. However, it is also possible to use the method for manufacturing kompeito (sugar plum) by adding the varnish of the PC to the powder of the ADCA while the powder of the ADCA is stirred without using the pellet of the PC.

In the above described manufacturing method, since the concentration per grain is high, the control of the foaming force is difficult. When the adding amount of the foaming agent should be finely adjusted (i.e., the foaming force should be adjusted), the usability is good when the foaming force is approximately 5 wt. % to 20 wt. % per grain of the PC.

There are many kinds of polymer alloys mainly composed of PC. For example, PC/ABS, PC/PET and PC/PBT can be listed.

The above described polymer alloys mainly composed of PC can be used for the masterbatch of the foaming agent, the foaming auxiliary and the foaming nucleating agent for the PC. Of course, the pellet of the alloy resin such as ABS, PET and PBT can be used. However, the polymer alloy of the PC mainly composed of the above described PC has a sea-island structure. When the resin forming the sea is used, the carrier resin of the masterbatch can be easily dispersed in the resin mainly composing the molded article only by melt kneading it with a single screw of the injection molding machine.

Although the solvent capable of dissolving the PC has been described above, it is also possible to form a composite solvent by dissolving the PC and then using aromatic hydrocarbons, alcohols and the like for adjusting the viscosity or other purposes. In Example 17, in both the sodium bicarbonate (inorganic foaming agent) and ADCA (organic foaming agent), when the GCP means of the present invention is used, the foamed structure having the foam layer inside and the skin layer outside can be obtained. However, the physical properties of the obtained foamed structure are deteriorated significantly in all foaming agents. As described above, when the PC is hydrolyzed, the physical property is deteriorated remarkably. Thus, the liquid foaming agent such as the ethanol is most suitable for the foaming agent for the PC. When the pellet of the dry ice is entered in the molten and plasticated PC resin, the dry ice is converted into the gaseous carbonic acid gas by the temperature of the heating cylinder and the temperature (heat, heat energy) of the molten PC, and the carbonic acid gas is dispersed in the PC, the problem of the hydrolysis caused by the foaming agent can be solved. In the above described foam-molded article, since there is no foam residue, the problem of the coating appropriateness does not occur different from the case of using the sodium bicarbonate.

When the method of Example 17 is used, the PC is used as a carrier resin and the pigment for the PC is carried. Thus, the masterbatch for a coloring material for the PC can be manufactured. When carbon black, Ketjen black, acetylene black, carbon fiber or CNT (carbon nanotube) is carried, the masterbatch of the additives for imparting electric conductivity to the PC can be manufactured. The above described method of the carrying does not require the process of the melt kneading and the masterbatch can be easily manufactured even when the melting temperature of the carrier resin is high. In addition, the above described method of the carrying is not limited to the manufacture of the foaming agent for the PC.

The manufacturing method of the foaming agent for the PC and the like is shown in Example 17. In addition to the varnish of the PC, an aqueous solution of the polyvinyl alcohol (PVA) can be also used. It is also possible to perform the pelletization using the resin (e.g., powder of caprolactone) having a low melting point. The above described method is not limited to the PC and can be also applied to the ABS and the HIPS in addition to the PC.

EXAMPLE 18

(Manufacture of Masterbatch of Foaming Agent for PP)

The manufacturing method of the masterbatch of the foaming agent for the PP has been described in Example 1. As for the material of carrying the resin pellet of the PP, the maleic acid-modified PP can be used. ARROWBASE DB-4010 (trade name) manufactured by UNITIKA LTD. can be used as an example of the maleic acid-modified PP. In addition, PMA-H1100P, PMA-F6 and NZ-1015 manufactured by TOYOBO CO., LTD. can be also used. NZ-1015 is an emulsion and does not include the emulsifier. Thus, NZ-1015 is excellent in usability.

The masterbatch of the foaming agent and the foaming nucleating agent are manufactured by using the above describe maleic acid-modified PP so that the ADCA, the sodium bicarbonate, the potassium bicarbonate, the monosodium citrate and the like are carried on the pellet of the PP. Since HARDLEN NZ-1015 is the emulsion type, there is a little risk of fire when it is heated. The manufacture (carrying) of the foaming agent and the like is shown in Example 1. In Example 18, a liquid-adding type or heating type rocking mixer (trade name) manufactured by AICHI ELECTRIC CO., LTD was used instead of the H-processing. The manufacture was made by using the device (e.g., rocking mixer) having the function of heating from the outside to evaporate the water and the solvent and the function of spraying (adding) the varnish or the like used for the carrying.

The melting temperature of the maleic acid-modified PP is preferably close to the melting temperature of the PP to be molded. It is possible that the maleic acid-modified PP is melted in the heating cylinder of the molding machine in the stage of the measurement and the melt-kneading so that the maleic acid-modified PP is compatibility (miscibility) with the PP.

Furthermore, the masterbatch of each foaming agent of the present invention can be also used for the extrusion molding and the block molding in addition to the injection molding.

In addition, the above described masterbatch of the foaming agent can be also manufactured from the polymer alloy of the PP represented by the PP/PA (PA is 6-nylon, 6, 6-nylon, 12-nylon, aromatic nylon and the like).

When the ADCA is suspended in the above described ARROWBASE DB-401, the ADCA can be carried on the surface of the pellet to form the masterbatch of the foaming agent. When the sodium bicarbonate is dissolved in ARROWBASE DB-4010 and the solution is sprayed on the surface of the PP and then the PP is heated and dried, the masterbatch of the foaming agent can be formed similarly.

EXAMPLE 19

(Manufacture of Masterbatch of Foaming Agent for ABS, HIPS, Modified PPO and Modified PPE)

The manufacturing method of the masterbatch of the foaming agent for the PC has been described in Example 17. The masterbatch of the foaming agent for the ABS can be manufactured by carrying an inorganic or organic foaming agent on the pellet of the ABS or the AS to be molded using the varnish obtained by dissolving the ABS or the AS in the MEK. Similarly, the masterbatch of the foaming agent for the HIPS, the PS and the modified PPO (modified PPE) can be manufactured by carrying the inorganic or organic foaming agent on the pellet of the HIPS or the PS to be molded using the varnish obtained by dissolving the HIPS or the PS in the MEK. Of course, the above described masterbatch could be manufactured by the H-processing and the rocking mixer shown in Example 18, for example.

Embodiment 1

In Embodiment 1, as described above, as for the manufacture of the masterbatch of the foaming agent, the foaming agent, the foaming auxiliary and the foaming nucleating agent are separately carried on the resin having compatibility (miscibility) with the resin to be blended to manufacture the masterbatch of the foaming agent, the masterbatch of the foaming auxiliary and the masterbatch of the foaming nucleating agent separately. Then, the resin pellet to be blended and each masterbatch are mixed. Thus, the foamed structure having a desired and optimum foaming ratio and the foam cells having optimum size can be formed.

For example, the melting temperature of the ABS is 240° C. and the decomposition temperature of the ADCA is approximately 230° C. (melting point is 225° C. and decomposed at this temperature). Since the temperature of the molten resin and the decomposition temperature of the ADCA are close, it is enough to use only the masterbatch of the foaming agent carrying the ADCA. In case of the PP, since the melting temperature is low (200° C.), the decomposition temperature of the ADCA can be reduced by mixing the masterbatch carrying the urea having the function of reducing the decomposition temperature of the ADCA.

The hydrogen carbonate represented by the sodium bicarbonate, the citric acid, the sodium dihydrogen citrate and the like can be an aqueous solution. The above described aqueous solution is entered in Henschel Mixer or the like, a boiler (vessel) is rotated while the above described substance (having the function of the foaming agent) is heated at the temperature lower than the temperature where the substance starts the decomposition to dry and solidify it. Thus, the above described substance can be pelletized to the shape capable of being mixed with the resin pellet to be molded. Consequently, the handling can be facilitated compared to the powder. It is also possible to use the rocking mixer instead of Henschel Mixer.

Since the ADCA has a hardly soluble property, when the powder of the ADCA and the varnish such as MEK solution of PS (dope cement of PS) or MEK solution of AS (dope cement of AS) of the resin to be blended are pelletized in Henschel Mixer similar to the case of the hydrogen carbonate and the like, the foaming agent mainly composed of the ADCA can be pelletized as already explained in the above described Examples.

It is also possible to dissolve stearic acid compounds represented by stearic acid, magnesium stearate and zinc stearate in the solvent such as toluene and used it instead of the dope cement. In this case, since the stearic acid and the stearic acid compounds are frequently used as a lubricant in the molding process, these compounds can be also used when pelletizing the foaming agent for the PP.

The PVA is also available.

It is also possible to enter the solution of the stearic acid and the stearic acid compounds such as toluene, the pellet of the PP, the inorganic foaming agent such as the sodium bicarbonate and the powder of the organic foaming agent represented by ADCA in Henschel Mixer to pelletize them. It is also possible to use the maleic acid-modified PP or simultaneously use the maleic acid-modified PP and the above described solution of the stearic acid and the stearic acid compounds such as toluene.

Embodiment 2

In the above described Embodiment 1 or the case when using the ADCA as the foaming agent, the size of the foam cells is large. When the pellet carrying the sodium dihydrogen citrate, the pellet carrying the zinc flower or the like as the foaming nucleating agent is mixed and used with the pellet carrying the ADCA and the pellet of the resin to be blended, fine foam cells can be obtained by the function of the foaming nucleating agent.

Embodiment 3

When the foam molding is performed by using the pellet carrying the sodium bicarbonate, fine foam cells can be obtained. However, it is shown in Example 7 that the foam residue (sodium carbonate) affects the adherability of the coating film. When the masterbatch carrying the sodium bicarbonate (foaming agent) and the citric acid reacting with the sodium carbonate (foam residue) on the pellet is added, the foaming gas is generated by chemical reaction with the sodium bicarbonate and the sodium carbonate (foam residue) affecting the adherability of the coating film is reacted with the citric acid. Thus, the foam residue deteriorating the adherability of the coating film is reduced and the adherability of the coating film is improved.

Embodiment 4

In Embodiment 2, the sodium dihydrogen carbonate was used for the foaming nucleating agent. However, the effect of obtaining fine foam cells was also confirmed when the potassium dihydrogen carbonate was used. Of course, in Embodiments 1 to 3 and Embodiment 4, when the GCP is performed by using the mold shown in FIG. 10 and FIG. 11 and the GCP device shown in FIG. 15, FIG. 16 and FIG. 9, the foam-molded article having an excellent outer appearance without having the swirl marks and having the foam cells inside can be obtained.

Embodiment 5

The masterbatch of the foaming agent, the foaming auxiliary and the foaming nucleating agent for the PP used in the foam molding of the extrusion molding of PP is manufactured by carrying the PP having miscibility with the PP and the maleic acid-modified PP having the compatibility with the PP on the base resin. Thus, in the foam molding of the extrusion molding of the PP, the PE does not appear on the surface, different from the case when using the masterbatch of a commercially available foaming agent where the PE is used as the base resin as shown in FIG. 1 and FIG. 2. The above described masterbatches of the foaming agent, the foaming auxiliary and the foaming nucleating agent are separately manufactured and mixed with the pellet of the PP with an optimum ratio. They are also available by using the polymer alloy of PP/PA.

Embodiment 6

For the base resin of a commercially available foaming agent used for the foam molding of the PC, the ABS having the compatibility with the PC is used. As a result, since the foam-molded article obtained by the foam molding of the PC contains not a little ABS, the property (e.g., high impact-resistant) of the PC is deteriorated. For solving the above described problem, the masterbatch of the foaming agent manufactured by carrying the foaming agent on the PC using the solution obtained by dissolving the PC in the organic solvent is used. Consequently, the above described problem of the deterioration in physical properties is solved. In this case, the PC having improved solubility can be used instead of the general PC shown in Example 17. In addition to the varnish obtained by dissolving the PC, the varnish using the styrene-modified acrylic resin can be also used. However, in this case, as described above, the deterioration in physical properties of the PC due to inorganic and organic foaming agent cannot be avoided.

Embodiment 7

In the method such as MuCell, since the gas is used as the foaming agent in the injection molding machine and the extrusion molding machine, the following problems are considered in case of the injection molding machine having an inline system. (1) Since the amount of the gas to be injected is controlled by the pressure, the pressure of the molten resin varies during the measurement. Accordingly, the amount of the gas entered in the molten resin in the heating cylinder for applying foaming properties to the molten resin varies. As a result, a variation occurs in the foaming, the foaming force and foaming properties. (2) Although the molten resin cannot be called as a liquid, the molten resin of Example 7 of the present invention is similar to the liquid and when the molten resin in Example 7 is considered as "liquid," it is very difficult to dissolve the gas in the molten resin of the heating cylinder by pressure or/and finely dispersing the gas in the molten resin of the heating cylinder in a short time (time of measurement in the stage of the plastication and the melt-kneading). If the molten resin is injected or extruded in a state that the gas is not finely dispersed and remained as a large body, the blister and the burst may occur. (3) In case of the injection molding machine, the heated and molten resin is moved to the front part of the heating cylinder. When the screw is considered as a bolt and heated and molten resin is considered as a nut, the nut moves forward as the volt rotates. In this short time, it is difficult to enter the gas in the heating cylinder to finely disperse the gas during the measurement so that foaming properties are applied to the resin. In particular, it is difficult for the large molded article (heavy molded article).

As for the means for solving the above described problem, the injection molding machine of a pre-plunger type such as UCC method (Union Carbide method in the foam molding) is used, for example.

Instead of using the injection molding machine of the pre-plunger type, it is possible to enter the gas in a small heating cylinder having a small screw provided on an upper part of the heating cylinder of the injection molding machine so that the gas is preliminarily dispersed and foaming properties are applied to the molten resin. After that the molten resin is transferred to a main heating cylinder where the molten resin is kneaded again, finely dispersed and injected.

The above described specification and usage can be performed by using a preplasticizing type injection molding machine manufactured by Sodick Co., Ltd.

Although the gas is used as the foaming agent in the above described explanation, the foaming agent is not limited to the gas. The foaming agent may be a liquid (e.g., ethanol, water and sodium bicarbonate water). In this case, the amount of the liquid to be injected is controlled by the volume using an injection syringe (e.g., plunger, piston and cylinder) and the like without controlling the pressure of the gas.

In any cases where the foaming agent is gas, liquid, of course solid, the physical foaming agent such as micro balloons and chemical foaming agent such as the sodium bicarbonate and the ADCA, the molded article having an excellent outer appearance without having the swirl marks on the surface can be obtained by performing the GCP using the mold structure shown in FIG. 10, FIG. 11 and FIG. 37 and the device shown in FIG. 15 and FIG. 16 of the present invention.

In case of the extrusion molding machine, similarly, a small auxiliary heating cylinder for plasticization is provided on a main heating cylinder and the gas or the liquid is entered in the auxiliary heating cylinder to apply foaming properties. In case of the extrusion molding machine, if the gas is directly entered in the heating cylinder of the extrusion molding machine, the gas is not dispersed sufficiently. Thus, same as the case of the injection molding machine, it is preferred that the gas is entered in a small auxiliary heating cylinder (screw) for preliminarily melting the resin and dispersing the gas in the molten resin to apply the foaming properties to the molten resin, the molten resin is transferred to the main heating cylinder of the extrusion molding machine for kneading the molten resin again to finely disperse the gas, and then the foamable resin is extruded.

Embodiment 8

The specific method (e.g., the programs integrated in the molding machine) for performing the foam molding using the injection molding machine (also referred to merely as "molding machine" in the present invention) will be explained. The sealed mold shown in FIG. 10 (the sealed mold of the ejector box structure) or FIG. 11 (the mold sealing the ejector pin using the loaded O-ring or the like shown in FIG. 24 and FIG. 25) is attached to the molding machine. The pellet of the resin to be foamed is preliminarily mixed with the masterbatch of the foaming agent carrying the chemical foaming agent (e.g., powder of sodium bicarbonate, ADCA) using the varnish or the like or the masterbatch (the foaming agent or the like is kneaded into the resin) of the foaming agent manufactured and sold by EIWA CHEMICAL IND. CO., LTD, SANKYO KASEI CO., LTD. and Otsuka Chemical Co., Ltd. in a tumbler. Alternatively, foamable resin (mixture of the pellet to be foamed and the pellet of the masterbatch of the foaming agent) is mixed at an optimum ratio by using an automatic coloring device manufacture and sold by KAWATA MFG. CO., LTD. or the like. The optimum ratio is determined based on the size and shape of the foam cells for the purpose of suppressing the swirl marks by the pressure of the GCP device shown in FIG. 15 and FIG. 16, for example. Then, the mixture is entered in the hopper of the molding machine. When the amount of the foaming agent is small, it is possible to use the foaming agent by carrying the powder of the foaming agent on the surface of the pellet to be molded using oil or the like.

(Timing of Starting Gas Compression)

After the mold shown in FIG. 10 and FIG. 11 is closed and the nozzle touching is finished, the molding machine opens the valve (reference numeral 46) of the GCP device connected to FIG. 16 and injects (compresses, preliminarily pressurizes, pressurizes, applies GCP) the GCP gas into the space ($L_1$, $L_2$, $L_3$) of the mold to compress (preliminarily pressurize, pressurize) the space in the mold by the instruction of the programs incorporated in the PLC of the molding machine. Instead of the completion signal of clamping the mold, it is also possible to provide a limit switch (LS) on the PL of the mold and use the signal of it.

The time of the gas compression is determined to start injecting the foamable resin into the molding space when the time (value) reaches the time (value) preliminarily inputted in the PLC of the molding machine (also referred to merely as PLC), or the pressure gauge with a contact point is used for the reference numeral 56 and the pressure reaches the predetermined pressure. Note that the molding machine and the GCP device are connected with each other via a signal cable and signals are exchanged (e.g., confirmation and instruction) between them.

The foamable resin is heated and molten in the heating cylinder, the foaming agent is pyrolyzed and chemically reacted by the temperature (heat energy) in the heating cylinder and the temperature (heat energy) of the heated and molten resin, the generated foaming gas is dissolved by pressure and finely dispersed in the molten resin by the rotation force (force of melt-kneading) of the screw provided in the heating cylinder, and the foamable resin to which foaming properties are applied is filled (injected) in the molding space ($L_2$). At that time, since the valve 46 is still open, the gas in the space ($L_1$, $L_2$ and $L_3$) of the mold is compressed continuously.

The compressed gas in $L_2$ is pushed to $L_1$ and $L_3$ through the clearance of the nested structure and the clearance of the ejector pin by the force of injecting the foamable resin. In case of FIG. 10, the compressed gas is entered in the ejector box and functions as a cushion. Thus, the pressure is prevented from being increased and the discoloration and scorch of the resin can be reduced.

In case of FIG. 11, there is no large space to function as the ejector box. Thus, it is preferable to connect the GCP device with the sub tank of the reference numeral 55 shown in FIG. 16 if it is possible. Of course, it is also possible to use the configuration of FIG. 15. This is because a space of a hose connecting the GCP device shown in FIG. 15 with the mold functions as the reference numeral 55 at least a little.

(Timing of Discharge)

The injection valve of the reference numeral 46 is closed when the foamable resin is injected into $L_2$, immediately after the injection is finished or when a little time has elapsed after the injection is finished, and then the discharge valve of the reference numeral 51 is opened to discharge the compressed gas in the sealed mold. The reference numeral 51 can be opened immediately after the reference numeral 46 is closed. Alternatively, it is also possible to open the reference numeral 51 with a little delay. A time point (injection start) when the molding machine starts injecting the resin into the molding space is defined as 0 (zero) and a time point when the injection is finished is defined as 100. The timing of the discharge (discharge during the injection) is determined by a ratio (e.g., percent) between 0 and 100. Since the position of the screw can be monitored by using a servomotor, a magnetic scale, an encoder or the like, it is possible to arbitrarily set the position and output a gas discharge signal when the screw reaches the set position.

The completion signal of the injection (completion signal of primary pressure) of the molding machine is used for the discharge after the injection is finished. In case of the foam molding, the pressure keeping may be applied without using the cushion in some cases. This is because the screw is returned by the spring property (compressibility) of the foamable resin filled in the molding space when the pressure keeping is not applied. When the pressure keeping is applied, the variation of the weight of the molded article can be reduced. It is not necessary to make the pressure so high and the time so long in the pressure keeping since it is enough if the screw is not returned. Of course, it is also possible to form the cushion in the pressure keeping.

(Timing of Discharge and Suck Back)

The compressed gas in the space of the mold can be discharged during the injection or after the injection is finished. When the compressed gas is discharged during the injection, since the PLC of the molding machine monitors the position of the screw for the injection, an arbitrary position of the screw is inputted in the PLC, and the discharge signal is outputted to the GCP device shown in FIG. 15 or FIG. 16 to open the discharge valve 51 and discharge the compressed gas when the screw reaches the arbitrary position. Here, the discharge position is the position (value) for confirming that the screw has passed through the predetermined position.

When the compressed gas is discharged after the injection is finished, the suck back (retraction of the screw) is performed immediately after (at the same time with) the injection, after the injection is finished or when a predetermined time has elapsed after the injection is finished for the purpose of reducing the pressure applied to the foamable resin filled in the molding space. The compressed gas is discharged immediately after the suck back is started, during the suck back (by preliminarily inputting the discharge position), immediately after the suck back is finished, or when a predetermined time has elapsed after the suck back is finished. The above described instruction for the discharge is performed by the programs incorporated in the PLC of the molding machine.

The suck back is difficult in a spring type shut-off nozzle manufactured by FISA Corporation. However, the suck back can be satisfactorily performed in case of a needle type shut-off nozzle using hydraulic or pneumatic cylinder or a rotary valve type shut-off nozzle. The suck back and the discharge of the GCP are separately performed and the above described timing can be freely combined. The instruction of the suck back is performed by the programs incorporated in the PLC of the molding machine.

In case of the hot runner, similarly, although a spring type hot runner manufactured and sold by FISA Corporation cannot be used, the hot runner opened and closed by using hydraulic or pneumatic actuator or the like can be operated same as the above described needle type shut-off nozzle.
(Extension Core)

In the means having the function and effect of the above described suck back (referred to as an extension core and a breezing core in the present invention), a part of the mold is retreated (extended) to reduce the pressure of the foamable resin filled in the molding space. In the case using the means of facilitating the foaming, the timing of the discharge is set same as the case of the suck back. The suck back and the extension core can be simultaneously performed in the same mold. At that time, the timing of the discharge when the discharge is performed is determined by observing the state of the molded article.

In the extension core, a part of the moving core is retreated by using an actuator in which a cylinder or a servomotor is incorporated, the cylinder or the servomotor having a function of preliminarily shrinking a part of the mold and forwarding and retreating a part of the mold by a hydraulic means and a pneumatic means.
(Mold with Shutter)

A dummy shape is provided in a part of the mold and a shutter is provided on an inlet. First, the shutter is closed. After the foamable resin is filled in the molding space and the shutter is opened at an optimum timing. Thus, the foamable resin flows into an unfilled space. Consequently, the pressure of the foamable resin filled in the molding space is reduced and the foaming is facilitated. Same as the suck back, the timing of opening the shutter is instructed by the programs incorporated in the molding machine.

In the extension core, the shutter is opened and closed by providing a driving device on an inside and an outside of the mold. Alternatively, a mechanism of moving an ejector of the molding machine is used. In this case, in addition to the ejector plate in which the ejector pin having the mechanism of ejecting the molded article is incorporated, another (one set of) ejector plate is provided together with a stepped ejector rod or the like. Separate from the operation of the ejector pin (capable of ejecting/extruding the ejector plate and ejecting/extruding the ejector plate in which the conventional ejector pin is incorporated), the operation of the extension core, the opening and closing of the shutter and the like are performed. Of course, the instruction of the above described operations (e.g., opening and closing of the shutter) is instructed by the programs incorporated in the PLC of the molding machine.
(Mold-Back, Core-Back)

In case of the mold-back and the core-back (collectively referred to as the mold-back or the like), the mold-back or the like is normally started after the discharge of the gas is finished. However, the mold-back or the like may be performed during the discharge in some cases. In this case, the pressure of starting the mold-back or the like is preliminarily set on the pressure gauge of the reference numeral 56, and the mold-back or the like is started when the pressure is reduced to the set pressure. Similar to the suck back, the delay time can be set for the mold-back or the like. Of course, the instruction of the above described operations is instructed by the programs incorporated in the PLC of the molding machine.

The purpose of the mold-back or the like is to increase the foaming ratio.

When the molded article having smooth and excellent surface without having the swirl marks is obtained by using the GCP of the present invention and the foaming ratio is increased (approximately twice), the mold-back (FIG. 19 and FIG. 20) is preferable compared to the core-back (FIG. 17 and FIG. 18). The timing of performing the mold-back is not before the GCP. The mold-back is started after the GCP is started. The mold-back is started when the pressure gauge of the reference numeral 56 reaches the predetermined pressure. Alternatively, the mold-back is started when the discharge of the GCP is finished (when the pressure gauge of the reference numeral 56 indicates an approximately atmospheric pressure). Alternatively, a delay time is specified (set) after the GCP is discharged and the pressure gauge of the reference numeral 56 reaches the predetermined pressure, and the mold-back or the like is started when the specified delay time has elapsed. Of course, the instruction of the above described operations (the mold-back or the like) is instructed by the programs incorporated in the PLC of the molding machine. When the mold-back or the like is performed, the width of the gas vent of the PL is broadened. The reference numeral 131 may be also broadened in some cases. At the same time, the entire circumference of the PL is opened and the gas vent is enlarged by the distance where the mold is retreated. Thus, a small amount of the compressed gas which enters in the space between the mold and the resin and causes the raindrop is suddenly discharged. However, the inside of the filled foamable resin has the foaming force since the cooling and the solidification are not finished. Consequently, the mold is transferred to the resin again and the foam-molded article having an excellent outer appearance without having the raindrop can be obtained.

As described above, the raindrop can be eliminated by performing the mold-back or the like. As a result of earnest study, the inventor found that it was preferable to perform a shallow embossing process compared to the glossy surface. A large effect can be obtained by combining the GCP and the evacuation. In a stage where the mold-back is started, the spaces $L_1$ to $L_3$ of the mold are connected with each other by a hose and the pressure is quickly decreased by the evacuation device (FIG. 63) connected to the hose. Consequently, the raindrop of the glossy surface is eliminated and the foam-molded article having an excellent outer appearance can be obtained. Although the sealed mold shown in FIG. 10 and FIG. 11 is used as the mold, it is preferable to use the structure where the ejector pin is sealed for fully exhibiting the function and effect of the evacuation since the volume of the space to be evacuated is small. In FIG. 11, since the O-ring for sealing the ejector pin has a directionality, the same seal is used also for the opposite direction in the mold of the evacuation for preventing the air from entering even when the evacuation is performed. The O-ring having a large diameter or the O-ring shown in FIG. 56 to FIG. 62 is used so that the evacuation is possible even when the mold-back is performed and the sealing property of the seal of the reference numeral 33 is kept when the PL is opened.

The pressure cannot be quickly reduced only by connecting the vacuum pump to the mold or the GCP device shown in FIG. 15 and FIG. 16. It is preferable that the vacuum pump (reference numeral 177) is connected to the receiver tank (reference numeral 169) and the pressure inside the receiver tank is preliminarily reduced, and then the valve (reference numeral 174) is opened by the signal from the molding machine to perform the evacuation quickly.

When the skin layer having an excellent outer appearance is formed on the surface of the foam-molded article by using the GCP, the skin layer becomes thin if the surface temperature of the mold is high. For example, the surface temperature of the mold is increased by using the device shown in FIG. 23. In addition, it is also possible to increase the surface temperature by heating the surface of the mold by high frequency induction heating. However, since the temperature of the surface of the mold is high in this case, the raindrop occurs more frequently. For obtaining an excellent foam-molded article while eliminating the raindrop, it is preferred to use the mold-back or the like and sufficient evacuation. Thus, the molded article having an excellent outer appearance without having the raindrop can be obtained even for the glossy surface. As described above, the foam-molded article having an excellent outer appearance and thin thickness can be manufactured by performing the GCP and further performing the evacuation while the temperature of the foamable resin is high and the surface temperature of the mold is high.

(Evacuation)

After the mold-back or the like is performed, the discharge of the GCP is finished and then the evacuation (strictly speaking, pressure reduction) in the mold is performed by using the vacuum device shown in FIG. 63. The PLC of the molding machine instructs that the reference numeral 174 is opened after the mold-back or the like is finished and a part of the compressed gas remained in the mold is sucked in the reference numeral 169. The reference numeral 174 is opened at the same time when the mold-back or the like is finished or after an arbitrarily specified delay time has elapsed. The function of outputting the pressure value is added to the pressure gauge of the reference numeral 170 if required. The PLC of the molding machine does not instruct to start clamping the mold unless the pressure value is reduced to below the set value by the pressure reduction (evacuation). For fully exhibiting the effect of the evacuation, it is preferable to use the mold (volume of pressurization is small) shown in FIG. 11 where the ejector pin is sealed than the mold shown in FIG. 10 having the ejector box (volume of pressurization is large).

After the evacuation is performed, the mold may be clamped again to compress and form the resin by the distance less than the distance of the mold-back or the like, the same distance as the mold-back or the like or the distance more than the distance of the mold-back or the like in some cases.

(O-GCP, I-GCP)

In the GCP device shown in FIG. 15 and FIG. 16, the means for applying (compressing, pressurizing) the pressure to the resin by the gas from the outside of the foamable resin for suppressing the foaming and eliminating the swirl marks on the surface has been explained. The inventor calls this "outer -GCP (O-GCP)." When the hollow molding such as AGI developed by Asahi Kasei Corporation and Cinpres developed by MITSUBISHI GAS CHEMICAL COMPANY, INC. is applied to the foamable resin of the present invention, the foaming from the inside of the molded article and from the hollow part formed inside the molded article can be suppressed. For example, the device shown in FIG. 1 of the specification of PCT/JP2016/86380 (hereafter, referred to as 86380 patent) and a pin for hollow molding (pin for injecting high-pressure gas in the molded article) shown in FIG. 124 for injecting the high-pressure gas compressed in FIG. 1 is installed in the mold shown in FIG. 10 and FIG. 11 of the present invention. When the inside is made hollow by using the devices shown in FIG. 1 and FIG. 24 of the specification of 86380 patent and then the gas for forming the hollow is discharged, the pressure of the gas suppressing the foaming from the inside is released. Thus, the foaming is started again at the follow portion. The inventor calls this "inner -GCP (I-GCP)."

The I-GCP may be linked (synchronized) with the O-GCP. It is also possible that the I-GCP is not linked with the O-GCP. The I-GCP (injection of high-pressure gas into the molded article) is started during the injection of the resin, immediately after the injection of the resin, with the delay time after the injection of the resin is finished, at the same time when the suck back is started, during the suck back, immediately after the suck back is finished or with the delay time after the suck back is finished. After the hollow portion is formed in the I-GCP, the discharge is performed immediately after the high-pressure gas is injected or with a predetermined delay time. Hereafter, the programs of the PLC in the molding machine will be explained. The pressure of the O-GCP is preliminarily applied in the molding space and then the foamable resin is injected. During the injection, at the same time when the injection is finished or with a predetermined delay time after the injection is finished, the valve of the reference numeral 14 shown in FIG. 1 of 86380 patent is opened to form the follow portion inside. If required, after the valve of the reference numeral 14 shown in FIG. 1 of 86380 patent is closed to enclose the high-pressure gas injected inside (after the holding time), the reference numeral 15 shown in FIG. 1 of 86380 patent is opened to discharge the high-pressure gas injected inside. Thus, the foaming is started toward the inside of the hollow portion. When the program for the I-GCP incorporated in the PLC of the molding machine is executed for the non-foamable resin, the program can be used as the program of the hollow molding. As described above, the O-GCP is controlled by the programs incorporated in the PLC of the molding machine.

The gas injection pin shown in FIG. 124 of 86380 patent used for the I-GCP can be fixed. However, in order to discharge the gas smoothly, it is preferable to provide a hydraulic or pneumatic cylinder at a rear part of the gas injection pin so that the gas injection pin is moved forward before injecting the high-pressure gas and moved backward when the high-pressure gas is discharged (after the reference numeral 15 shown in FIG. 1 of 86380 patent is opened and at the same time when the high-pressure gas inside is discharged or with a predetermined delay time) to release the pressure in the hollow portion for avoiding to cause the blister and the burst when the mold is released.

Embodiment 9

(Foaming Agent of Gas and Liquid)

In Embodiment 8, the case of using the masterbatch carrying the chemical foaming agent of the solid has been mainly explained. However, the foaming agent of the gas and the liquid can be also used. In case of adding the foaming properties to the resin during the plasticization by injecting the gas such as the nitrogen gas and the carbonic acid gas or the liquid such as the water, the alcohol and the sodium bicarbonate water in the heating cylinder of the molding machine during the measurement process, the program incorporated in the PLC of the molding machine controls to start the injection of the gas or the liquid by receiving the signal when the measurement is started, with a delay time after the measurement is started or when the screw passes through the preliminarily inputted position. The instruction for stopping the injection of the gas or the liquid is outputted when the measurement is finished, a predetermined time has elapsed after the measurement is started or when the screw passes through the preliminarily inputted position Embodiment 10

The gas used in the GCP is generally an air. When the discoloration or the scorch occurs, the nitrogen gas, the carbonic acid gas or the like is used. Alternatively, the mixed gas can be used. It is possible to provide another port (not illustrated) in FIG. 15 and FIG. 16, provide another valve (not illustrated), compress the gas in the mold by the first air and compress the gas having higher pressure than the first air in $L_2$. Thus, the inert gas such as the nitrogen gas and the carbonic acid gas in $L_2$ can be replaced. It is also possible to use the above described inert gas from the beginning, Needless to say, these are also incorporated in the programs of the molding machine.

Embodiment 11

The configuration explained in the O-GCP and the I-GCP can be also applied to the above described Minoru Shimbo method. The instruction for injecting the foaming agent of the liquid from the injection port provided on the rear part of the nozzle at the same time of the injection to foam the resin is incorporated in the programs of the molding machine. Of course, when the GCP was used together with the above described method, it was confirmed by the experiment that the molded article having an excellent outer appearance could be obtained.

The above described examples and embodiments have been exemplified only for the purpose of explanation, and hence the present invention is not restricted to them and they are susceptible to modifications or additions, as long as these changes in no way contradict the technical spirits of the present invention that can be construed by the person skilled in the art from the scope of patent claims, detailed description of the invention and illustrated drawings.

INDUSTRIAL APPLICABILITY

The present invention is applied to the manufacture of the foam-molded article of the thermoplastic resin, in particular, the foam-molded article having an excellent outer appearance without having swirl marks of the outer appearance.

The structural drawings of the mold, the structural drawings of the GCP device, the drawings (photographs) showing the result, the drawings (photographs) showing the result of the coating and the like used in the present invention are shown.

DESCRIPTION OF REFERENCE NUMERALS

1: gate, 2: silver streak caused by PE occurred near gate, 3: state showing excellent outer appearance without swirl marks at a part far from gate, 4: swirl marks occurred on surface, 5: cap located at upper part, 6: space (space to which pressure is applied), 7: carbonated water, 8: container, 9: partition, 10: space, 11: door, 12: foam on surface, 13: beer (containing carbonic acid gas), 14: glass, 15: foam is not generated at surface, 16: spool bush, 17: mounting plate of fixed side, 18: mold plate for housing nested element of fixed side, 19: nested element of fixed side, 20: mating surface of nested element of fixed side, 21: molding space (mold cavity, cavity, molding space, $L_2$), 22: mold plate for housing nested element of mobile side, 23: nested element of mobile side, 24: ejector pin (abbreviation: EP), 25: ejector plate (upper), 26: ejector plate (lower), 27: spacer block having sealing function, 28: mounting plate of mobile side, 29: hole of rod, 30: mating surface of nested element of mobile side, 31: O-ring, 32: O-ring, 33: O-ring, 34: ejector mechanism, 35: O-ring, 36: O-ring, 37: spacer block, 38: O-ring, 39: dovetail groove, 40: plate (upper), 41: plate (lower), 42: O-ring, 43: compressor (with not-illustrated receiver tank), 44: hose, 45: connection part between manifold 49 and injection valve 46, 46: injection (gas compression) valve, 47: arrow mark showing direction of discharged gas of GCP (gas or compressed gas injected into mold), 48: coupler, 49: manifold, 50: connection part between manifold 49 and discharge valve 51, 51: discharge valve, 52: flexible hose, 53: arrow mark showing flow direction of GCP (gas compressing mold) from compressor; arrow mark showing flow of gas from compressor to GCP device, 54: arrow mark showing input and output of compressed gas into/from mold, 55: sub tank, 56: pressure gauge, 57: connection piping to sub tank 55, 58: check valve, 59: mold of fixed side, 60: parting line (PL), 61: mold of mobile side, 62: vertical parting line (vertical parting line between metal of fixed side mold and metal of mobile side mold), 63: arrow mark showing core-back (arrow mark showing retraction of 61), 64: horizontal parting line, 65: arrow mark showing mold-back (arrow mark showing retraction of 61), 66: space generated when parting line is opened by mold-back, 67: core-back structure showing state where parting line is opened by core-back, 68: mold-back structure (single side engraving), 69: mold-back structure (double side engraving), 70: top part, 71: heating medium, 72: magnetic substance, 73: coil of IH heater, 74: blade, 75: magnet, 76: magnet, 77: flow control valve, 78: arrow mark showing flow direction, 79: nested element of mold, 80: filter, 81: heating device, 82: circulator, 83: piping, 84: sealing part of loaded O-ring mainly made of Turcon (trade name), Zurcon (trade name) and the like, 85: means for applying load on reference numeral 84 in loaded O-ring; spring made of stainless steel having U-shape is fitted in reference numeral 84 in a state that opening is directed upward, 86: spring of reference numeral 85 made of stainless steel having U-shape fitted for applying load is fitted in state that opening is directed downward; material is not limited to stainless steel; material can be spring steel; shape can be coil spring shown in FIG. 29; commercially available O-ring illustrated in FIG. 30 can be used for applying load without limited to means made of metal, 87: lip (seal) part of U-shaped (V-shaped) O-ring (packing) having function same as reference numeral 84 illustrated in FIG. 24 to FIG. 26, 88: internal recess of U-shape (V-shape); loaded O-ring can be formed by fitting FIG. 29 or FIG. 30 into reference numeral 88, 89: gas compression pin provided on mold, 90: gas circuit for gas compression, 91: gas compression pin having ejector pin of double structure, 92: gas circuit for gas compression, 93: gas compression pin installed on mounting plate of mobile side, 94: gas compression pin having ejector pin of double structure, 95: outer cylinder of gas compression pin; broken line shows hole formed in ejector sleeve pin, 96: ejector pin, 97: D-cut processed for facilitating gas flow, 98: rubber sheet (packing) for sealing gas, 99: compressed (pressurized) gas, 100: part of injecting (blowing) gas (tip of gas pin), 101: rib provided for preventing leakage of gas, 102: cross-section of molded article, 103: gas compression pin, 104: when rough embossing process is applied on surface subject to gas compression, gas can be easily entered in space between resin and mold by wedge effect, 105: mold of mobile side, 106: mold of fixed side, 107: gas circuit of 94 is provided by fixing gas compression pin 103 formed on mounting plate 28 of mobile side, 108: inlet of gas used for gas compression, 109: one side, 110: foam layer enclosed inside by GCP, 111: skin layer having excellent outer appearance formed by GCP, 112: body of L-shape seal, 113: O-ring, 114: housing for housing L-shape seal, 115: O-ring fitted for applying load, 116: pressing block (upper), 117: pressing block (lower), 118: O-ring, 119: O-ring, 120: coupler, 121: piping, 122: device for performing GCP on $L_3$, 123: device for performing GCP on $L_2$, 124: device for performing GCP on $L_1$, 125: gas circuit in mold, 126: gas circuit in mold, 127: gas circuit in mold, 128: coupler, 129: groove, 130: gas vent, 131: gas vent, 132: hole, 133: hole, 134: groove, 135: arrow mark showing state that gas compressed by compressor or like is entered in GCP device, 136: arrow mark showing flow of compressed gas, 137: arrow mark showing flow of compressed gas into mold, 138: piping, circuit, hose and the like, 139: arrow mark showing flow of discharging compressed gas in mold to atmosphere, 140: arrow mark showing flow of compressed gas in mold sucked into tank of reference numeral 142, 141: valve, 142: vacuum (pressure reduction) tank, 143: arrow mark showing flow of gas sucked by vacuum pump of reference numeral 144, 144: vacuum pump, 145: pressure gauge showing degree of vacuum (pressure reduction) in tank, 146: check valve, 147: check valve, 148: check valve, 149: porous sintered metal capable of injecting and discharging compressed gas, 150: multilayer nested element made of porous sintered metal capable of injecting and discharging compressed gas, 151: nested element for fixing reference numeral 150, 152: mold plate of fixed side or mobile side for inserting not-illustrated nested element or the like determining molding space, 153: space of nested element 154 for injecting and discharging compressed gas, 154: nested element forming reference numeral 153, 155: molding space formed by mold of mobile side and mold of fixed side for filling resin into molding space, 156: reference numeral 156 shows not extended part when reference numeral 61 is retreated, 157: schematic diagram showing state that shape of mobile side is entered in molded article, 158: cross-section of V-ring, 159: opening of V-ring, 160: opening of U-ring, 161: opening of U-ring, 162: cross-section of O-ring having circular cross-section, 163: showing state that opening 164 of V-seal is directed opposite to molding space for obtaining sealing property for evacuation, 164: opening of V-ring directed outward (opposite to molding space), 165: opening of U-ring directed outward (opposite to molding space), 166: showing state that opening 164 of U-seal is directed opposite to molding space for obtaining sealing property for evacuation, 167: check valve, 168: check valve, 169: evacuated (decompressed) tank, 170: pressure gauge capable of outputting pressure signal for checking pressure of reference numeral 169, 171: hose, 172: single action coupler for evacuation, 173: valve (turned on and off by signal of reference numeral 170; applicable to vacuum), 174: valve (for introduce compressed gas in mold to tank 169 after mold-back and core-back; applicable to vacuum), 175: arrow mark showing flow of compressed gas after evacuation, 176: manifold, 177: vacuum pump

The invention claimed is:

1. A method for manufacturing a foam-molded article by performing a gas counter pressure (GCP) using a sealed mold, a mold clamping mechanism, a shaft body for ejecting the foam-molded article from the sealed mold, and at least one of: a loaded O-ring for sealing the shaft body; an O-ring having a U-shaped groove for sealing the shaft body; and a spacer block for sealing the shaft body, the method comprising:

a step of compressing a sealed space including a molding space inside the sealed mold by injecting a gas having a pressure of 0.6 MPa or more into the sealed space, the gas being selected from the group consisting of air, nitrogen gas, carbon dioxide, and a mixed gas of two or more thereof;

a step of filling a foamable resin into the molding space by 90 volume % or more in a state that the sealed space is compressed by the gas;

a step of discharging an amount of the gas injected into the sealed space to atmosphere by opening a discharge valve after the foamable resin is filled into the molding space by 90 volume % or more, wherein the step of discharging the gas is performed through a fixed side or a mobile side of the sealed mold, the fixed and mobile sides of the sealed mold defining the molding space;

a step of retreating a mobile side of the mold clamping mechanism by 0.1 mm to 2 mm at the same time as when the step of discharging the gas is started, during the step of discharging the gas, immediately after the step of discharging the gas, or when a specified delay time has elapsed after the step of discharging the gas is finished for performing at least one of a mold-back and a core-back so as to discharge an amount of the gas injected into the sealed space from a parting where the fixed side and the mobile side of the sealed mold are mated with each other and increase a foaming ratio of the foamable resin in a state that a cooling and a solidification of an inside of the foamable resin are not finished;

a step of cooling and solidifying the foamable resin, thereby forming the foam-molded article; and a step of opening the sealed mold and taking the foam-molded article from the sealed mold.

2. The method for manufacturing the foam-molded article according to claim 1, further comprising a step of evacuating an amount of the gas in the sealed space in the sealed mold by an evacuation device during the step of discharging the gas, immediately after the step of discharging the gas, or at the same time as when the at least one of the mold-back and the core-back is started.

3. The method for manufacturing the foam-molded article according to claim 2, wherein the evacuating is performed with a delay time of 0 to 10 seconds after the at least one of the mold-back and the core-back is started.

4. The method for manufacturing the foam-molded article according to claim 2, wherein the evacuating is performed at the same time when the step of discharging the gas is started.

5. The method for manufacturing the foam-molded article according to claim 2, wherein the evacuating is performed with a delay time of 0 to 10 seconds after the step of discharging the gas is started.

* * * * *